US012619335B2

(12) United States Patent
Holz et al.

(10) Patent No.: US 12,619,335 B2
(45) Date of Patent: *May 5, 2026

(54) INTERACTION STRENGTH USING VIRTUAL OBJECTS FOR MACHINE CONTROL

(71) Applicant: SIM IP HXR LLC, Sunny Isles Beach, FL (US)

(72) Inventors: David S Holz, San Francisco, CA (US); Raffi Bedikian, San Francisco, CA (US); Adrian Gasinski, San Carlos, CA (US); Hua Yang, Millbrae, CA (US); Maxwell Sills, San Francisco, CA (US); Gabriel Hare, Daly City, CA (US)

(73) Assignee: SIM IP HXR LLC, Sunny Isles Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/568,022

(22) Filed: Sep. 11, 2019

(65) Prior Publication Data

US 2020/0004403 A1     Jan. 2, 2020

Related U.S. Application Data

(63) Continuation of application No. 14/541,078, filed on Nov. 13, 2014, now Pat. No. 10,416,834.

(Continued)

(51) Int. Cl.
G06F 3/04815     (2022.01)
G06F 3/01     (2006.01)

(52) U.S. Cl.
CPC .......... *G06F 3/04815* (2013.01); *G06F 3/017* (2013.01)

(58) Field of Classification Search
CPC ...... G06F 3/04815; G06F 3/017; G06F 3/011; G06V 20/20

(Continued)

(56) References Cited

U.S. PATENT DOCUMENTS

| | | | |
|---|---|---|---|
| 2,665,041 A | 1/1954 | Maffucci | |
| 4,175,862 A | 11/1979 | DiMatteo et al. | |

(Continued)

FOREIGN PATENT DOCUMENTS

| | | | |
|---|---|---|---|
| CN | 101930286 A | 12/2010 | |
| CN | 102117117 A | 7/2011 | |

(Continued)

OTHER PUBLICATIONS

Hummel, Johannes, et al. "An evaluation of two simple methods for representing heaviness in immersive virtual environments." 2013 IEEE Symposium on 3D User Interfaces (3DUI). IEEE, 2013. (Year: 2013).*

(Continued)

*Primary Examiner* — Maria S Ayad
(74) *Attorney, Agent, or Firm* — ALSTON & BIRD LLP

(57) ABSTRACT

The technology disclosed relates to using virtual attraction between hand or other control object in a three-dimensional (3D) sensory space and a virtual object in a virtual space. In particular, it relates to defining a virtual attraction zone of a hand or other control object that is tracked in a three-dimensional (3D) sensory space and generating one or more interaction forces between the control object and a virtual object in a virtual space that cause motion of the virtual object responsive to proximity of the control object to the virtual object and escalation with a virtual pinch or grasp action of the control object directed to a manipulation point of the virtual object.

20 Claims, 31 Drawing Sheets

Manipulation Point "Pinch" Example 201

Manipulation Point "Grab" Example 202

Single Handed Interaction Example 203

Two Handed Interaction Example 204

Related U.S. Application Data

(60) Provisional application No. 61/905,103, filed on Nov. 15, 2013.

(58) Field of Classification Search
USPC ........................................................ 715/850
See application file for complete search history.

(56) References Cited

U.S. PATENT DOCUMENTS

| | | | |
|---|---|---|---|
| 4,879,659 | A | 11/1989 | Bowlin et al. |
| 5,134,661 | A | 7/1992 | Reinsch |
| 5,282,067 | A | 1/1994 | Liu |
| 5,454,043 | A | 9/1995 | Freeman |
| 5,554,980 | A | 9/1996 | Hashimoto et al. |
| 5,574,511 | A | 11/1996 | Yang et al. |
| 5,581,276 | A | 12/1996 | Cipolla et al. |
| 5,594,469 | A | 1/1997 | Freeman et al. |
| 5,616,078 | A | 4/1997 | Oh |
| 5,659,475 | A | 8/1997 | Brown |
| 5,742,263 | A | 4/1998 | Wang et al. |
| 5,900,863 | A | 5/1999 | Numazaki |
| 5,901,170 | A | 5/1999 | Peysakhovich et al. |
| 6,002,808 | A | 12/1999 | Freeman |
| 6,031,161 | A | 2/2000 | Baltenberger |
| 6,031,661 | A | 2/2000 | Tanaami |
| 6,061,064 | A | 5/2000 | Reichlen |
| 6,072,494 | A | 6/2000 | Nguyen |
| 6,075,892 | A | 6/2000 | Fan et al. |
| 6,075,895 | A | 6/2000 | Qiao et al. |
| 6,084,979 | A | 7/2000 | Kanade et al. |
| 6,090,443 | A | 7/2000 | Eastep |
| 6,111,580 | A | 8/2000 | Kazama et al. |
| 6,147,678 | A | 11/2000 | Kumar et al. |
| 6,154,558 | A | 11/2000 | Hsieh |
| 6,160,899 | A | 12/2000 | Lee et al. |
| 6,181,343 | B1 | 1/2001 | Lyons |
| 6,184,326 | B1 | 2/2001 | Razavi et al. |
| 6,184,926 | B1 | 2/2001 | Khosravi et al. |
| 6,191,773 | B1 | 2/2001 | Maruno et al. |
| 6,195,104 | B1 | 2/2001 | Lyons |
| 6,204,852 | B1 | 3/2001 | Kumar et al. |
| 6,222,465 | B1 | 4/2001 | Kumar et al. |
| 6,252,598 | B1 | 6/2001 | Segen |
| 6,256,033 | B1 | 7/2001 | Nguyen |
| 6,263,091 | B1 | 7/2001 | Jain et al. |
| 6,417,866 | B1 | 7/2002 | Man et al. |
| 6,493,041 | B1 | 12/2002 | Hanko et al. |
| 6,498,628 | B2 | 12/2002 | Iwamura |
| 6,603,867 | B1 | 8/2003 | Sugino et al. |
| 6,661,918 | B1 | 12/2003 | Gordon et al. |
| 6,702,494 | B2 | 3/2004 | Dumler et al. |
| 6,771,294 | B1 | 8/2004 | Pulli et al. |
| 6,786,877 | B2 | 9/2004 | Foxlin |
| 6,788,809 | B1 | 9/2004 | Grzeszczuk et al. |
| 6,798,628 | B1 | 9/2004 | Macbeth |
| 6,804,654 | B2 | 10/2004 | Kobylevsky et al. |
| 6,804,656 | B1 | 10/2004 | Rosenfeld et al. |
| 6,814,656 | B2 | 11/2004 | Rodriguez |
| 6,819,796 | B2 | 11/2004 | Hong et al. |
| 6,842,175 | B1 | 1/2005 | Schmalstieg et al. |
| 6,901,170 | B1 | 5/2005 | Terada et al. |
| 6,919,880 | B2 | 7/2005 | Morrison et al. |
| 6,943,774 | B2 | 9/2005 | Horiki |
| 6,950,534 | B2 | 9/2005 | Cohen et al. |
| 6,993,157 | B1 | 1/2006 | Oue et al. |
| 7,030,861 | B1 | 4/2006 | Westerman et al. |
| 7,071,914 | B1 | 7/2006 | Marks |
| 7,095,401 | B2 | 8/2006 | Liu et al. |
| 7,170,492 | B2 | 1/2007 | Bell |
| 7,213,707 | B2 | 5/2007 | Hubbs et al. |
| 7,215,828 | B2 | 5/2007 | Luo |
| 7,244,233 | B2 | 7/2007 | Krantz et al. |
| 7,257,237 | B1 | 8/2007 | Luck et al. |
| 7,259,873 | B2 | 8/2007 | Sikora et al. |
| 7,308,112 | B2 | 12/2007 | Fujimura et al. |
| 7,340,077 | B2 | 3/2008 | Gokturk et al. |
| 7,379,563 | B2 | 5/2008 | Shamaie |
| 7,519,223 | B2 | 4/2009 | Dehlin et al. |
| 7,532,206 | B2 | 5/2009 | Morrison et al. |
| 7,536,032 | B2 | 5/2009 | Bell |
| 7,542,586 | B2 | 6/2009 | Johnson |
| 7,598,942 | B2 | 10/2009 | Underkoffler et al. |
| 7,606,417 | B2 | 10/2009 | Steinberg et al. |
| 7,646,372 | B2 | 1/2010 | Marks et al. |
| 7,652,679 | B2 | 1/2010 | Aratani et al. |
| 7,656,372 | B2 | 2/2010 | Sato et al. |
| 7,665,041 | B2 | 2/2010 | Wilson et al. |
| 7,692,625 | B2 | 4/2010 | Morrison et al. |
| 7,831,932 | B2 | 11/2010 | Josephsoon et al. |
| 7,840,031 | B2 | 11/2010 | Albertson et al. |
| 7,849,421 | B2 | 12/2010 | Yoo et al. |
| 7,861,188 | B2 | 12/2010 | Josephsoon et al. |
| 7,874,917 | B2 | 1/2011 | Marks et al. |
| 7,886,229 | B2 | 2/2011 | Pachet |
| 7,886,236 | B2 | 2/2011 | Kolmykov-Zotov et al. |
| 7,940,885 | B2 | 5/2011 | Stanton et al. |
| 7,948,493 | B2 | 5/2011 | Klefenz et al. |
| 7,971,156 | B2 | 6/2011 | Albertson et al. |
| 7,980,885 | B2 | 7/2011 | Gattwinkel et al. |
| 8,064,704 | B2 | 11/2011 | Kim et al. |
| 8,085,339 | B2 | 12/2011 | Marks |
| 8,086,971 | B2 | 12/2011 | Radivojevic et al. |
| 8,111,239 | B2 | 2/2012 | Pryor et al. |
| 8,112,719 | B2 | 2/2012 | Hsu et al. |
| 8,144,121 | B2 | 3/2012 | Kitaura |
| 8,144,148 | B2 | 3/2012 | El Dokor et al. |
| 8,144,233 | B2 | 3/2012 | Fukuyama |
| 8,150,102 | B2 | 4/2012 | Zheng et al. |
| 8,166,421 | B2 | 4/2012 | Magal et al. |
| 8,185,176 | B2 | 5/2012 | Mangat et al. |
| 8,213,707 | B2 | 7/2012 | Li et al. |
| 8,230,852 | B2 | 7/2012 | Zhang et al. |
| 8,235,529 | B1 | 8/2012 | Raffle et al. |
| 8,244,233 | B2 | 8/2012 | Chang et al. |
| 8,289,162 | B2 | 10/2012 | Mooring et al. |
| 8,290,208 | B2 | 10/2012 | Kurtz et al. |
| 8,311,370 | B2 | 11/2012 | Ha et al. |
| 8,325,214 | B2 | 12/2012 | Hildreth |
| 8,373,654 | B2 | 2/2013 | Wang et al. |
| 8,379,101 | B2 | 2/2013 | Mathe et al. |
| 8,405,680 | B1 | 3/2013 | Cardoso Lopes et al. |
| 8,457,353 | B2 | 6/2013 | Reville et al. |
| 8,487,871 | B2 | 7/2013 | Langridge et al. |
| 8,488,246 | B2 | 7/2013 | Border et al. |
| 8,502,789 | B2 | 8/2013 | Tse et al. |
| 8,514,221 | B2 | 8/2013 | King et al. |
| 8,576,222 | B2 * | 11/2013 | Handley ............... G06F 3/0346 345/419 |
| 8,593,402 | B2 | 11/2013 | Stinson, III |
| 8,631,355 | B2 | 1/2014 | Murillo et al. |
| 8,638,989 | B2 | 1/2014 | Holz |
| 8,659,594 | B2 | 2/2014 | Kim et al. |
| 8,659,658 | B2 | 2/2014 | Vassigh et al. |
| 8,693,731 | B2 | 4/2014 | Holz et al. |
| 8,817,087 | B2 | 8/2014 | Weng et al. |
| 8,836,768 | B1 | 9/2014 | Rafii et al. |
| 8,842,084 | B2 | 9/2014 | Andersson et al. |
| 8,843,857 | B2 | 9/2014 | Berkes et al. |
| 8,854,433 | B1 * | 10/2014 | Rafii ..................... G06F 3/011 348/42 |
| 8,856,687 | B2 | 10/2014 | Robertson et al. |
| 8,872,914 | B2 | 10/2014 | Gobush |
| 8,881,051 | B2 | 11/2014 | Frey et al. |
| 8,922,590 | B1 | 12/2014 | Luckett, Jr. et al. |
| 8,930,852 | B2 | 1/2015 | Chen et al. |
| 8,933,876 | B2 | 1/2015 | Galor et al. |
| 8,942,881 | B2 | 1/2015 | Hobbs et al. |
| 8,963,867 | B2 | 2/2015 | Narita |
| 9,056,396 | B1 | 6/2015 | Linnell |
| 9,058,057 | B2 | 6/2015 | Matsuda |
| 9,128,552 | B2 | 9/2015 | Case et al. |
| 9,134,800 | B2 | 9/2015 | Maeda |
| 9,213,890 | B2 | 12/2015 | Huang et al. |
| 9,250,707 | B2 | 2/2016 | Choi et al. |

(56) References Cited

U.S. PATENT DOCUMENTS

| | | | |
|---|---|---|---|
| 9,256,282 B2 | 2/2016 | Latta et al. |
| 9,256,288 B2 | 2/2016 | Lee et al. |
| 9,299,013 B1 | 3/2016 | Curlander et al. |
| 9,383,895 B1 | 7/2016 | Vinayak et al. |
| 9,398,243 B2 | 7/2016 | Ryu et al. |
| 9,436,288 B2 | 9/2016 | Holz |
| 9,448,634 B1 | 9/2016 | Wakeford et al. |
| 9,552,673 B2 | 1/2017 | Hilliges et al. |
| 9,600,078 B2 | 3/2017 | Rafii |
| 9,983,697 B1 * | 5/2018 | Gribetz ................. G06T 19/006 |
| 10,042,512 B2 | 8/2018 | Robertson et al. |
| 10,126,823 B2 | 11/2018 | Nahman et al. |
| 10,275,039 B2 | 4/2019 | Cohen et al. |
| 10,281,987 B1 * | 5/2019 | Yang ........................ G06F 3/011 |
| 10,353,532 B1 | 7/2019 | Holz et al. |
| 10,901,518 B2 | 1/2021 | Cohen et al. |
| 10,921,949 B2 | 2/2021 | Holz et al. |
| 11,500,473 B2 | 11/2022 | Cohen et al. |
| 11,520,477 B2 * | 12/2022 | Bailey ................. G06F 3/04883 |
| 11,567,583 B2 | 1/2023 | Cohen et al. |
| 11,875,012 B2 | 1/2024 | Benson |
| 2002/0008211 A1 | 1/2002 | Kask |
| 2002/0041327 A1 | 4/2002 | Hildreth et al. |
| 2002/0064382 A1 | 5/2002 | Hildreth et al. |
| 2002/0105484 A1 | 8/2002 | Navab et al. |
| 2002/0140633 A1 | 10/2002 | Rafii et al. |
| 2003/0053658 A1 | 3/2003 | Pavlidis |
| 2003/0053659 A1 | 3/2003 | Pavlidis et al. |
| 2003/0081141 A1 | 5/2003 | Mazzapica |
| 2003/0085866 A1 | 5/2003 | Bimber et al. |
| 2003/0123703 A1 | 7/2003 | Pavlidis et al. |
| 2003/0138130 A1 | 7/2003 | Cohen et al. |
| 2003/0152289 A1 | 8/2003 | Luo |
| 2003/0202697 A1 | 10/2003 | Simard et al. |
| 2004/0046736 A1 | 3/2004 | Pryor et al. |
| 2004/0068409 A1 | 4/2004 | Tanaka et al. |
| 2004/0125228 A1 | 7/2004 | Dougherty |
| 2004/0145809 A1 | 7/2004 | Brenner |
| 2004/0193413 A1 | 9/2004 | Wilson et al. |
| 2004/0207597 A1 | 10/2004 | Marks |
| 2004/0212725 A1 | 10/2004 | Raskar |
| 2005/0068518 A1 | 3/2005 | Baney et al. |
| 2005/0071864 A1 | 3/2005 | Denoue et al. |
| 2005/0131607 A1 | 6/2005 | Breed |
| 2005/0168578 A1 | 8/2005 | Gobush |
| 2005/0236558 A1 | 10/2005 | Nabeshima et al. |
| 2005/0285845 A1 | 12/2005 | Dehlin |
| 2006/0017807 A1 | 1/2006 | Lee et al. |
| 2006/0035710 A1 | 2/2006 | Festejo et al. |
| 2006/0072105 A1 | 4/2006 | Wagner |
| 2006/0210112 A1 | 9/2006 | Cohen et al. |
| 2006/0239471 A1 | 10/2006 | Mao et al. |
| 2006/0252477 A1 | 11/2006 | Zalewski et al. |
| 2006/0290950 A1 | 12/2006 | Platt et al. |
| 2007/0042346 A1 | 2/2007 | Weller |
| 2007/0067798 A1 | 3/2007 | Wroblewski |
| 2007/0092118 A1 | 4/2007 | Tachibana |
| 2007/0120834 A1 | 5/2007 | Boillot |
| 2007/0126696 A1 * | 6/2007 | Boillot ................ G06F 3/04847 |
| | | 345/156 |
| 2007/0130547 A1 | 6/2007 | Boillot |
| 2007/0206719 A1 | 9/2007 | Suryanarayanan et al. |
| 2007/0216894 A1 | 9/2007 | Garcia et al. |
| 2007/0220444 A1 | 9/2007 | Sunday et al. |
| 2007/0236475 A1 | 10/2007 | Wherry |
| 2007/0238956 A1 | 10/2007 | Haras et al. |
| 2008/0005703 A1 | 1/2008 | Radivojevic et al. |
| 2008/0013826 A1 | 1/2008 | Hillis et al. |
| 2008/0056561 A1 | 3/2008 | Sawachi |
| 2008/0056752 A1 | 3/2008 | Denton et al. |
| 2008/0064954 A1 | 3/2008 | Adams et al. |
| 2008/0106746 A1 | 5/2008 | Shpunt et al. |
| 2008/0113756 A1 | 5/2008 | Williams et al. |
| 2008/0141181 A1 | 6/2008 | Ishigaki et al. |
| 2008/0174547 A1 | 7/2008 | Kanevsky et al. |
| 2008/0244465 A1 | 10/2008 | Kongqiao et al. |
| 2008/0273764 A1 | 11/2008 | Scholl |
| 2008/0278589 A1 | 11/2008 | Thorn |
| 2008/0304740 A1 | 12/2008 | Sun et al. |
| 2008/0319356 A1 | 12/2008 | Cain et al. |
| 2009/0031240 A1 | 1/2009 | Hildreth |
| 2009/0040215 A1 | 2/2009 | Afzulpurkar et al. |
| 2009/0070093 A1 * | 3/2009 | Nakanishi ............. A63F 13/211 |
| | | 703/22 |
| 2009/0085881 A1 | 4/2009 | Keam |
| 2009/0102840 A1 | 4/2009 | Li |
| 2009/0103780 A1 | 4/2009 | Nishihara et al. |
| 2009/0122146 A1 | 5/2009 | Zalewski et al. |
| 2009/0128564 A1 | 5/2009 | Okuno |
| 2009/0184920 A1 | 7/2009 | Francis |
| 2009/0203993 A1 | 8/2009 | Mangat et al. |
| 2009/0203994 A1 | 8/2009 | Mangat et al. |
| 2009/0217211 A1 | 8/2009 | Hildreth et al. |
| 2009/0228841 A1 | 9/2009 | Hildreth |
| 2009/0257623 A1 | 10/2009 | Tang et al. |
| 2009/0265671 A1 | 10/2009 | Sachs et al. |
| 2009/0274339 A9 | 11/2009 | Cohen et al. |
| 2009/0278917 A1 | 11/2009 | Dobbins et al. |
| 2009/0309710 A1 | 12/2009 | Kakinami |
| 2009/0323121 A1 | 12/2009 | Valkenburg et al. |
| 2010/0013662 A1 | 1/2010 | Stude |
| 2010/0020078 A1 | 1/2010 | Shpunt |
| 2010/0023015 A1 | 1/2010 | Park |
| 2010/0026963 A1 | 2/2010 | Faulstich |
| 2010/0027845 A1 | 2/2010 | Kim et al. |
| 2010/0046842 A1 | 2/2010 | Conwell |
| 2010/0050134 A1 | 2/2010 | Clarkson |
| 2010/0053164 A1 | 3/2010 | Imai et al. |
| 2010/0058252 A1 | 3/2010 | Ko |
| 2010/0066667 A1 | 3/2010 | MacDougall et al. |
| 2010/0083109 A1 | 4/2010 | Tse et al. |
| 2010/0092267 A1 * | 4/2010 | Najdovski ................ B25J 13/02 |
| | | 414/7 |
| 2010/0095206 A1 | 4/2010 | Kim |
| 2010/0118123 A1 | 5/2010 | Freedman et al. |
| 2010/0125815 A1 | 5/2010 | Wang et al. |
| 2010/0156676 A1 | 6/2010 | Mooring et al. |
| 2010/0158372 A1 | 6/2010 | Kim et al. |
| 2010/0177035 A1 | 7/2010 | Schowengerdt et al. |
| 2010/0177049 A1 | 7/2010 | Levy et al. |
| 2010/0177929 A1 | 7/2010 | Kurtz et al. |
| 2010/0199221 A1 | 8/2010 | Yeung et al. |
| 2010/0199232 A1 | 8/2010 | Mistry et al. |
| 2010/0201880 A1 | 8/2010 | Iwamura |
| 2010/0219934 A1 | 9/2010 | Matsumoto |
| 2010/0222102 A1 | 9/2010 | Rodriguez |
| 2010/0230494 A1 | 9/2010 | Okui |
| 2010/0231512 A1 | 9/2010 | Perez et al. |
| 2010/0234094 A1 | 9/2010 | Gagner et al. |
| 2010/0235786 A1 | 9/2010 | Maizels et al. |
| 2010/0261526 A1 | 10/2010 | Anderson et al. |
| 2010/0275159 A1 | 10/2010 | Matsubara et al. |
| 2010/0277411 A1 | 11/2010 | Yee et al. |
| 2010/0278393 A1 | 11/2010 | Snook et al. |
| 2010/0283739 A1 | 11/2010 | Zhang et al. |
| 2010/0296698 A1 | 11/2010 | Lien et al. |
| 2010/0302015 A1 | 12/2010 | Kipman et al. |
| 2010/0302357 A1 | 12/2010 | Hsu et al. |
| 2010/0303291 A1 | 12/2010 | Margolis |
| 2010/0306712 A1 | 12/2010 | Snook et al. |
| 2010/0306713 A1 | 12/2010 | Geisner et al. |
| 2010/0309097 A1 | 12/2010 | Raviv et al. |
| 2010/0315336 A1 | 12/2010 | Butler et al. |
| 2010/0321377 A1 | 12/2010 | Gay et al. |
| 2011/0007072 A1 | 1/2011 | Khan et al. |
| 2011/0018795 A1 | 1/2011 | Jang |
| 2011/0026765 A1 | 2/2011 | Ivanich et al. |
| 2011/0035666 A1 | 2/2011 | Geisner et al. |
| 2011/0043806 A1 | 2/2011 | Guetta et al. |
| 2011/0057875 A1 | 3/2011 | Shigeta et al. |
| 2011/0066984 A1 | 3/2011 | Li |
| 2011/0080470 A1 | 4/2011 | Kuno et al. |
| 2011/0090252 A1 | 4/2011 | Yoon et al. |
| 2011/0093820 A1 | 4/2011 | Zhang et al. |

(56)                References Cited

U.S. PATENT DOCUMENTS

| | | |
|---|---|---|
| 2011/0107216 A1 | 5/2011 | Bi |
| 2011/0107270 A1 | 5/2011 | Wang et al. |
| 2011/0115486 A1 | 5/2011 | Frohlich et al. |
| 2011/0119640 A1 | 5/2011 | Berkes et al. |
| 2011/0134112 A1 | 6/2011 | Koh et al. |
| 2011/0148875 A1 | 6/2011 | Kim et al. |
| 2011/0164029 A1 | 7/2011 | King et al. |
| 2011/0169726 A1 | 7/2011 | Holmdahl et al. |
| 2011/0173204 A1 | 7/2011 | Murillo et al. |
| 2011/0173235 A1 | 7/2011 | Aman et al. |
| 2011/0173574 A1 | 7/2011 | Clavin et al. |
| 2011/0181509 A1 | 7/2011 | Rautiainen et al. |
| 2011/0193939 A1 | 8/2011 | Vassigh et al. |
| 2011/0205151 A1 | 8/2011 | Newton et al. |
| 2011/0213664 A1 | 9/2011 | Osterhout et al. |
| 2011/0228978 A1 | 9/2011 | Chen et al. |
| 2011/0234840 A1 | 9/2011 | Klefenz et al. |
| 2011/0251896 A1 | 10/2011 | Impollonia et al. |
| 2011/0254765 A1 | 10/2011 | Brand |
| 2011/0267259 A1 | 11/2011 | Tidemand et al. |
| 2011/0286676 A1 | 11/2011 | El Dokor |
| 2011/0289455 A1 | 11/2011 | Reville et al. |
| 2011/0289456 A1 | 11/2011 | Reville et al. |
| 2011/0291925 A1 | 12/2011 | Israel et al. |
| 2011/0291988 A1 | 12/2011 | Bamji et al. |
| 2011/0296353 A1 | 12/2011 | Ahmed et al. |
| 2011/0299737 A1 | 12/2011 | Wang et al. |
| 2011/0304650 A1 | 12/2011 | Campillo et al. |
| 2011/0310007 A1 | 12/2011 | Margolis et al. |
| 2011/0314427 A1 | 12/2011 | Sundararajan |
| 2012/0001938 A1 | 1/2012 | Sandberg |
| 2012/0038549 A1 | 2/2012 | Mandella et al. |
| 2012/0038637 A1 | 2/2012 | Marks |
| 2012/0050157 A1 | 3/2012 | Latta et al. |
| 2012/0053015 A1 | 3/2012 | Esaki et al. |
| 2012/0062489 A1* | 3/2012 | Andersson .......... G06F 3/04883 345/173 |
| 2012/0062558 A1 | 3/2012 | Lee et al. |
| 2012/0065499 A1 | 3/2012 | Chono |
| 2012/0068914 A1 | 3/2012 | Jacobsen et al. |
| 2012/0069168 A1 | 3/2012 | Huang et al. |
| 2012/0079420 A1 | 3/2012 | Arriola |
| 2012/0079421 A1 | 3/2012 | Arriola |
| 2012/0086729 A1 | 4/2012 | Baseley et al. |
| 2012/0087543 A1* | 4/2012 | Choi ...................... G06V 40/11 382/103 |
| 2012/0105613 A1 | 5/2012 | Weng et al. |
| 2012/0113223 A1 | 5/2012 | Hilliges et al. |
| 2012/0117514 A1* | 5/2012 | Kim ...................... G06F 3/017 345/158 |
| 2012/0121185 A1 | 5/2012 | Zavesky |
| 2012/0127070 A1 | 5/2012 | Ryoo et al. |
| 2012/0150650 A1 | 6/2012 | Zahand |
| 2012/0151421 A1 | 6/2012 | Clarkson |
| 2012/0157203 A1 | 6/2012 | Latta et al. |
| 2012/0162117 A1 | 6/2012 | Wilson et al. |
| 2012/0162214 A1 | 6/2012 | Chavez et al. |
| 2012/0167134 A1 | 6/2012 | Hendricks et al. |
| 2012/0170800 A1 | 7/2012 | da Silva Frazao et al. |
| 2012/0179970 A1 | 7/2012 | Hayes |
| 2012/0194517 A1 | 8/2012 | Izadi et al. |
| 2012/0204133 A1 | 8/2012 | Guendelman et al. |
| 2012/0206339 A1 | 8/2012 | Dahl |
| 2012/0218263 A1 | 8/2012 | Meier et al. |
| 2012/0223882 A1 | 9/2012 | Galor et al. |
| 2012/0223959 A1 | 9/2012 | Lengeling |
| 2012/0250936 A1 | 10/2012 | Holmgren |
| 2012/0257035 A1 | 10/2012 | Larsen |
| 2012/0268410 A1 | 10/2012 | King et al. |
| 2012/0309516 A1 | 12/2012 | Langridge et al. |
| 2012/0313848 A1 | 12/2012 | Galor et al. |
| 2012/0317510 A1* | 12/2012 | Noda .................. G06F 3/04815 715/782 |
| 2012/0320080 A1 | 12/2012 | Giese et al. |
| 2012/0322527 A1 | 12/2012 | Aoki et al. |
| 2012/0324332 A1 | 12/2012 | Zaragoza et al. |
| 2013/0007616 A1 | 1/2013 | Bell et al. |
| 2013/0016896 A1 | 1/2013 | Seida |
| 2013/0019204 A1 | 1/2013 | Kotler et al. |
| 2013/0033483 A1 | 2/2013 | Im et al. |
| 2013/0055120 A1 | 2/2013 | Galor et al. |
| 2013/0127980 A1 | 5/2013 | Haddick et al. |
| 2013/0135218 A1 | 5/2013 | Jain et al. |
| 2013/0167092 A1 | 6/2013 | Yu et al. |
| 2013/0169594 A1 | 7/2013 | Yi et al. |
| 2013/0182897 A1 | 7/2013 | Holz |
| 2013/0182902 A1 | 7/2013 | Holz |
| 2013/0191911 A1 | 7/2013 | Dellinger et al. |
| 2013/0194238 A1 | 8/2013 | Sakai |
| 2013/0207963 A1 | 8/2013 | Stirbu et al. |
| 2013/0222640 A1 | 8/2013 | Baek et al. |
| 2013/0239059 A1 | 9/2013 | Chen et al. |
| 2013/0246967 A1 | 9/2013 | Wheeler et al. |
| 2013/0278499 A1 | 10/2013 | Anderson |
| 2013/0293454 A1 | 11/2013 | Jeon et al. |
| 2013/0293683 A1 | 11/2013 | Zhou et al. |
| 2013/0300788 A1 | 11/2013 | Konno et al. |
| 2013/0307935 A1 | 11/2013 | Rappel et al. |
| 2013/0321265 A1 | 12/2013 | Bychkov et al. |
| 2013/0321401 A1 | 12/2013 | Piemonte et al. |
| 2013/0335318 A1 | 12/2013 | Nagel et al. |
| 2013/0342459 A1 | 12/2013 | Karakotsios et al. |
| 2013/0342572 A1* | 12/2013 | Poulos ................. G02B 27/017 345/633 |
| 2014/0015831 A1* | 1/2014 | Kim ....................... G06F 3/0346 345/419 |
| 2014/0028716 A1* | 1/2014 | Yeh ......................... G06F 3/017 345/633 |
| 2014/0063055 A1 | 3/2014 | Osterhout et al. |
| 2014/0089849 A1 | 3/2014 | Choi et al. |
| 2014/0095119 A1 | 4/2014 | Lee et al. |
| 2014/0098018 A1 | 4/2014 | Kim et al. |
| 2014/0104206 A1 | 4/2014 | Anderson |
| 2014/0104274 A1* | 4/2014 | Hilliges ................. G06F 3/017 345/424 |
| 2014/0113507 A1 | 4/2014 | Vanzetto |
| 2014/0118255 A1 | 5/2014 | Billerbeck |
| 2014/0125813 A1 | 5/2014 | Holz |
| 2014/0134733 A1 | 5/2014 | Wu et al. |
| 2014/0137039 A1 | 5/2014 | Kroeger et al. |
| 2014/0139641 A1 | 5/2014 | Holz |
| 2014/0157135 A1 | 6/2014 | Lee et al. |
| 2014/0157209 A1 | 6/2014 | Dalal et al. |
| 2014/0177913 A1 | 6/2014 | Holz |
| 2014/0192206 A1 | 7/2014 | Holz |
| 2014/0201666 A1 | 7/2014 | Bedikian et al. |
| 2014/0201674 A1 | 7/2014 | Holz |
| 2014/0201683 A1 | 7/2014 | Holz |
| 2014/0201684 A1 | 7/2014 | Holz |
| 2014/0201690 A1 | 7/2014 | Holz |
| 2014/0222385 A1 | 8/2014 | Muenster et al. |
| 2014/0223385 A1 | 8/2014 | Ton et al. |
| 2014/0225918 A1 | 8/2014 | Mittal et al. |
| 2014/0240215 A1 | 8/2014 | Tremblay et al. |
| 2014/0240225 A1 | 8/2014 | Eilat |
| 2014/0247695 A1 | 9/2014 | Vangeel et al. |
| 2014/0248950 A1 | 9/2014 | Tosas Bautista |
| 2014/0249961 A1 | 9/2014 | Zagel et al. |
| 2014/0258880 A1 | 9/2014 | Holm et al. |
| 2014/0267019 A1 | 9/2014 | Kuzmin |
| 2014/0282282 A1 | 9/2014 | Holz |
| 2014/0304665 A1 | 10/2014 | Holz |
| 2014/0306903 A1 | 10/2014 | Huang et al. |
| 2014/0307920 A1 | 10/2014 | Holz |
| 2014/0317576 A1 | 10/2014 | Song et al. |
| 2014/0327782 A1 | 11/2014 | Mangla et al. |
| 2014/0333560 A1 | 11/2014 | Kramer et al. |
| 2014/0340311 A1 | 11/2014 | Holz |
| 2014/0344731 A1 | 11/2014 | Holz |
| 2014/0344762 A1 | 11/2014 | Grasset et al. |
| 2014/0364209 A1 | 12/2014 | Perry |
| 2014/0375947 A1 | 12/2014 | Park et al. |
| 2015/0003673 A1 | 1/2015 | Fletcher |
| 2015/0016777 A1 | 1/2015 | Abovitz et al. |

(56) References Cited

U.S. PATENT DOCUMENTS

| | | | |
|---|---|---|---|
| 2015/0026646 A1 | 1/2015 | Ahn et al. | |
| 2015/0029218 A1 | 1/2015 | Williams et al. | |
| 2015/0054729 A1 | 2/2015 | Minnen et al. | |
| 2015/0084864 A1 | 3/2015 | Geiss et al. | |
| 2015/0084989 A1 | 3/2015 | Laughlin et al. | |
| 2015/0097772 A1 | 4/2015 | Starner | |
| 2015/0103004 A1 | 4/2015 | Cohen et al. | |
| 2015/0106767 A1 | 4/2015 | Abercrombie et al. | |
| 2015/0116214 A1 | 4/2015 | Grunnet-Jepsen et al. | |
| 2015/0135132 A1 | 5/2015 | Josephson | |
| 2015/0153832 A1 | 6/2015 | Krepec | |
| 2015/0153833 A1* | 6/2015 | Pinault | G06F 3/017 |
| | | | 345/156 |
| 2015/0160348 A1 | 6/2015 | Zweigle et al. | |
| 2015/0169076 A1 | 6/2015 | Cohen et al. | |
| 2015/0169175 A1 | 6/2015 | Cohen et al. | |
| 2015/0169176 A1 | 6/2015 | Cohen et al. | |
| 2015/0205358 A1 | 7/2015 | Lyren | |
| 2015/0205400 A1 | 7/2015 | Hwang et al. | |
| 2015/0206321 A1 | 7/2015 | Scavezze et al. | |
| 2015/0220150 A1 | 8/2015 | Plagemann et al. | |
| 2015/0220776 A1 | 8/2015 | Cronholm | |
| 2015/0227795 A1 | 8/2015 | Starner et al. | |
| 2015/0234569 A1 | 8/2015 | Hess | |
| 2015/0243078 A1 | 8/2015 | Watson et al. | |
| 2015/0253574 A1 | 9/2015 | Thurber | |
| 2015/0258432 A1 | 9/2015 | Stafford et al. | |
| 2015/0260990 A1 | 9/2015 | Ueno et al. | |
| 2015/0277583 A1 | 10/2015 | Kasahara et al. | |
| 2015/0309629 A1 | 10/2015 | Amariutei et al. | |
| 2015/0338998 A1 | 11/2015 | Chathoth et al. | |
| 2015/0346820 A1 | 12/2015 | Poupyrev et al. | |
| 2015/0355827 A1 | 12/2015 | Van Der Westhuizen et al. | |
| 2015/0379770 A1 | 12/2015 | Haley, Jr. et al. | |
| 2016/0026253 A1 | 1/2016 | Bradski et al. | |
| 2016/0034039 A1 | 2/2016 | Maeda et al. | |
| 2016/0093105 A1 | 3/2016 | Rimon et al. | |
| 2016/0154241 A1 | 6/2016 | Alhashim | |
| 2016/0210781 A1 | 7/2016 | Thomas et al. | |
| 2016/0239080 A1 | 8/2016 | Marcolina et al. | |
| 2016/0328022 A1 | 11/2016 | Holz | |
| 2017/0018119 A1 | 1/2017 | Kim et al. | |
| 2017/0094184 A1 | 3/2017 | Gao et al. | |
| 2017/0287214 A1 | 10/2017 | Anderson et al. | |
| 2017/0324841 A1 | 11/2017 | Clement et al. | |
| 2017/0357407 A1 | 12/2017 | Palmaro | |
| 2018/0239137 A1 | 8/2018 | Boger et al. | |
| 2018/0239515 A1 | 8/2018 | Cooper et al. | |
| 2018/0259406 A1 | 9/2018 | Waldman | |
| 2018/0285636 A1 | 10/2018 | Fei et al. | |
| 2019/0155384 A1 | 5/2019 | Fajt et al. | |
| 2019/0286252 A1 | 9/2019 | Beach et al. | |

FOREIGN PATENT DOCUMENTS

| | | | | | |
|---|---|---|---|---|---|
| CN | 102135796 A | 7/2011 | | | |
| CN | 102184020 A | 9/2011 | | | |
| CN | 102216883 A | 10/2011 | | | |
| CN | 102262438 A | 11/2011 | | | |
| CN | 102402290 A | 4/2012 | | | |
| CN | 102439538 A | 5/2012 | | | |
| CN | 102902355 A | 1/2013 | | | |
| CN | 103493106 A | 1/2014 | | | |
| CN | 105308536 A | 2/2016 | | | |
| DE | 11 2014 000 441 T5 | 10/2015 | | | |
| EP | 1477924 A2 | 11/2004 | | | |
| EP | 2369443 A2 | 9/2011 | | | |
| EP | 2378488 A2 | 10/2011 | | | |
| GB | 2419433 A | 4/2006 | | | |
| JP | 2002512069 A | 4/2002 | | | |
| KR | 20090006825 A | 1/2009 | | | |
| WO | 2010148155 A2 | 12/2010 | | | |
| WO | WO-2013169842 A2 * | 11/2013 | | | G06F 1/32 |
| WO | 2014113507 A1 | 7/2014 | | | |

OTHER PUBLICATIONS

Bergamasco, Massimo, P. Degl'Innocenti, and D. Bucciarelli. "A realistic approach for grasping and moving virtual objects." Proceedings of IEEE/RSJ International Conference on Intelligent Robots and Systems (IROS'94). vol. 1. IEEE, 1994. (Year: 1994).*

Buchmann, Volkert, et al. "FingARtips: gesture based direct manipulation in Augmented Reality." Proceedings of the 2nd international conference on Computer graphics and interactive techniques in Australasia and South East Asia. 2004. (Year: 2004).*

U.S. Appl. No. 14/527,742—Office Action dated Apr. 12, 2017, 20 pages.

Hurst et al. "Gesture-Based Interaction via Finger Tracking For Mobile Augmented Reality", Multimedia Tools and Applications 62:233-258, Jan. 18, 2012.

Schlattmann et al., "3D Interaction Techniques for 6 DOF Markerless Hand-Tracking", 2009, 10 pages.

Zachmann, Gabriel, "Virtual Reality in Assembly Simulation-Collision Detection, Simulation Algorithms, and Interaction Techniques", May 29, 2000, 20 pages.

U.S. Appl. No. 14/527,742—Response to Office Action dated Apr. 12, 2017, filed Jul. 12, 2017, 20 pages.

U.S. Appl. No. 14/527,742—Supplemental Response to Office Action dated Apr. 12, 2017, filed Aug. 17, 2017, 20 pages.

U.S. Appl. No. 14/530,364—Office Action dated Mar. 13, 2017, 35 pages.

Melax, S., et al., "Dynamics Based 3D Skeletal Hand Tracking", Proceedings of Graphics Interface 2013. Canadian Information Processing Society, 2013. 8 pages.

Montgomery, K., et al. "Spring: A General Framework for Collaborative, Real-Time Surgical Simulation." Studies in health technology and informatics(2002), 8 pages.

Wang, R., et al. "6D Hands: Markerless Hand-Tracking For Computer Aided Design" Proceedings of the 24th Annual ACM Symposium on User Interface Software and Technology. ACM, 2011, 8 pages.

Wang, X., et al. "Tracking of Deformable Human Hand in Real Time as Continuous Input for Gesture-Based Interaction", Proceedings of the 12th International Conference on Intelligent User Interfaces. ACM, 2007, 8 pages.

U.S. Appl. No. 14/530,364—Response to Office Action dated Mar. 13, 2017, filed May 31, 2017, 12 pages.

U.S. Appl. No. 14/527,742—Office Action dated Nov. 2, 2017, 16 pages.

U.S. Appl. No. 14/530,364—Office Action dated Sep. 8, 2017, 19 pages.

Izadi, Shahram, et al. "KinectFusion: Real-Time 3D Reconstruction and Interaction Using a Moving Depth Camera" Proceedings of the 24th annual ACM symposium on User interface software and technology, Oct. 16-19, 2011, 10 pages.

U.S. Appl. No. 14/527,742—Office Action dated Jan. 18, 2018, 20 pages.

U.S. Appl. No. 14/527,742—Response to Office Action dated Nov. 2, 2017 filed Dec. 20, 2017, 13 pages.

U.S. Appl. No. 14/541,078—Notice of Allowance dated May 6, 2019, 13 pages.

U.S. Appl. No. 14/527,742—Supplemental Response to Office Action dated Apr. 12, 2017, filed Aug. 17, 2017, 20 pages.

Zadi, Shahram, et al. "KinectFusion: Real-Time 3D Reconstruction and Interaction Using a Moving Depth Camera" Proceedings of the 24th annual ACM symposium on User interface software and technology, Oct. 16-19, 2011, 10 pages.

U.S. Appl. No. 16/228,521—Office Action dated Nov. 22, 2019, 13 pages.

U.S. Appl. No. 16/228,521—Response to Office Action dated Nov. 22, 2019, filed Feb. 24, 2020, 12 pages.

U.S. Appl. No. 16/228,521—Notice of Allowance dated Apr. 7, 2020, 16 pages.

U.S. Appl. No. 16/000,768—Office Action dated Apr. 8, 2021, 37 pages.

(56)                   References Cited

OTHER PUBLICATIONS

Liang Hui, Junsong Yuan, and Daniel Thalmann. "3D fingertip and palm tracking in depth image sequences." Proceedings of the 20th ACM international conference on Multimedia. 2012. (Year: 2012).
U.S. Appl. No. 16/000,768 Notice of Allowance, dated Jul. 22, 2021, 10 pages.
Anonymous, Multilateration, Wikipedia, retrieved on Aug. 19, 2022, 5 pages. Retrieved from the internet [URL: https://en.wikipedia.org/w/index.php?title=Multilateration&oldid=523281858].
Anonymous, Kabsch Algorithm, Wikipedia, retrieved on Aug. 21, 2022, 4 pages. Retrieved from the internet [URL: https://en.wikipedia.org/wiki/Kabsch_algorithm].
Anonymous, Euclidean Group, Wikipedia, retrieved on Aug. 21, 2022, 7 pages. Retrieved from the internet [URL: http://en.wikipedia.org/wiki/Euclidean_group].
Anonymous, Affine Transformation, Wikipedia, retrieved on Aug. 21, 2022, 8 pages. Retrieved from the internet [URL—https://en.wikipedia.org/wiki/Affine_transformation].
Anonymous, Rotation Matrix, Wikipedia, retrieved on Aug. 21, 2022, 26 pages. retrieved from the internet [URL—https://en.wikipedia.org/wiki/Rotation_matrix].
Anonymous, 3D Rotation, Wikipedia, retrieved on Aug. 21, 2022, 10 pages. Retrieved from the internet [URL: https://en.wikipedia.org/wiki/3D_rotation_group].
Anonymous, Transformation Matrix, Wikipedia, retrieved on Aug. 21, 2022, 10 pages. Retrieved from the internet [URL: https://en.wikipedia.org/wiki/Transformation_matrix].
Anonymous, Axis-angle representation, Wikipedia, retrieved on Aug. 21, 2022, 6 pages. Retrieved from the internet [URL: https://en.wikipedia.org/wiki/Axis%E2%80%93angle_representation].
Anonymous, Visual odometry, Wikipedia, retrieved on Aug. 21, 2022, 6 pages. Retrieved from the internet [URL: https://en.wikipedia.org/wiki/Visual_odometry].
Anonymous, Optical flow, Wikipedia, retrieved on Aug. 21, 2022, 7 pages. Retrieved from the internet [URL—https://en.wikipedia.org/wiki/Optical_flow].
Korida, et al., "An Interactive 3D Interface for a Virtual Ceramic Art Work Environment", published on Virtual Systems and MultiMedia, 1997. VSMM '97. Proceedings., International Conference (Sep. 10, 1997), 8 pages.

Wikipedia, "Transformation matrix", published Sep. 6, 2014, [online] https://web.archive.org/web/20140906170238/http://en.wikipedia.org/wiki/Transformation_matrix (Year: 2014), 8 pages.
Bowman, Doug A., et al., "3D User Interfaces: New Directions and Perspectives", Nov./Dec. 2008, IEEE Computer Society 17pages.
Pavlovic et al., Visual Interpretation of Hand Gestures for Human-Computer Interaction: A Review, IEEE Trans. Pattern Analysis and Machine Intelligence, vol. 19, No. 7, pp. 677-695, dated Jul. 1997, 19 pages.
Sato, Toshiki, et al., "Implementation and Evaluations of Vision based Finger Flicking Gesture Recognition for Tabletops", Oct. 2008, 8 pages.
Steinicke, Frank, et al., "Grab and Throw Metaphor: Adapting Desktop based Interaction Paradigms to Virtual Reality", Mar. 25-26, 2006_4pages.
Wu et al., Vision-Based Gesture Recognition: A Review, in Gesture-Based Communication in Human-Computer Interaction, Springer, Mar. 1999, 13 pages, pp. 103-115.
PCT/US2016/017632—International Search Report and Written Opinion dated Jul. 27, 2016, 13 pages.
PCT/US2016/017632—International Preliminary Report on Patentability dated Aug. 24, 2017, 12 pages.
CN 201680018136.2—Response to Second Office Action dated Sep. 10, 2020, as filed Nov. 25, 2020, 13 pages including English translation.
CN 201680018136.2—Second Office Action dated Sep. 10, 2020, 12 pages.
CN 201680018136.2—First Office Action dated Dec. 23, 2019, 12 pages including English translation.
Bullock, Jamie, Tychonas Michailidis, and Matthieu Poyade. "Towards a live interface for direct manipulation of spatial audio." Proceedings of the international conference on live interfaces. Sussex: Reframe Books, 2016 (Year: 2016).
CN 201680018136.2—Notice of Allowance dated Dec. 11, 2020, 2 pages.
CN 201680018136.2—Response to First Office Action dated Dec. 23, 2019, as filed May 7, 2020, 22 pages including English translation.

* cited by examiner

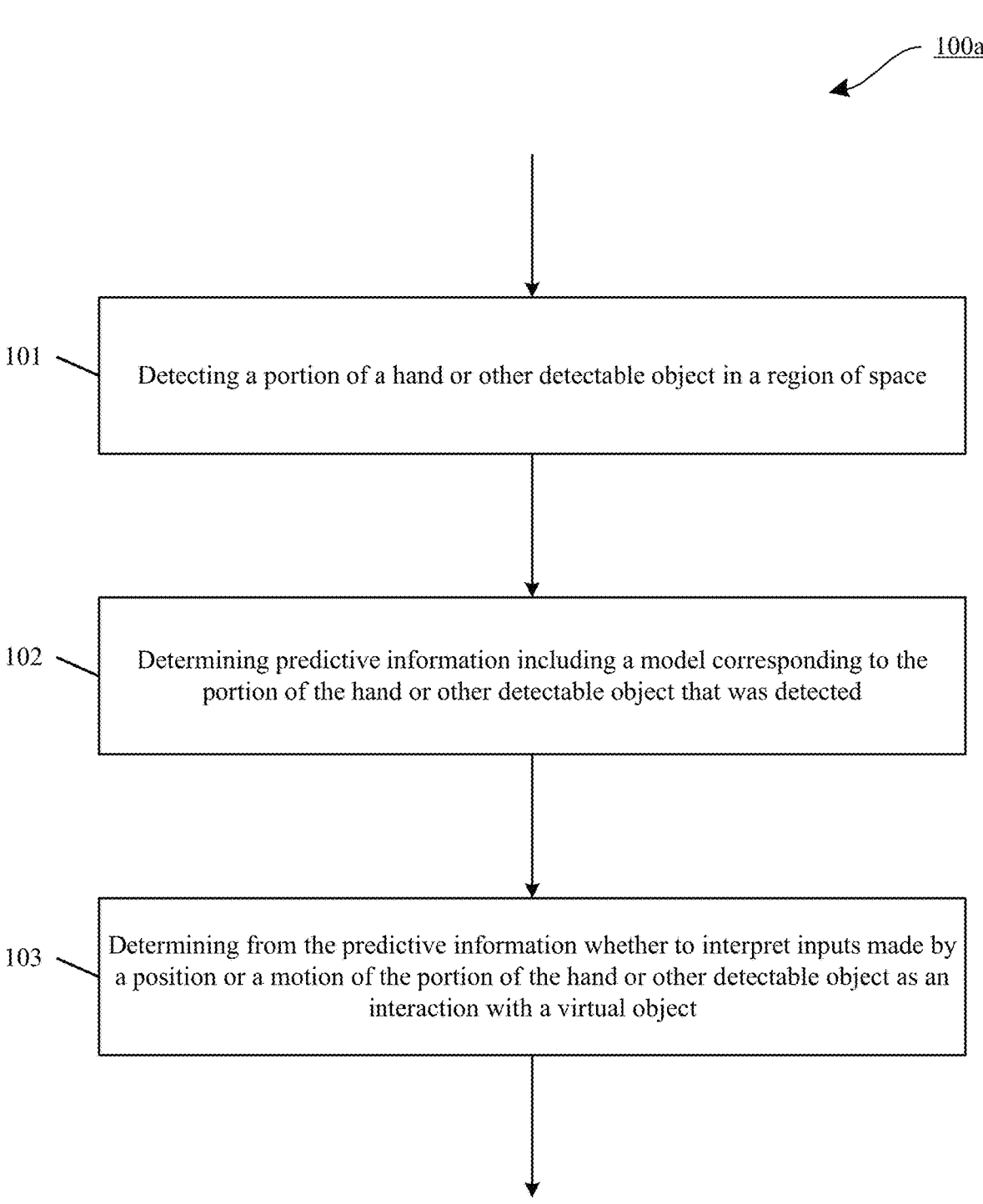

101  Detecting a portion of a hand or other detectable object in a region of space 102  Determining predictive information including a model corresponding to the portion of the hand or other detectable object that was detected 103  Determining from the predictive information whether to interpret inputs made by a position or a motion of the portion of the hand or other detectable object as an interaction with a virtual object

FIG. 1A

103a

111
Determining a manipulation point from a plurality of calculation points defined for the model at points corresponding to features of interest located on the hand or other detectable object being modeled by the predictive information 112
Determining a strength for the manipulation point 114
Determining based at least in part upon the strength, whether the portion of the hand or other detectable object as modeled by the predictive information has selected the virtual object 116
Last virtual object?

Yes

No

RETURN

Fitting the model to an observable pose of the portion of the hand or other detectable object and providing based at least in part upon the model as fit, one or more manipulation types appropriate to the observable pose

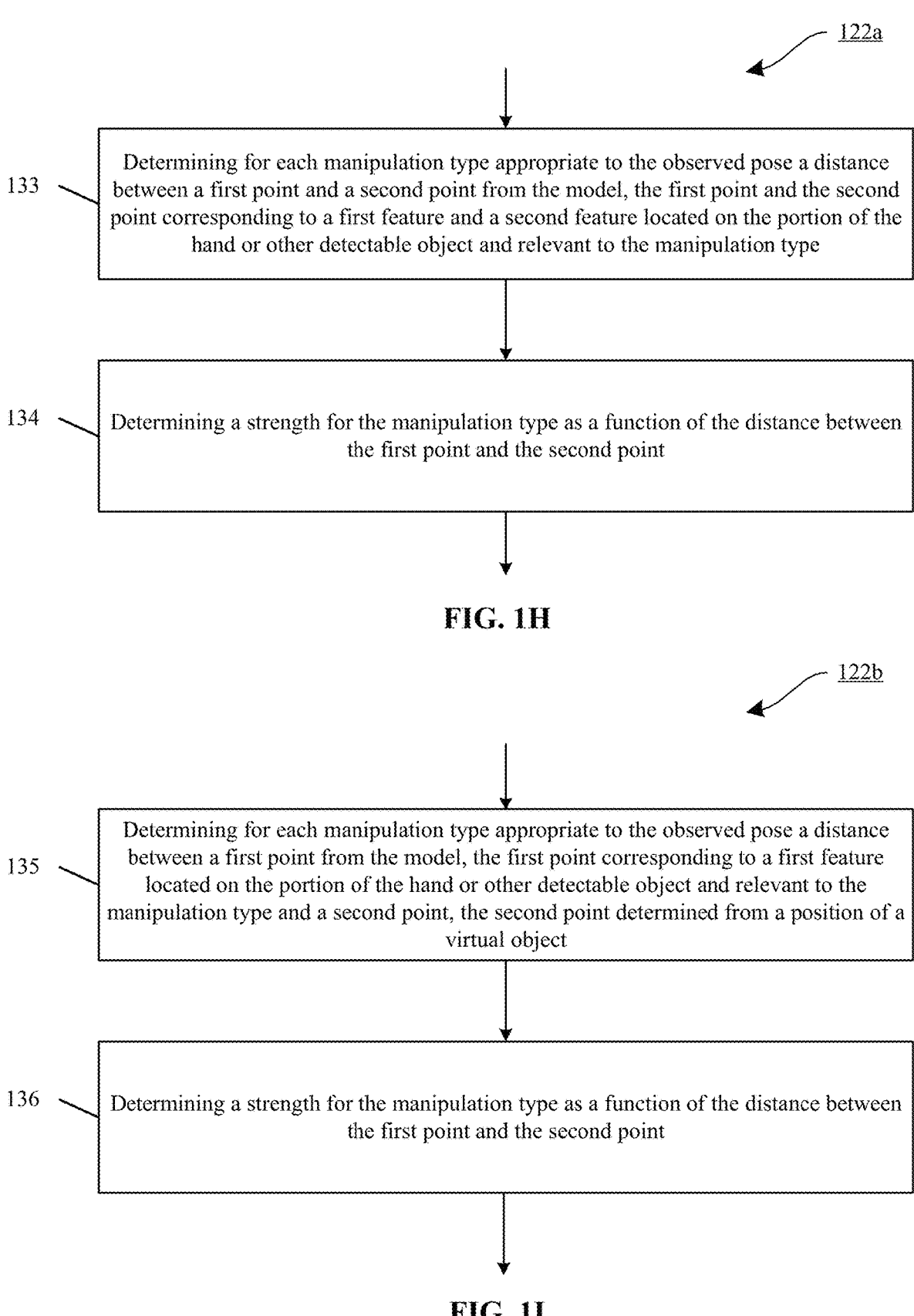

*122a*

133 — Determining for each manipulation type appropriate to the observed pose a distance between a first point and a second point from the model, the first point and the second point corresponding to a first feature and a second feature located on the portion of the hand or other detectable object and relevant to the manipulation type 134 — Determining a strength for the manipulation type as a function of the distance between the first point and the second point

135 — Determining for each manipulation type appropriate to the observed pose a distance between a first point from the model, the first point corresponding to a first feature located on the portion of the hand or other detectable object and relevant to the manipulation type and a second point, the second point determined from a position of a virtual object 136 — Determining a strength for the manipulation type as a function of the distance between the first point and the second point

FIG. 1I

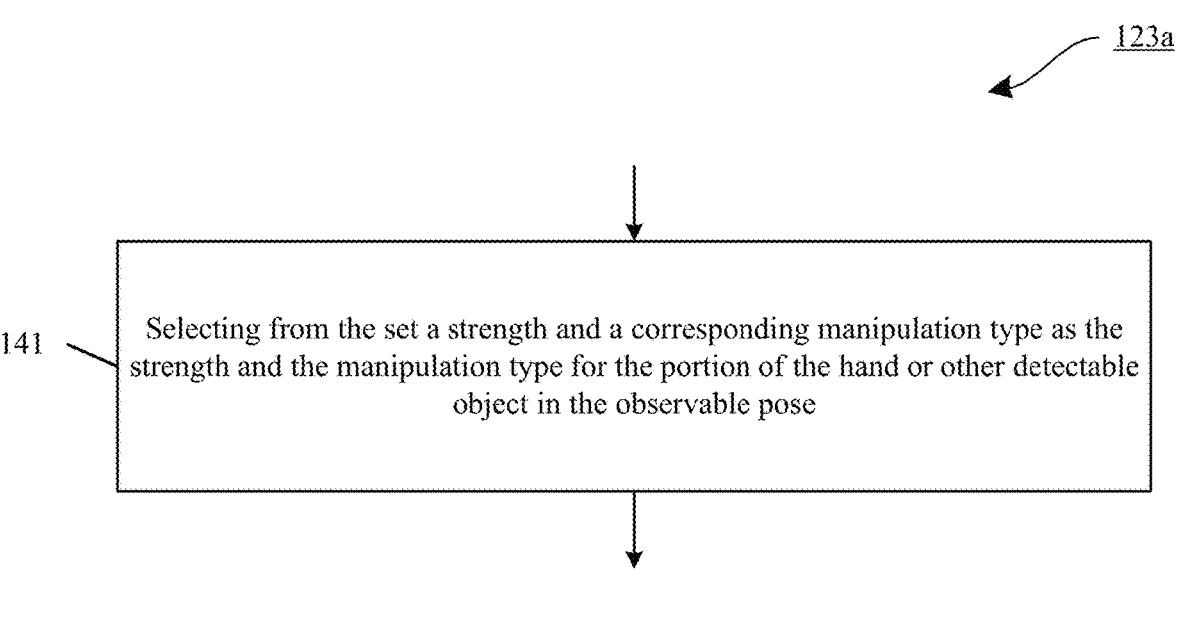

141 — Selecting from the set a strength and a corresponding manipulation type as the strength and the manipulation type for the portion of the hand or other detectable object in the observable pose

FIG. 1J

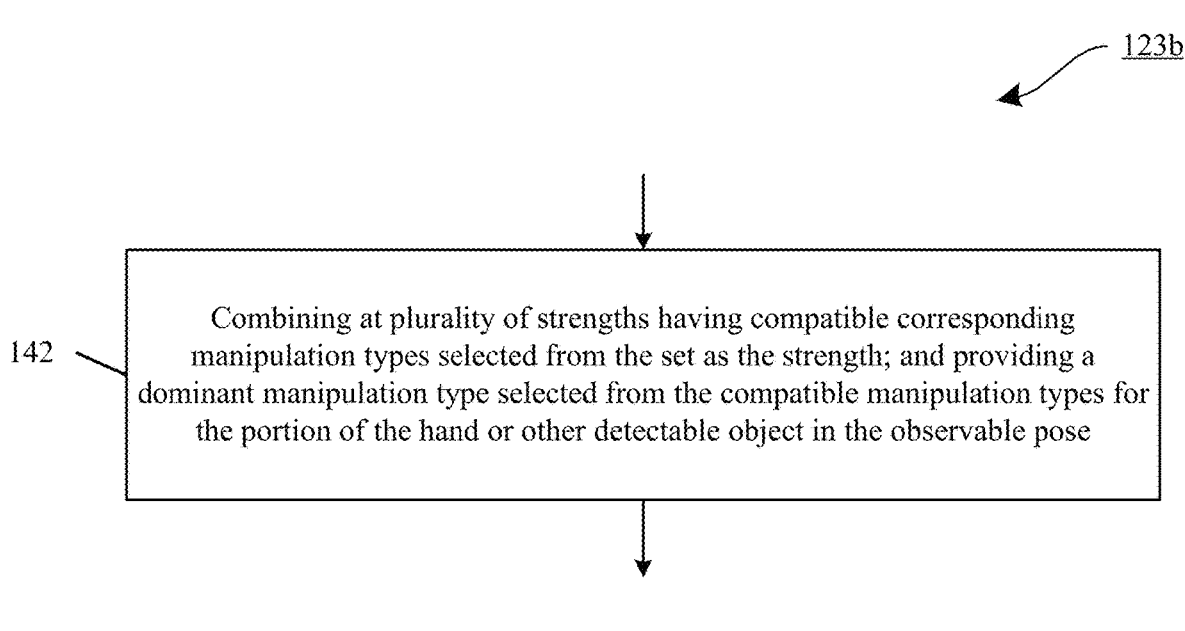

142 — Combining at plurality of strengths having compatible corresponding manipulation types selected from the set as the strength; and providing a dominant manipulation type selected from the compatible manipulation types for the portion of the hand or other detectable object in the observable pose

FIG. 1K

Manipulation Point "Grab" Example 202

Two Handed Interaction Example 204

Manipulation Point "Pinch" Example 201

Single Handed Interaction Example 203

603

606

602

605

601

604

Attributes 197-5:
- Attach Points
- Neighbors
- Size (length, width, depth)
- Rigidity / flexibility
- Torsional rotation
- Degrees of freedom of motion
- Others Models 197B-1, 197B-2:
- User portions (hand, face)
- Objects (styli, tools)
Model Components (shapes):
- 2D model portions that sum to 3D
Model Component Attributes:
- Degrees of freedom of motion
- Torsional Rotation
- Attach Points
- Neighbors
- Size (length, width, depth)
- Rigidity / flexibility
- Others

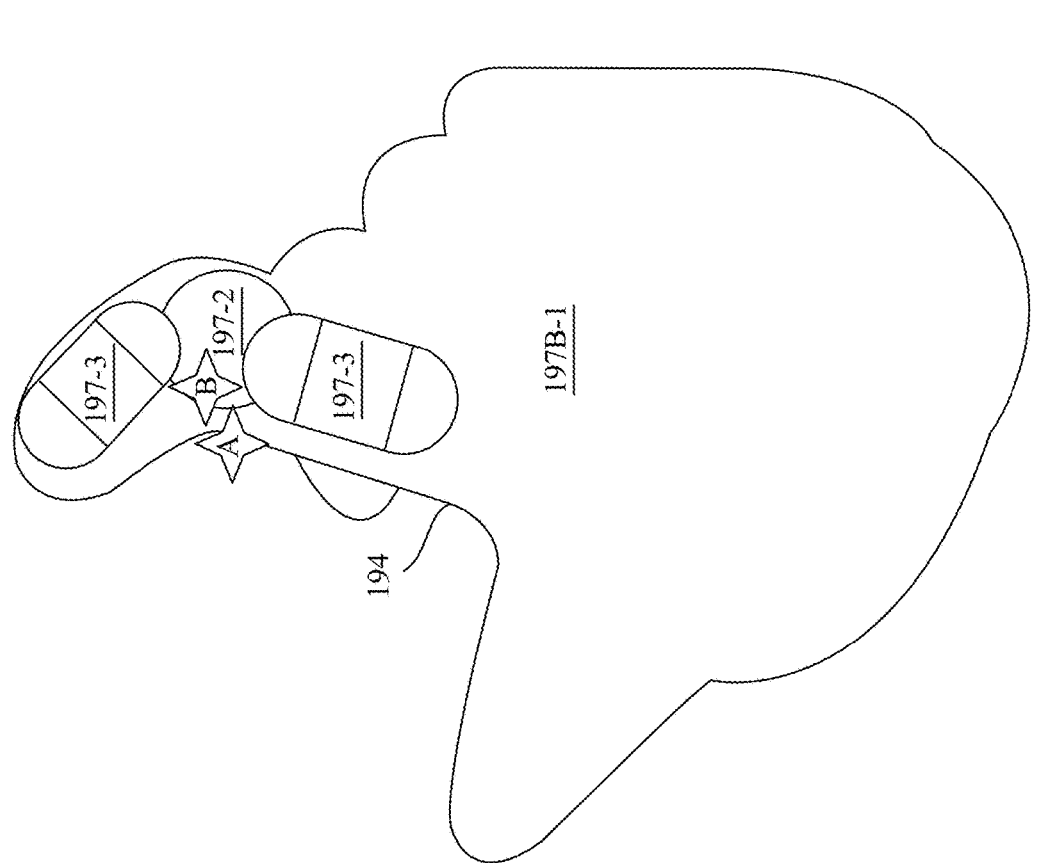

FIG. 8-1

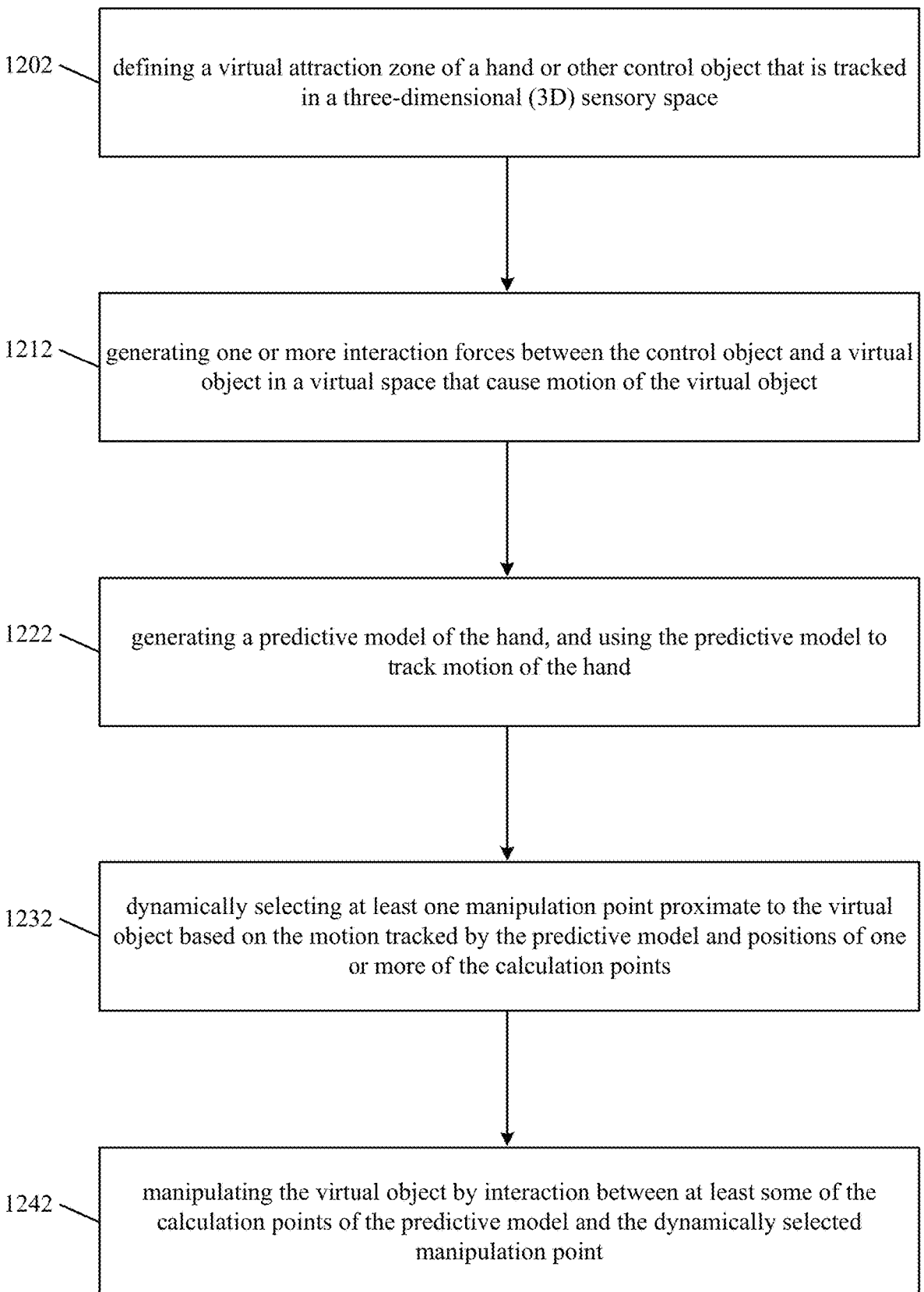

1202 — defining a virtual attraction zone of a hand or other control object that is tracked in a three-dimensional (3D) sensory space 1212 — generating one or more interaction forces between the control object and a virtual object in a virtual space that cause motion of the virtual object 1222 — generating a predictive model of the hand, and using the predictive model to track motion of the hand 1232 — dynamically selecting at least one manipulation point proximate to the virtual object based on the motion tracked by the predictive model and positions of one or more of the calculation points 1242 — manipulating the virtual object by interaction between at least some of the calculation points of the predictive model and the dynamically selected manipulation point

FIG. 12

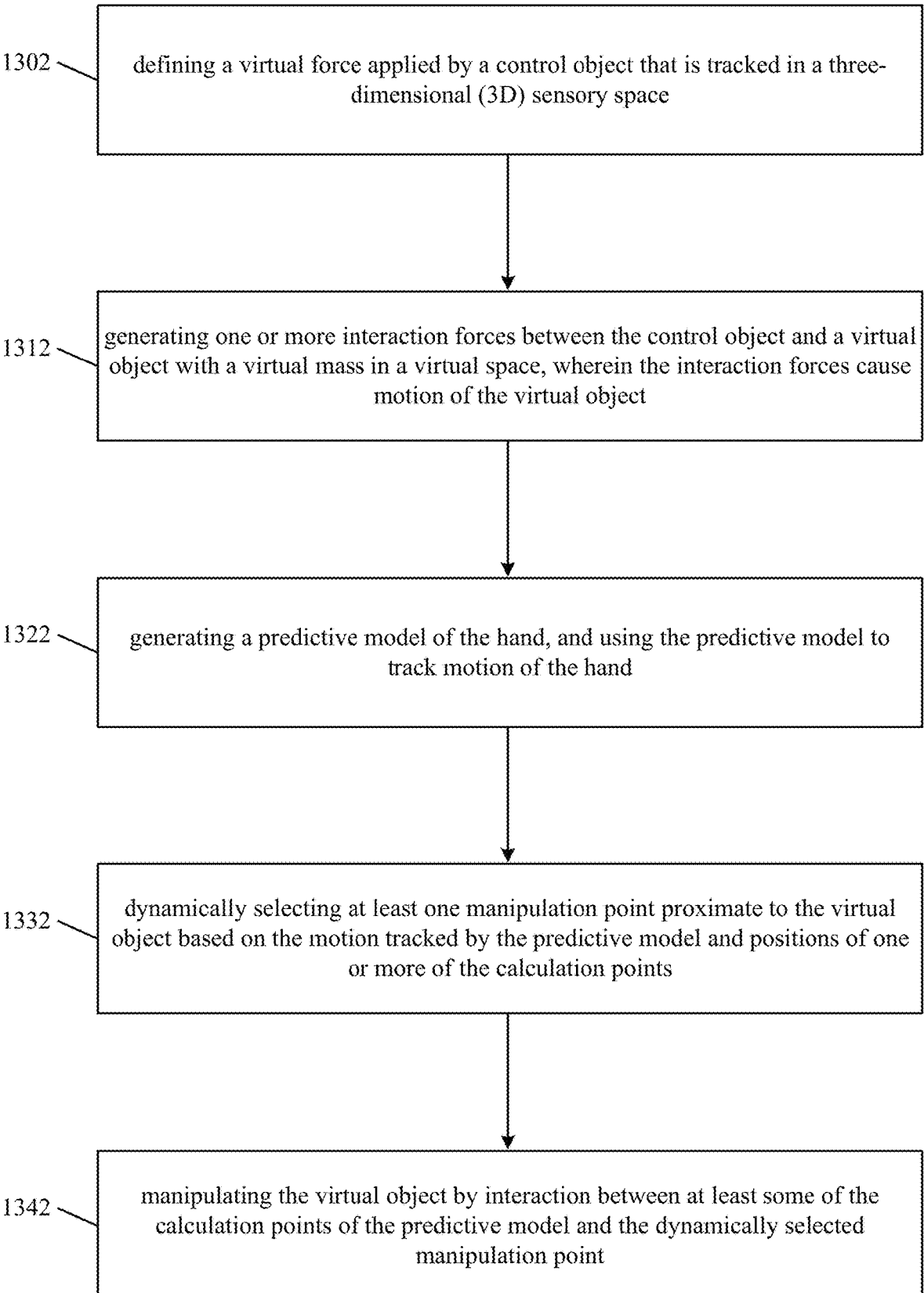

1302 — defining a virtual force applied by a control object that is tracked in a three-dimensional (3D) sensory space 1312 — generating one or more interaction forces between the control object and a virtual object with a virtual mass in a virtual space, wherein the interaction forces cause motion of the virtual object 1322 — generating a predictive model of the hand, and using the predictive model to track motion of the hand 1332 — dynamically selecting at least one manipulation point proximate to the virtual object based on the motion tracked by the predictive model and positions of one or more of the calculation points 1342 — manipulating the virtual object by interaction between at least some of the calculation points of the predictive model and the dynamically selected manipulation point

FIG. 13

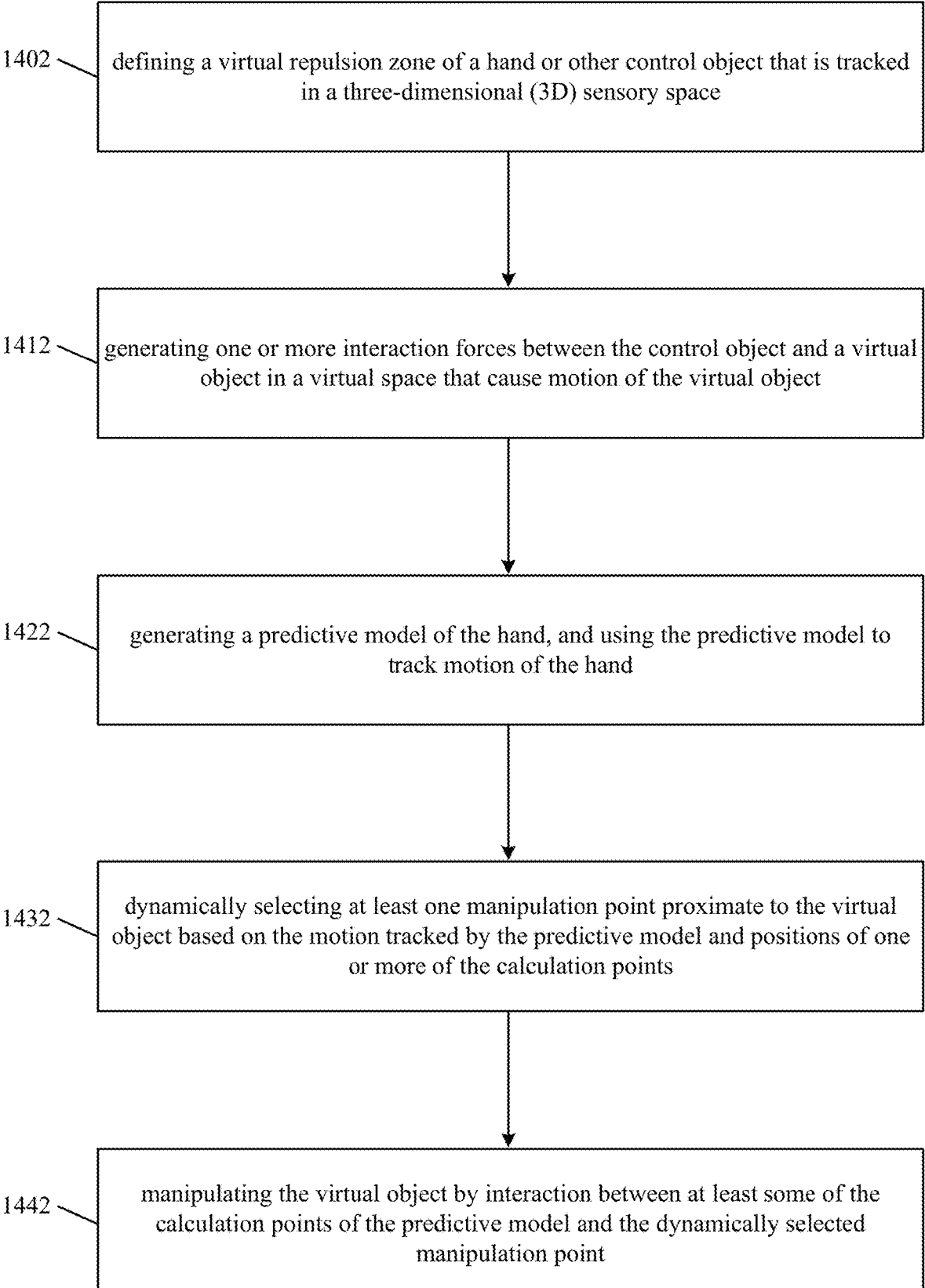

1402 — defining a virtual repulsion zone of a hand or other control object that is tracked in a three-dimensional (3D) sensory space 1412 — generating one or more interaction forces between the control object and a virtual object in a virtual space that cause motion of the virtual object 1422 — generating a predictive model of the hand, and using the predictive model to track motion of the hand 1432 — dynamically selecting at least one manipulation point proximate to the virtual object based on the motion tracked by the predictive model and positions of one or more of the calculation points 1442 — manipulating the virtual object by interaction between at least some of the calculation points of the predictive model and the dynamically selected manipulation point

FIG. 14

INTERACTION STRENGTH USING VIRTUAL OBJECTS FOR MACHINE CONTROL

PRIORITY DATA

This application is a continuation of U.S. application Ser. No. 14/541,078, entitled "INTERACTION STRENGTH USING VIRTUAL OBJECTS FOR MACHINE CON-TROL", filed on 13 Nov. 2014 and issued as U.S. Pat. No. 10,416,834 of 17 Sep. 2019, which claims the benefit of U.S. Provisional Patent Application No. 61/905,103, entitled, "INTERACTION STRENGTH USING VIRTUAL OBJECTS FOR MACHINE CONTROL," filed on 15 Nov. 2013. These applications are hereby incorporated by reference for all purposes.

INCORPORATIONS

Materials incorporated by reference in this filing include the following:

"PREDICTIVE INFORMATION FOR FREE SPACE GESTURE CONTROL AND COMMUNICATION," U.S. Prov. App. No. 61/871,790, filed 29 Aug. 2013,
"PREDICTIVE INFORMATION FOR FREE-SPACE GESTURE CONTROL AND COMMUNICATION," U.S. Prov. App. No. 61/873,758, filed 4 Sep. 2013,
"VELOCITY FIELD INTERACTION FOR FREE SPACE GESTURE INTERFACE AND CONTROL," U.S. Prov. App. No. 61/891,880, filed 16 Oct. 2013,
"VELOCITY FIELD INTERACTION FOR FREE SPACE GESTURE INTERFACE AND CONTROL," U.S. Non. Prov. application Ser. No. 14/516,493, filed 16 Oct. 2014,
"CONTACTLESS CURSOR CONTROL USING FREE-SPACE MOTION DETECTION," U.S. Prov. App. No. 61/825,480, filed 20 May 2013,
"FREE-SPACE USER INTERFACE AND CONTROL USING VIRTUAL CONSTRUCTS," U.S. Prov. App. No. 61/873,351, filed 3 Sep. 2013,
"FREE-SPACE USER INTERFACE AND CONTROL USING VIRTUAL CONSTRUCTS," U.S. Prov. App. No. 61/877,641, filed 13 Sep. 2013,
"CONTACTLESS CURSOR CONTROL USING FREE-SPACE MOTION DETECTION," U.S. Prov. App. No. 61/825,515, filed 20 May 2013,
"FREE-SPACE USER INTERFACE AND CONTROL USING VIRTUAL CONSTRUCTS," U.S. Non. Prov. application Ser. No. 14/154,730, filed 20 Feb. 2014,
"SYSTEMS AND METHODS FOR MACHINE CON-TROL," U.S. Non. Prov. application Ser. No. 14/280, 018, filed 16 May 2014,
"DYNAMIC, FREE-SPACE USER INTERACTIONS FOR MACHINE CONTROL," U.S. Non. Prov. appli-cation Ser. No. 14/155,722, filed 1 Jan. 2014,
"PREDICTIVE INFORMATION FOR FREE SPACE GESTURE CONTROL AND COMMUNICATION," U.S. Non. Prov. application Ser. No. 14/474,077, filed 29 Aug. 2014,
SYSTEMS AND METHODS FOR CAPTURING MOTION IN THREE-DIMENSIONAL SPACE," U.S. Prov. App. No. 61/724,091, filed 8 Nov. 2012,
VEHICLE MOTION SENSORY CONTROL," U.S. Prov. App. No. 62/005,981, filed 30 May 2014,
"MOTION CAPTURE USING CROSS-SECTIONS OF AN OBJECT," U.S. application Ser. No. 13/414,485, filed 7 Mar. 2012, and "SYSTEM AND METHODS FOR CAPTURING MOTION IN THREE-DIMENSIONAL SPACE," U.S. application Ser. No. 13/742,953, filed 16 Jan. 2013.

TECHNICAL FIELD

Embodiments relate generally to machine user interfaces, and more specifically to the use of virtual objects as user input to machines.

DISCUSSION

Conventional machine interfaces are in common daily use. Every day, millions of users type their commands, click their computer mouse and hope for the best.

Unfortunately, however, these types of interfaces are very limited.

Therefore, what is needed is a remedy to this and other shortcomings of the traditional machine interface approaches.

SUMMARY

Aspects of the systems and methods described herein provide for of improved control of machines or other computing resources based at least in part upon determining whether positions and/or motions of an object (e.g., hand, tool, hand and tool combinations, other detectable objects or combinations thereof) might be interpreted as an interaction with one or more virtual objects. Embodiments can enable modeling of physical objects, created objects and interac-tions with various combinations thereof for machine control or other purposes.

The technology disclosed relates to using virtual attrac-tion between hand or other control object in a three-dimen-sional (3D) sensory space and a virtual object in a virtual space. In particular, it relates to defining a virtual attraction zone of a hand or other control object that is tracked in a three-dimensional (3D) sensory space and generating one or more interaction forces between the control object and a virtual object in a virtual space that cause motion of the virtual object responsive to proximity of the control object to the virtual object and escalation with a virtual pinch or grasp action of the control object directed to a manipulation point of the virtual object.

In some embodiments, the technology disclosed further relates to generating a predictive model of the hand and using the predictive model to track motion of the hand. The predictive model includes positions of calculation points of fingers, thumb and palm of the hand. It also relates to dynamically selecting at least one manipulation point proxi-mate to the virtual object based on the motion tracked by the predictive model and positions of one or more of the calculation points and manipulating the virtual object by interaction between at least some of the calculation points of the predictive model and the dynamically selected manipu-lation point.

In one embodiment, the predictive model is generated based on least one of a feature of interest of the hand and a salient feature or property of an image used to capture the feature of interest of the hand. In some embodiments, the feature of interest is based on a brightness of a portion of the hand captured in the image.

In other embodiments, the technology disclosed also relates to applying a constraint factor to the predictive model to eliminate impossible poses of the hand based on one or more physical properties of the hand.

In yet other embodiments, the technology disclosed further relates to determining an outside pinch pose responsive to de-escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In some embodiments, the technology disclosed further relates to determining an inside pinch pose responsive to escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In other embodiments, the technology disclosed further relates to determining a grab pose for the predictive model based on convergence of one or more of the calculation points of the fingers and the palm of the hand during dynamic selection of the manipulation point, assigning a virtual attraction strength attribute to the grab pose based on a degree of convergence of the calculation points, and manipulating the virtual object responsive to the grab pose strength attribute when the calculation points are within a predetermined range of each other.

The technology disclosed further includes manipulating the virtual object responsive to the grab pose strength attribute exceeding at least one of a floor value and a band of permissible levels. It also includes generating data for augmented display representing a position of the virtual object relative to the predictive model of the hand. In further includes generating data for display representing positions in a rendered virtual space of the virtual object and the predictive model of the hand.

The technology disclosed further includes manipulating the virtual object responsive to a proximity between at least some of the calculation points of the predictive model and the manipulation point of the virtual object. It also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, identifying a dominant pose from the plurality based on at least one of magnitudes of the strength attributes and positions of the simultaneous convergence, and manipulating the virtual object responsive to the dominant pose.

The technology disclosed also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, calculating a combined virtual attraction based on adding the virtual attraction strength attributes of the respective poses, and applying interaction forces to the virtual object based on the combined virtual attraction.

In one embodiment, acceleration of the virtual object is proportionally responsive to escalation with the virtual pinch or grasp action of the control object. In another embodiment, deceleration of the virtual object is proportionally responsive to escalation with the virtual pinch or grasp action of the control object.

The technology disclosed also relates to using virtual force applied by a hand or other control object in a three-dimensional (3D) sensory space to a virtual object with a virtual mass in a virtual space. In particular, it relates to defining a virtual force applied by a control object that is tracked in a three-dimensional (3D) sensory space and generating one or more interaction forces between the control object and a virtual object with a virtual mass in a virtual space, wherein the interaction forces cause motion of the virtual object responsive to proximity of the control object to the virtual object and escalation with a virtual pinch, grasp, or swipe action of the control object directed to a manipulation point of the virtual object.

The technology disclosed further relates to generating a predictive model of the hand, and using the predictive model to track motion of the hand, wherein the predictive model includes positions of calculation points of fingers, thumb and palm of the hand, dynamically selecting at least one manipulation point proximate to the virtual object based on the motion tracked by the predictive model and positions of one or more of the calculation points, and manipulating the virtual object by interaction between at least some of the calculation points of the predictive model and the dynamically selected manipulation point.

In one embodiment, the predictive model is generated based on least one of a feature of interest of the hand and a salient feature or property of an image used to capture the feature of interest of the hand. In some embodiments, the feature of interest is based on a brightness of a portion of the hand captured in the image.

The technology disclosed further includes applying a constraint factor to the predictive model to eliminate impossible poses of the hand based on one or more physical properties of the hand. It also includes determining an outside pinch pose responsive to de-escalation of distance between opposable calculation points of the thumb and at least one of the fingers during dynamic selection of the manipulation point, assigning a virtual force strength attribute to the outside pinch based on a degree of convergence of the calculation points, and manipulating the virtual object responsive to the outside pinch strength attribute when the calculation points are within a predetermined range of each other.

The technology disclosed also relates to determining an inside pinch pose responsive to escalation of distance between opposable calculation points of the thumb and at least one of the fingers during dynamic selection of the manipulation point, assigning a virtual force strength attribute to the outside pinch based on a degree of convergence of the calculation points, and manipulating the virtual object responsive to the outside pinch strength attribute when the calculation points are within a predetermined range of each other.

The technology disclosed further includes determining a grab pose for the predictive model based on convergence of one or more of the calculation points of the fingers and the palm of the hand during dynamic selection of the manipulation point, assigning a virtual force strength attribute to the grab pose based on a degree of convergence of the calculation points, and manipulating the virtual object responsive to the grab pose strength attribute when the calculation points are within a predetermined range of each other.

The technology disclosed also relates to method of using virtual repulsion between hand or other control object in a three-dimensional (3D) sensory space and a virtual object in a virtual space. In particular, it relates to defining a virtual repulsion zone of a hand or other control object that is tracked in a three-dimensional (3D) sensory space and generating one or more interaction forces between the control object and a virtual object in a virtual space that cause motion of the virtual object responsive to proximity of the control object to the virtual object and escalation with a virtual pinch or grasp action of the control object directed to a manipulation point of the virtual object.

In one embodiment, the acceleration of the virtual object is proportionally responsive to escalation with the virtual pinch or grasp action of the control object. In another embodiment, the deceleration of the virtual object is proportionally responsive to escalation with the virtual pinch or grasp action of the control object.

In one embodiment, a computer implemented method is described for determining whether motions of an object might be interpreted as an interaction with a virtual object. The method comprises of detecting a portion of a hand or other detectable object in a region of space, determining predictive information including a model corresponding to the portion of the hand or other detectable object that was detected, and determining from the predictive information whether to interpret inputs made by a position or a motion of the portion of the hand or other detectable object as an interaction with a virtual object.

In some embodiments, the determining from the predictive information whether to interpret inputs made by a position or a motion of the portion of the hand or other detectable object as an interaction comprises of determining a manipulation point from a plurality of calculation points defined for the model at points corresponding to features of interest located on the hand or other detectable object being modeled by the predictive information, determining a strength for the manipulation point and determining based at least in part upon the strength, whether the portion of the hand or other detectable object as modeled by the predictive information has selected the virtual object.

In some embodiments, the determining a manipulation point comprises of determining a weighted average of a plurality of distances each distance drawn from one of the plurality of calculation points defined for the model at points corresponding to features of interest located on the portion of the hand or other detectable object to an anchor point selected from the plurality of calculation points.

In some embodiments, the plurality of calculation points defined for the model at points corresponding to features of interest located on the portion of the hand or other detectable object are determined by identifying points defined for the model corresponding to features of interest located on the portion of the hand or other detectable object.

In some embodiments, the features of interest located on the portion of the hand or other detectable object are detected based at least in part upon a salient feature or property of the image.

In some embodiments, detecting a feature of interest located on the portion of the hand or other detectable object based at least in part upon a salient feature or property of the image comprises of detecting the feature based at least in part upon a brightness of the portion of the hand or other detectable object in the image.

In some embodiments, the anchor point is selected from the plurality of calculation points based upon at least one configuration of the model of the predictive information selectable from a set of possible configurations based at least in part upon a pose of the portion of the hand or other detectable object.

In some embodiments, the set of possible configurations is determined by applying at least one constraint determined from one or more physical properties identified for a hand or other detectable object to the model, thereby eliminating configurations corresponding to impossible poses from the predictive information.

In some embodiments, the determining a strength for the manipulation point comprises of determining from the predictive information one or more manipulation types that could be applied to the virtual object, each manipulation type corresponding to an observable pose of the portion of the hand or other detectable object, determining a strength for each of the manipulation types to form a set of strengths and corresponding manipulation types, and determining from the set of strengths and corresponding manipulation types a strength for the portion of the hand or other detectable object in the observable pose.

In some embodiments, the determining from the predictive information one or more manipulation types that could be applied to the virtual object comprises of fitting the model to an observable pose of the portion of the hand or other detectable object and providing based at least in part upon the model as fit, one or more manipulation types appropriate to the observable pose.

In some embodiments, the determining a strength for each manipulation type comprises of determining for each manipulation type appropriate to the observed pose a distance between a first point and a second point from the model, the first point and the second point corresponding to a first feature and a second feature located on the portion of the hand or other detectable object and relevant to the manipulation type, and determining a strength for the manipulation type as a function of the distance between the first point and the second point.

In some embodiments, the determining a strength for each manipulation type comprises of determining for each manipulation type appropriate to the observed pose a distance between a first point from the model, the first point corresponding to a first feature located on the portion of the hand or other detectable object and relevant to the manipulation type and a second point, the second point determined from a position of a virtual object and determining a strength for the manipulation type as a function of the distance between the first point and the second point.

In some embodiments, the determining a strength for the manipulation type as a function of the distance between the first point and the second point comprises of applying a function to the first point and the second point to reflect the effect of a virtual force.

In some embodiments, the applying a function comprises of applying a function to reflect the effect of virtual gravity between the hand or other detectable object and the virtual object.

In some embodiments, the determining from the set of strengths and corresponding manipulation types a strength for the portion of the hand or other detectable object in the observable pose comprises of selecting from the set a strength and a corresponding manipulation type as the strength and the manipulation type for the portion of the hand or other detectable object in the observable pose.

In some embodiments, the determining from the set of strengths and corresponding manipulation types a strength for the portion of the hand or other detectable object in the observable pose comprises of combining at plurality of strengths having compatible corresponding manipulation types selected from the set as the strength and providing a dominant manipulation type selected from the compatible manipulation types for the portion of the hand or other detectable object in the observable pose.

In some embodiments, the determining based at least in part upon the strength, whether the portion of the hand or other detectable object as modeled by predictive information has selected the virtual object comprises of comparing the strength to a threshold and determining that the portion of the hand or other detectable object has selected the virtual object when the strength at least meets the threshold.

In one embodiment, a threshold for strength corresponds to a virtual deformation of a surface of the virtual object. In another embodiment, a first threshold corresponds to a first virtual deformation of a surface of a virtual rubber object, and a second threshold corresponds to a second virtual deformation of a surface of a virtual steel object, and wherein the first threshold is different from the second threshold.

In some embodiments, the determining that the portion of the hand or other detectable object as modeled by predictive information has selected the virtual object comprises of comparing proximity of the manipulation point to a virtual object.

In other embodiments, the method further comprises of determining a type of manipulation to be applied to the virtual object by the portion of the hand or other detectable object as modeled by predictive information. In one embodiment, the determining a type of manipulation further comprises of determining the type of manipulation to be applied based at least in part upon a position of at least one manipulation point. In another embodiment, the interaction with a virtual object comprises of interaction with a modeled object that models a physical object.

In one embodiment, a method for finding virtual object primitive is provided. The method includes detecting a portion of a hand or other detectable object in a region of space. Predictive information is determined to include a model corresponding to the portion of the hand or other detectable object that was detected. The predictive information is used to determine whether to interpret inputs made by a position or a motion of the portion of the hand or other detectable object as an interaction with a virtual object.

In one embodiment, determining predictive information includes determining a manipulation point from the predictive information. A strength is determined for the manipulation point relative to the virtual object. Whether the portion of the hand or other detectable object as modeled by predictive information has selected the virtual object is then determined based upon the strength and/or other parameters.

In one embodiment, a manipulation point is determined using a weighted average of a distance from each of a plurality of calculation points defined for the hand or other detectable object to an anchor point defined for the hand or other detectable object. The plurality of calculation points defined for the hand or other detectable object can be determined by identifying features of a model corresponding to points on the portion of the hand or other detectable object detected from a salient feature or property of the image. The anchor point is identified from the plurality of calculation points, based upon at least one configuration of the predictive information that is selectable from a set of possible configurations of the predictive information.

In one embodiment, a strength of a manipulation point can be determined based upon the predictive information that reflects a salient feature of the hand or other detectable object i.e., tightness of a grip or pinch inferred from motion or relative positions of fingertips provides indication of greater strength. The strength of a manipulation point is compared to a threshold to determine whether the portion of the hand or other detectable object as modeled by predictive information has selected the virtual object.

A strength threshold can indicate a virtual deformation of a surface of the virtual object. For example, a first threshold indicates a first virtual deformation of a surface of a virtual rubber object, and a second threshold indicates a second virtual deformation of a surface of a virtual steel object; such that the first threshold is different from the second threshold.

In one embodiment, the proximity of the manipulation point to a virtual object to determine that the portion of the hand or other detectable object as modeled by predictive information has selected the virtual object.

In one embodiment, a type of manipulation to be applied to the virtual object by the portion of the hand or other detectable object as modeled by predictive information is determined. The type of manipulation can be determined based at least in part upon a position of at least one manipulation point.

Among other aspects, embodiments can enable improved control of machines or other computing resources based at least in part upon determining whether positions and/or motions of an object (e.g., hand, tool, hand and tool combinations, other detectable objects or combinations thereof) might be interpreted as an interaction with one or more virtual objects. Embodiments can enable modeling of physical objects, created objects and interactions with combinations thereof for interfacing with a variety of machines (e.g., a computing systems, including desktop, laptop, tablet computing devices, special purpose computing machinery, including graphics processors, embedded microcontrollers, gaming consoles, audio mixers, or the like; wired or wirelessly coupled networks of one or more of the foregoing, and/or combinations thereof).

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIGS. 1A, 1B, 1C, 1D, 1E, 1F, 1G, 1H, 1I, 1J, 1K, 1L, 1M, 1N, 1O, and 1P illustrate flowcharts of processes for determining when sensory input interacts with virtual objects according to an embodiment.

FIGS. 7, 7-1, 7-2, 8, 8-1, 8-2, 8-3, and 8-4 illustrate an exemplary machine sensory and control system in embodiments. In particular, FIG. 7-1 depicts one embodiment of coupling emitters with other materials or devices. FIG. 7-2 shows one embodiment of interleaving arrays of image capture device(s). FIGS. 8-1 and 8-2 illustrate prediction information including models of different control objects. FIGS. 8-3 and 8-4 show interaction between a control object and an engagement target.

FIG. 12 shows a flowchart of using virtual attraction between hand or other control object in a three-dimensional (3D) sensory space and a virtual object in a virtual space.

FIG. 13 is a representative method of using virtual force applied by a hand or other control object in a three-dimensional (3D) sensory space to a virtual object with a virtual mass in a virtual space.

FIG. 14 illustrates a method of using virtual repulsion between hand or other control object in a three-dimensional (3D) sensory space and a virtual object in a virtual space.

BRIEF DESCRIPTION

Techniques described herein can be implemented as one or a combination of methods, systems or processor executed code to form embodiments capable of improved control of machines or other computing resources based at least in part upon determining whether positions and/or motions of an object (e.g., hand, tool, hand and tool combinations, other detectable objects or combinations thereof) might be interpreted as an interaction with one or more virtual objects. Embodiments can enable modeling of physical objects, created objects and interactions with combinations thereof for machine control or other purposes.

Figure 1C:
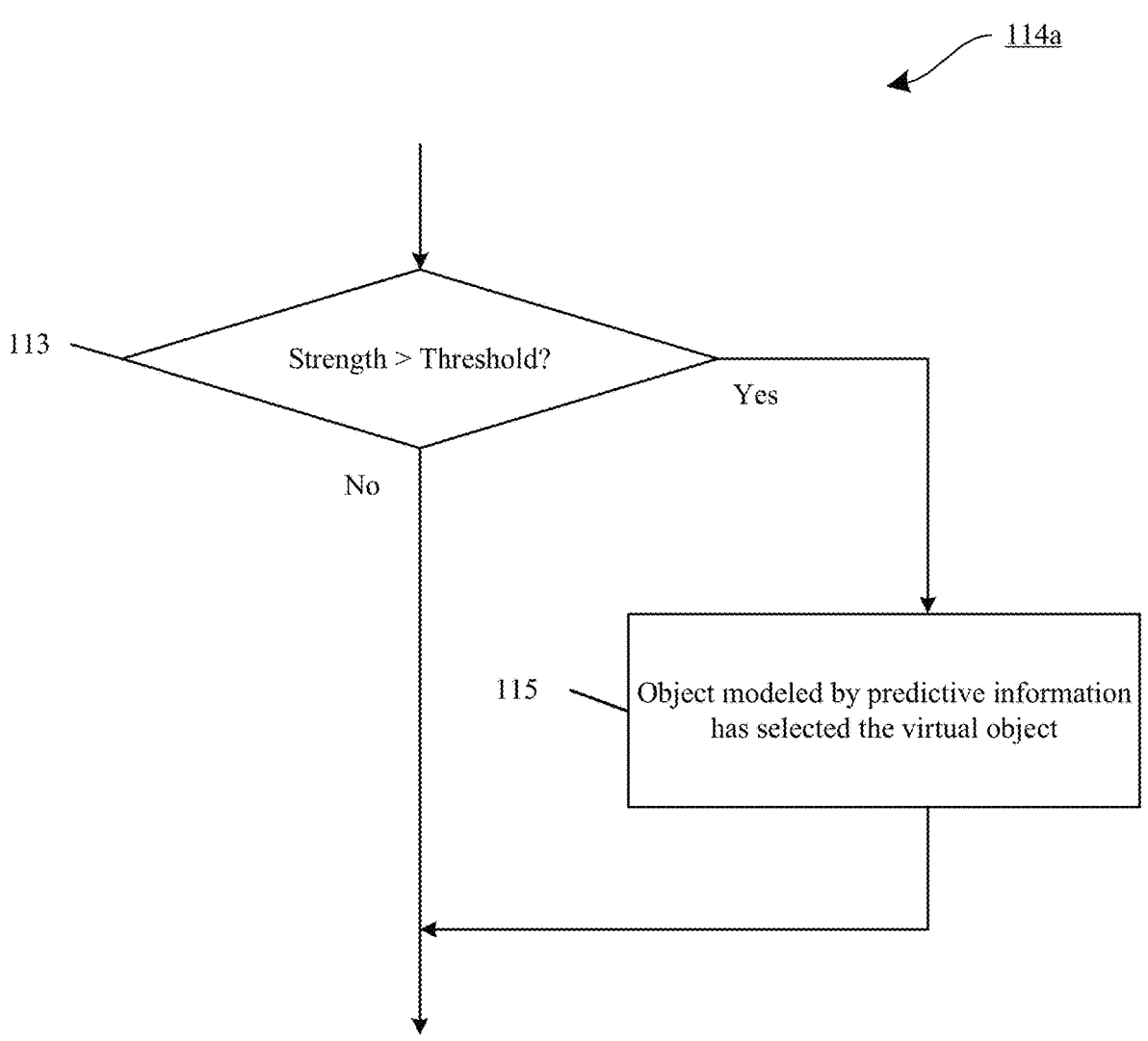
Figure 1D:
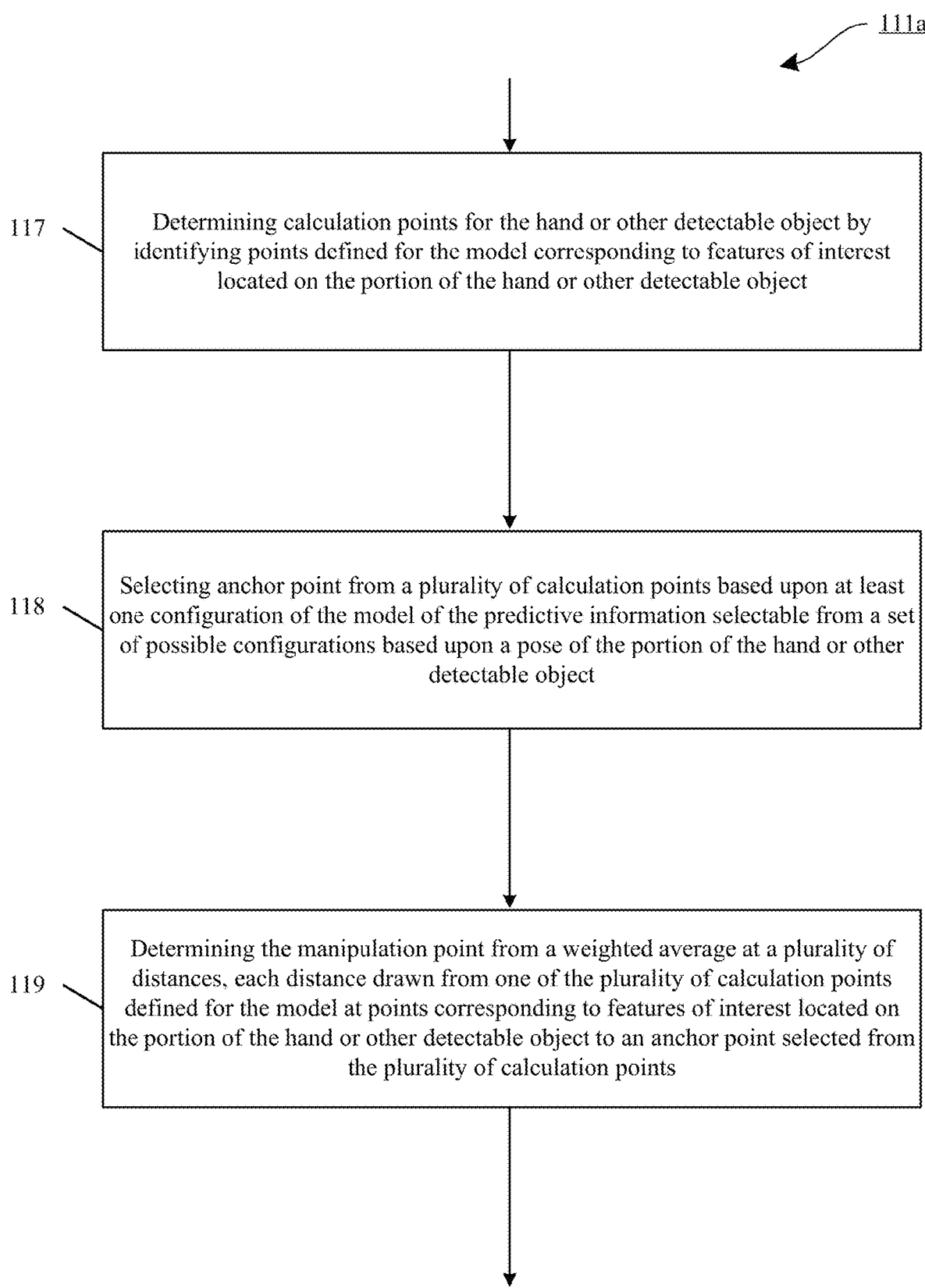
Figure 1E:
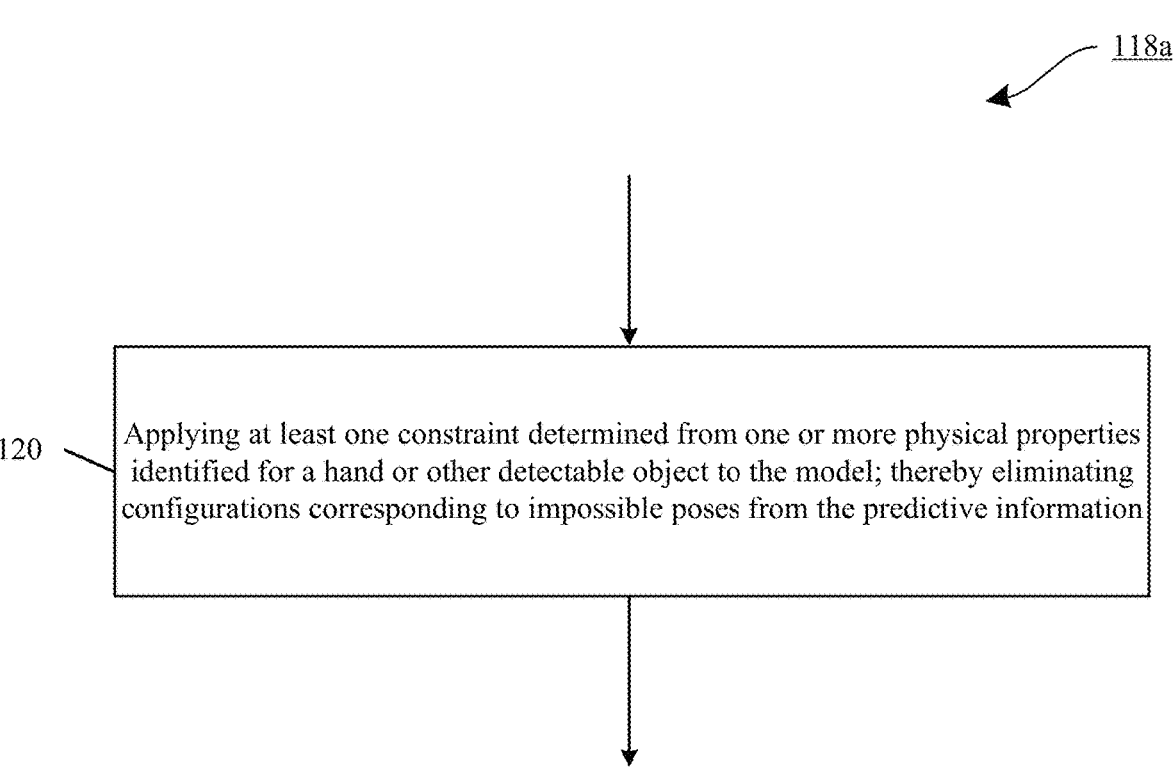
Figure 1F:
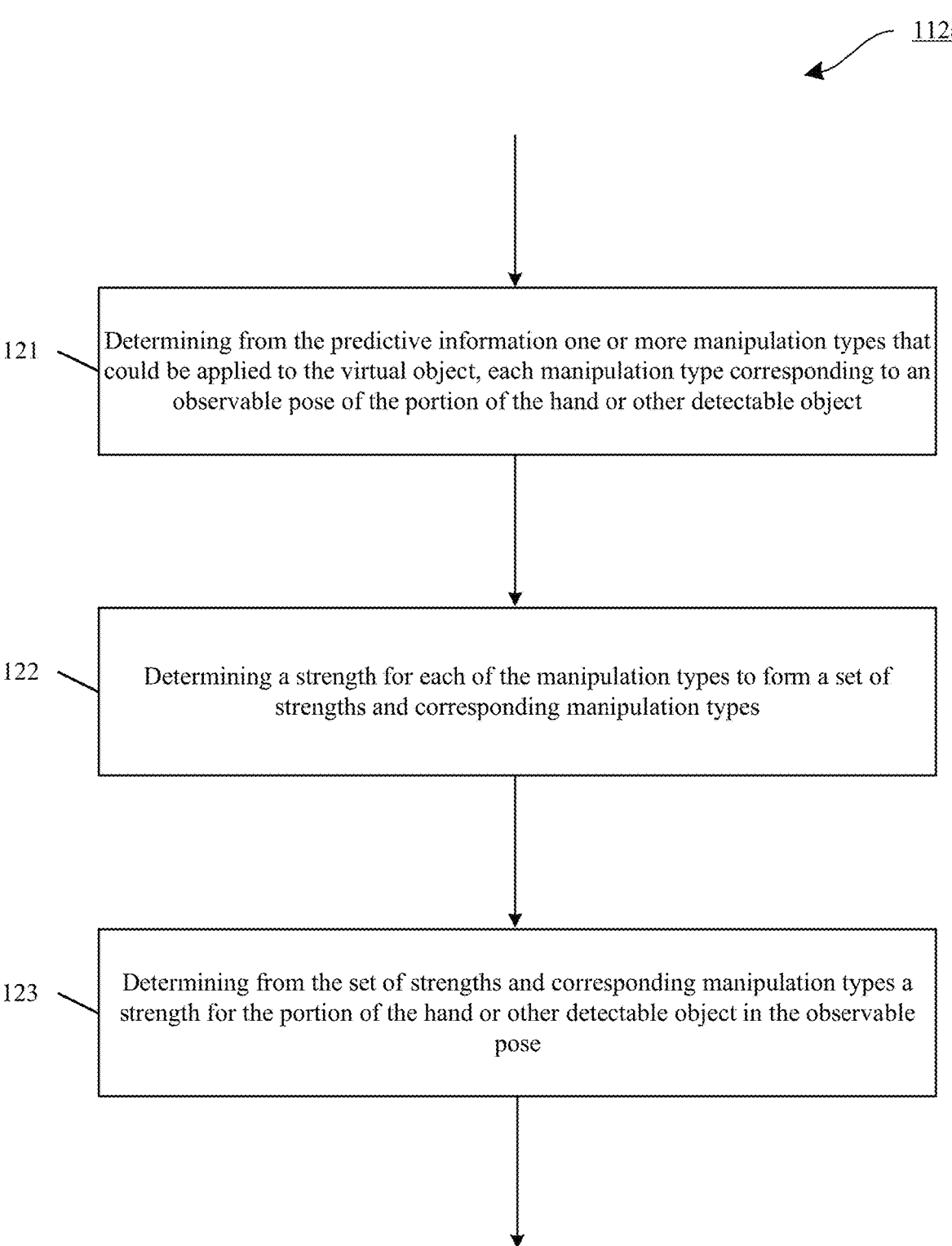
Figure 1G:
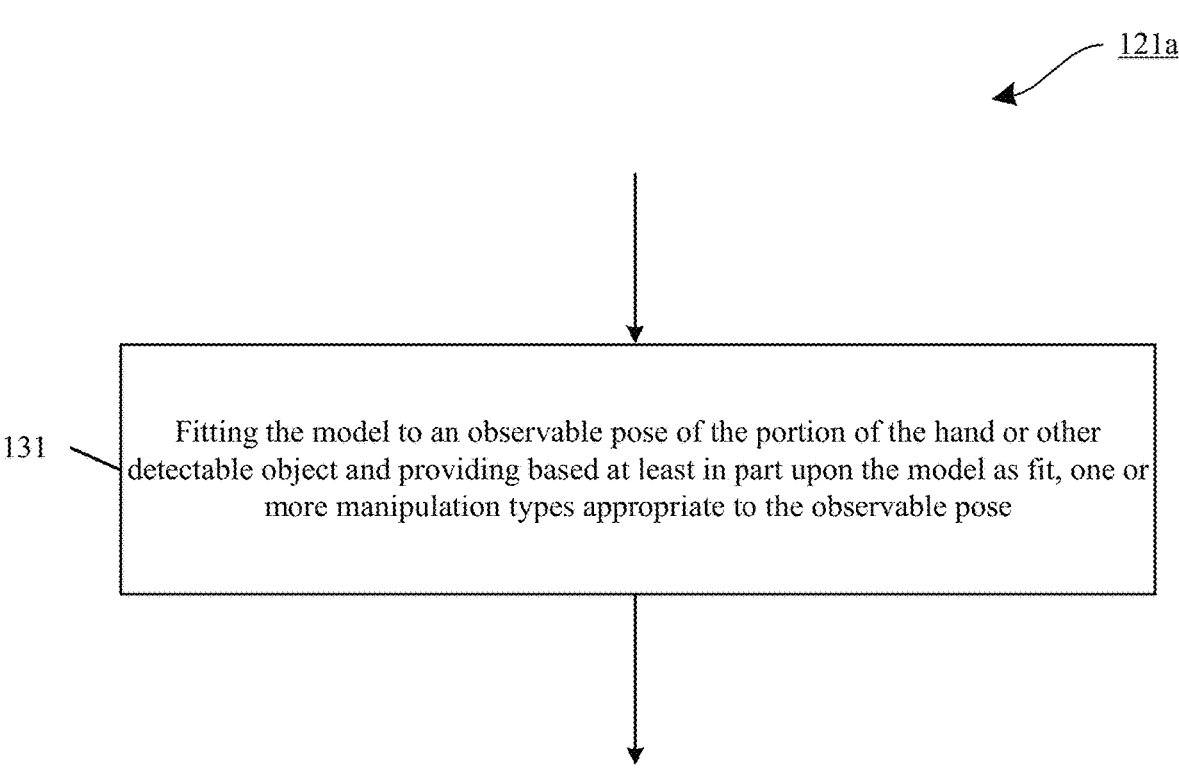
Figure 1L:
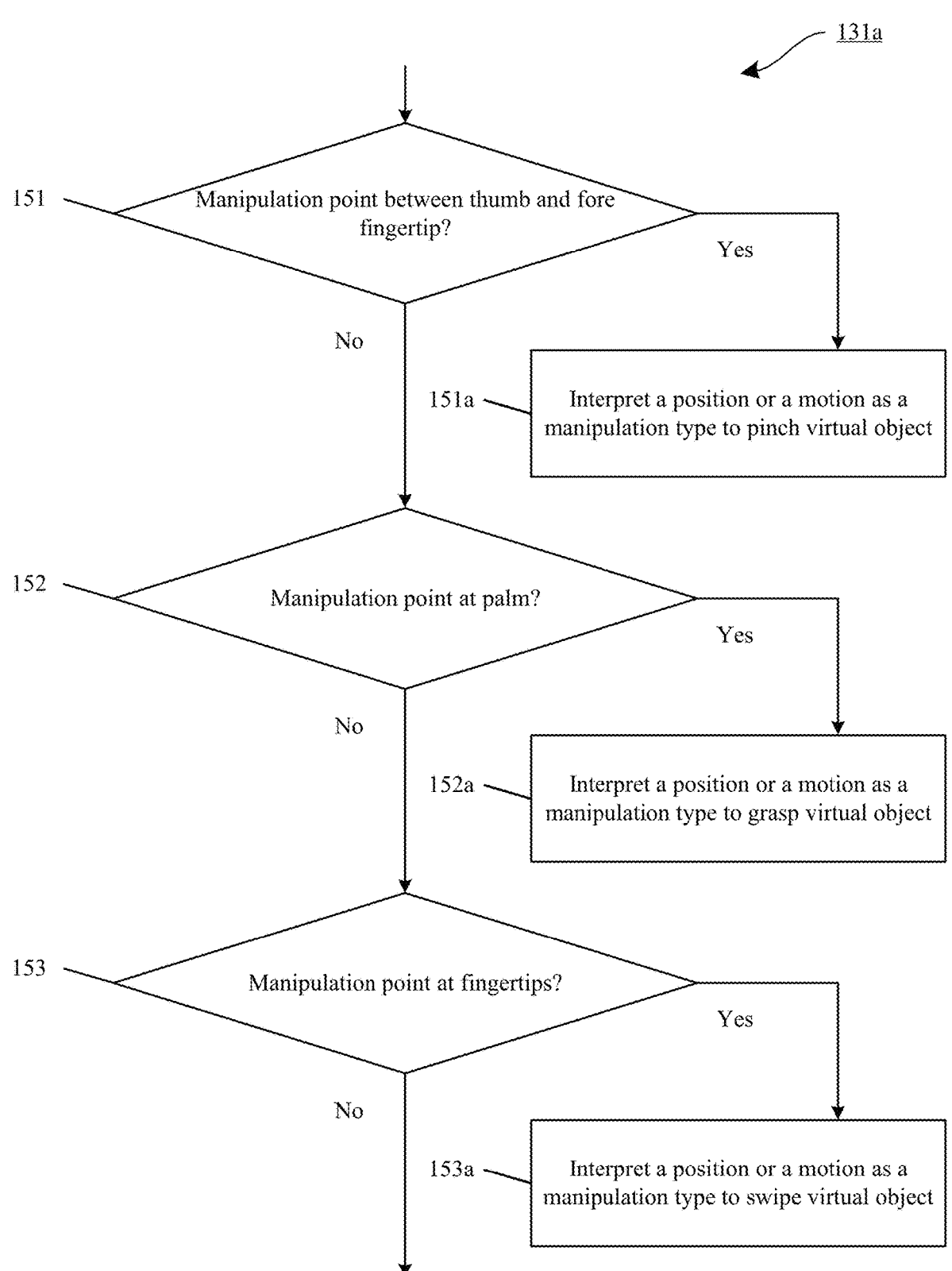
Figure 1M:
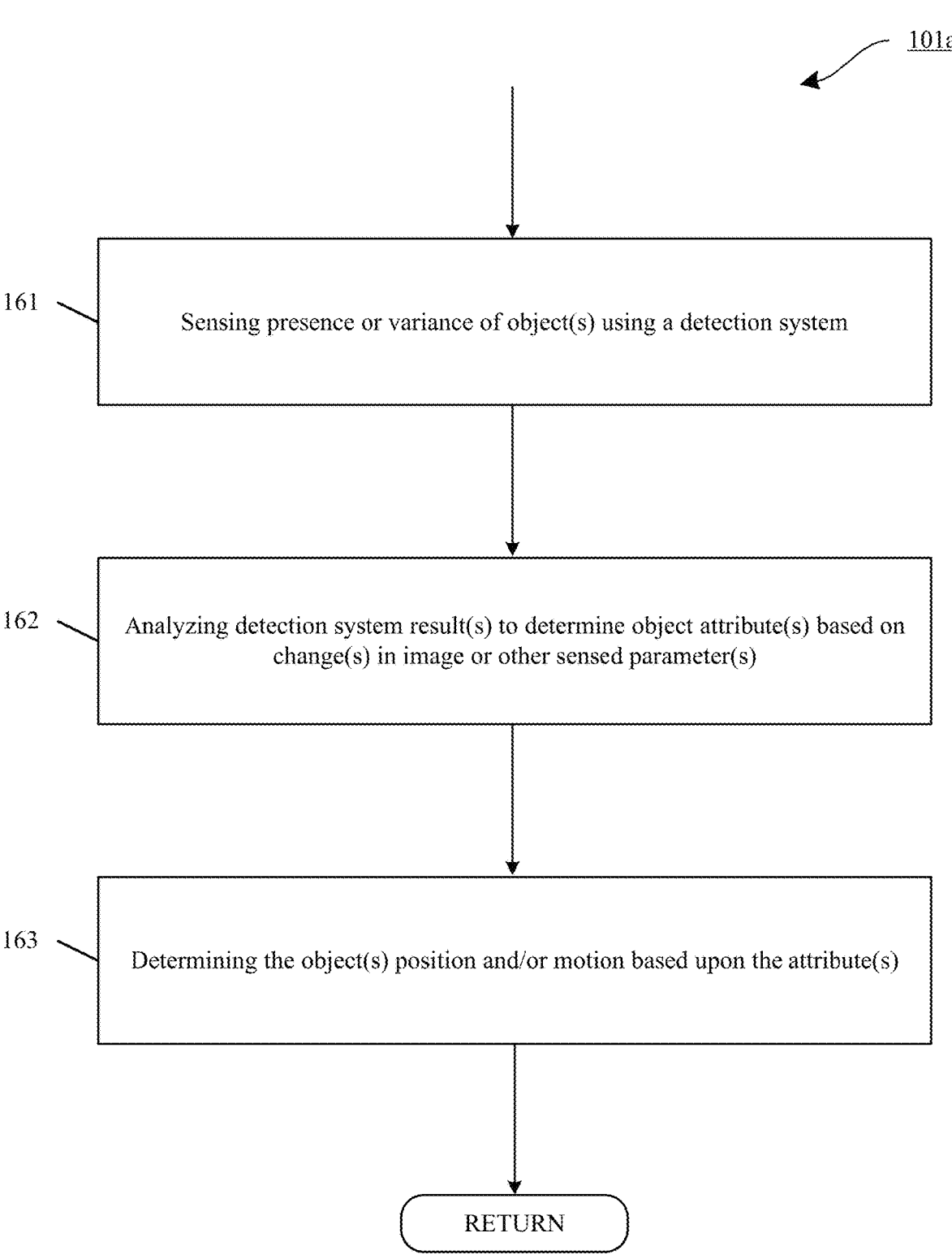
Figure 1N:
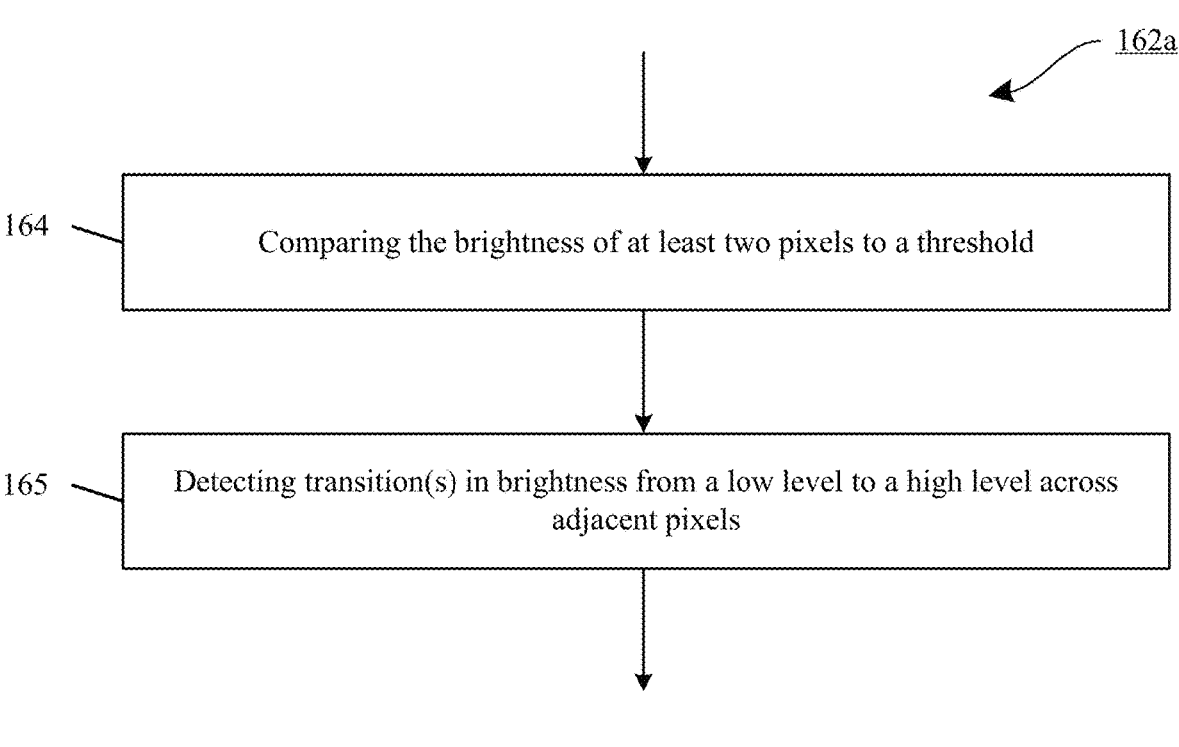
Figure 1O:
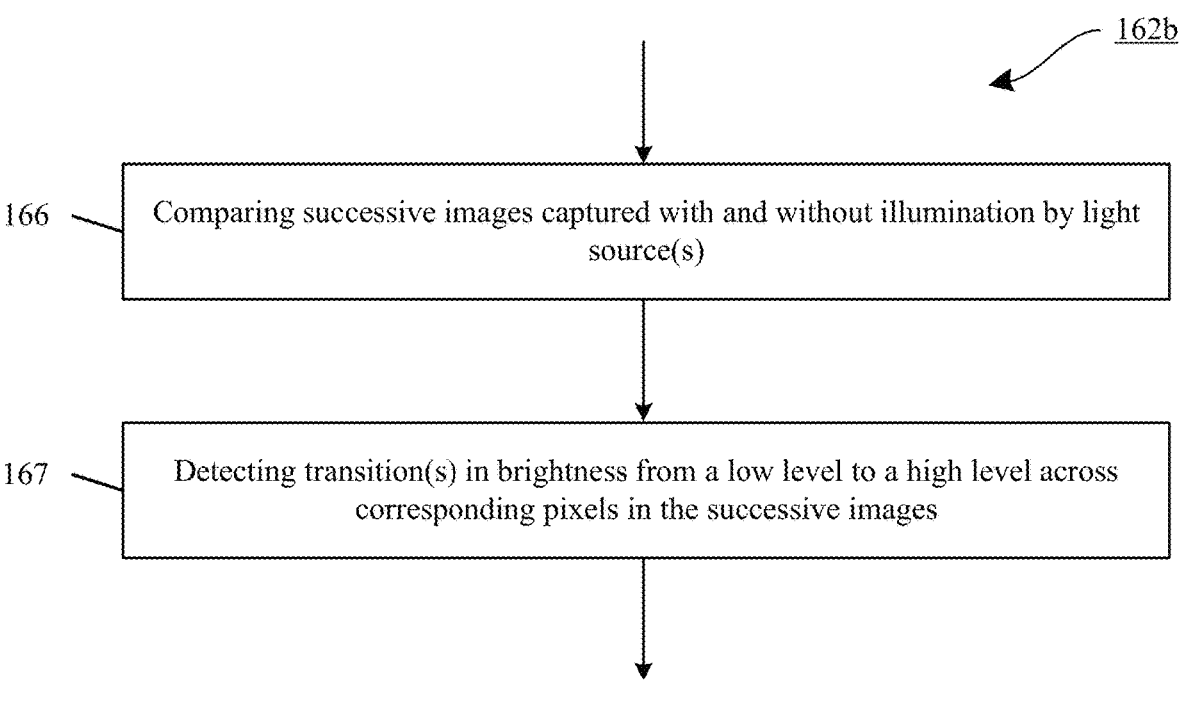
Figure 1P:
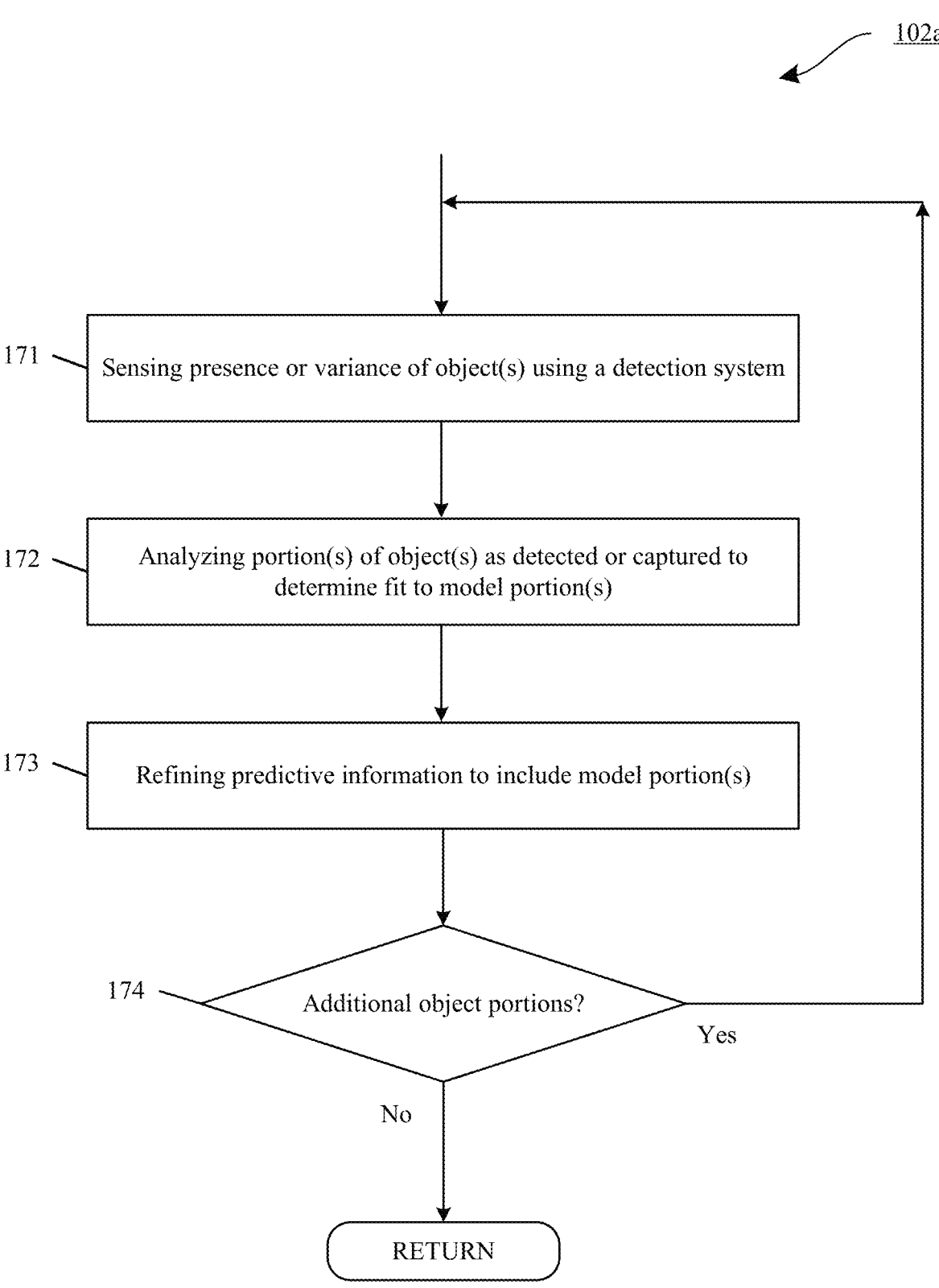

FIGS. 1A 1P illustrate flowcharts of processes for determining when sensory input interacts with virtual objects according to an embodiment. As shown in FIG. 1A, a flowchart 100$a$, operatively disposed in interactions discriminator 1013 and carried out upon one or more computing devices in system 1000 of FIG. 10, determines whether positions and motions of hands or other detected objects might be interpreted as interactions with one or more virtual objects. In a block 101, a portion of a hand or other detectable object in a region of space can be detected. A detectable object is one that is not completely translucent to electromagnetic radiation (including light) at a working wavelength. Common detectable objects useful in various embodiments include without limitation a brush, pen or pencil, eraser, stylus, paintbrush and/or other virtualized tool and/or combinations thereof. Objects can be detected in a variety of ways, but in an embodiment and by way of example, one method for detecting objects is described below with reference to flowchart 101$a$ of FIG. 1B.

In a block 102, predictive information including a model can be determined that corresponds to the portion of the hand or other detectable object that was detected. In an embodiment and by way of example, one technique for determining predictive information including a model corresponding to the portion of the hand or other detectable object is described below with reference to flowchart 102$a$ of FIG. 1C and FIGS. 8-1, 8-2. Other modeling techniques (e.g., skeletal models, visual hulls, surface reconstructions, other types of virtual surface or volume reconstruction techniques, or combinations thereof) can be used in other embodiments as will be readily apparent to one skilled in the art.

In a block 103, the predictive information is used to determine whether to interpret inputs made by a position or a motion of the portion of the hand or other detectable object as an interaction with a virtual object. One way to implement determining whether to interpret inputs of a hand or other object as an interaction with a virtual object is shown by FIG. 1B, in which a flowchart 103$a$ that includes a block 111 in which a manipulation point is determined from a plurality of calculation points defined for the model at points corresponding to features of interest located on the hand or other detectable object being modeled by the predictive information. One example embodiment in which manipulation point (s) are determined is discussed below with reference to FIG. 1D. In a block 112, a strength for the manipulation point is determined. Strengths can be determined from models in configurations corresponding to poses of the hand (or other object), as well as, based in part upon distances and/or poses relative to the virtual object, or combinations thereof. In a block 114, it is determined whether the virtual object has been selected by the hand (or other object) based upon strength, or strength coupled with other factors (distance, relative motion between hand and object, verbal commands, etc.). A number of implementation specific alternatives exist for determining whether the object has been selected based upon strength. One example technique for doing so is shown in FIG. 1C, which illustrates a flowchart 114$a$ which includes a block 113 in which it is determined whether the strength of the manipulation point relative to the virtual object exceeds a threshold. Other techniques (i.e., meets a level, falls below a floor value, falls outside of a band of permissible levels, etc.) are used in embodiments as well. When the strength of the manipulation point relative to the virtual object exceeds a threshold, then, in a block 115, the object modeled by the predictive information is determined to have selected the virtual object. Otherwise, or in any event, in a block 116 of FIG. 1B, a check whether there are any further virtual objects to test is made. If there are further virtual objects to test, then flow continues with block 111 to check the next virtual objects. In an embodiment, the procedure illustrated in FIG. 1B completes and returns the set of selections and virtual objects built in block 114.

Manipulation points can be determined using various algorithms and/or mechanisms. For example, FIG. 1D illustrates a flowchart 111$a$ of one technique for determining manipulation points from a plurality of calculation points defined for the model at points corresponding to features of interest located on the hand or other detectable object being modeled by predictive information about object(s). Flowchart 111$a$ includes a block 117, in which a plurality of calculation points for the hand or other detectable object are determined by identifying points defined for a model corresponding to features of interest located on the portion of the hand or other detectable object. The features of interest located on the portion of the hand or other detectable object are detected from a salient feature or property of the image. For example, a feature can be detected based at least in part upon a brightness of the portion of the hand or other detectable object in the image.

In a block 118, an anchor point is selected from the plurality of calculation points based upon at least one configuration of the model of the portion of the hand or other detectable object of the predictive information selectable from a set of possible configurations based upon a pose of the portion of the hand or other detectable object. A number of implementation specific alternatives exist for determining possible configurations based upon a pose. One example technique for determining a set of possible configurations is shown in FIG. 1E, which illustrates a flowchart 118a that includes a block 120 in which at least one constraint is applied to the model in order to eliminate configurations corresponding to impossible poses from the predictive information. The constraint(s) can be determined from one or more physical properties identified for the hand (or other detectable object). For example, a constraint could include that nominally, that hands have one thumb that issues from a side of the hand. This constraint is applied to eliminate from the model configurations including more than one thumb or a thumb that issues from the middle of the back of the hand for example.

Now with reference to FIG. 1F, one way to implement determining a strength for a manipulation point is illustrated by a flowchart 112a that includes a block 121 in which one or more manipulation types that could be applied to the virtual object are determined from the predictive information. Each manipulation type corresponds to an observable pose of the portion of the hand or other detectable object. In one embodiment, the one or more manipulation types that could be applied to the virtual object are determined as illustrated by flowchart 121a of FIG. 1G, in which a block 131 includes fitting the model to an observable pose of the portion of the hand or other detectable object and providing the one or more manipulation types appropriate to the observable pose based at least in part upon the model as fit. One technique for providing manipulation types appropriate to a pose is described below with reference to flowchart 131a of FIG. 1L. For example, as illustrated in block 201 of FIG. 2, a hand 201A-1 in a pose in which the thumb and forefinger are juxtaposed to one another can correspond to configurations of a model hand that support a manipulation type of "outside pinch" in which the distance between two points selected on the thumb and forefinger decreases during interaction with the virtual object. Another potential manipulation type for this pose is the "inside pinch" in which the distance between two points selected on the thumb and forefinger increases during interaction with the virtual object.

Again with reference to FIG. 1F, in a block 122, a strength is determined for each of the manipulation types to form a set of strengths and corresponding manipulation types. In one embodiment, the strength for each manipulation type is determined as illustrated by flowchart 122a of FIG. 1I1, in which a block 133 includes determining a distance between a first point and a second point from the model for each manipulation type appropriate to the observed pose. The first point and the second point correspond to a first feature and a second feature located on the portion of the hand or other detectable object and relevant to the manipulation type. For example, as illustrated in block 201 of FIG. 2, a hand 201A-1 in a pose in which the thumb and forefinger are juxtaposed to one another can correspond to configurations of a model hand that support a manipulation types of "outside pinch" and/or "inside pinch" in which the two points in the model are selected to correspond to positions of the thumb and forefinger. See also block 301B of FIG. 3. In block 202 of FIG. 2, a pose of the hand 202A-1 corresponds to configurations of the model hand that support manipulation type "grab", in which the two points on the model are selected to correspond to positions on the fingertips and the middle of the palm. See also block 303B of FIG. 3. Block 134 includes determining a strength for the manipulation type by applying a function to the distance between the first point and the second point. For example, in a simple case illustrated by block 201 of FIG. 2, one function for an "inside pinch" comprises a proportional relationship between strength and the distance between the points (e.g., corresponding to the thumb and forefinger). In another example, a function for an "outside pinch" comprises an inverse relationship between the strength and the distance between the points (e.g., corresponding to the thumb and forefinger). In another example, with reference to block 202 of FIG. 2, a function for a "grab" comprises an inverse relationship between the strength and the distance between the points (e.g., corresponding to the fingertips and the palm).

In some embodiments, a virtual distance computed between a point (or points) of the model associated with the hand (or other detectable control object) and a virtual object can be used to determine a strength. In one embodiment, the strength for each manipulation type is determined as illustrated by flowchart 122b of FIG. 1J, in which a block 135 includes determining for each manipulation type appropriate to the observed pose a distance between a first point from the model, corresponding to a first feature located on the portion of the hand or other detectable object and relevant to the manipulation type, and a second point, determined from a position of a virtual object. Block 136 includes determining a strength for the manipulation type as a function of the distance between the first point and the second point.

Further, strength can be based upon Virtual forces (e.g., virtual gravity, virtual electromagnetism, virtual charisma, etc.) enabling interactions with virtual objects over distances. For example, a "gravity grab" interaction in an astronomy genre gaming engine or physics teaching embodiments comprises emulating the force of gravity by selecting a function in which the strength is proportional to a "virtual mass" of the virtual object but declines with the square of the distance between the hand and the virtual object. In embodiments employing strength to emulate virtual properties of objects, virtual flexibility/rigidity enable interactions with virtual objects emulating one type of material to have different interactions than virtual objects emulating another type of material. For example, a virtual steel sphere will behave differently to a virtual "squeeze" than a virtual rubber sphere. Virtual properties (e.g., virtual mass, virtual distance, virtual flexibility/rigidity, etc.) and virtual forces (e.g., virtual gravity, virtual electromagnetism, virtual charisma, etc.), like virtual objects, can be created (i.e., having no analog in the physical world) or modeled (i.e., having an analog in the physical world). Normal vectors can be used to determine strengths modelling different surface characteristics of a virtual object.

Again with reference to FIG. 1F, in a block 123, a strength for the portion of the hand or other detectable object in the observable pose is determined from the set of strengths and corresponding manipulation types. In one embodiment, the strength is determined as illustrated by flowchart 123a of FIG. 1.1, in which a block 141 includes selecting a strength and a corresponding manipulation type from the set of strengths and manipulation types as the strength and the manipulation type for the portion of the hand or other detectable object in the observable pose. Alternatively, or in addition, as illustrated by flowchart 123b of FIG. 1K, in which a block 142 includes combining at plurality of strengths having compatible corresponding manipulation types selected from the set as the strength; and providing a dominant manipulation type selected from the compatible manipulation types for the portion of the hand or other detectable object in the observable pose. A dominant manipulation type can be determined using a system of weightings, hierarchical relationships, orderings or the like.

In an embodiment and by way of example, FIG. 1L illustrates a flow chart of a method 131*a* for determining one or more manipulation types based upon the predictive information. Based upon the manipulation type, a correct way to interpret inputs made by a position or a motion of the portion of the hand or other detectable object is determined. As shown in FIG. 1L, in a block 151, it is determined whether the predictive information indicates that the portion of a hand or other detectable object is in a pose suited to perform a "virtual pinch" of the object. For example, if the predictive information indicates a manipulation point between thumb and fore fingertip, a virtual pinch might be appropriate. If so, then in a block 151*a*, one or more manipulation types corresponding to "pinch" are selected for further consideration. Otherwise, in a block 152, it is determined whether the predictive information indicates that the portion of a hand or other detectable object is in a pose suited to perform a "virtual grasp" of the object. For example, if the predictive information indicates a manipulation point at the palm of the hand, a virtual grasp might be appropriate. If so, then in a block 152*a*, one or more manipulation types corresponding to "grasp" are selected for further consideration. Otherwise, in a block 153, it is determined whether the predictive information indicates that the portion of a hand or other detectable object is in a pose suited to perform a "virtual swipe" of the object. For example, if the predictive information indicates a manipulation point at the fingertips of the hand, a virtual swipe might be appropriate. If so, then in a block 153*a*, one or more manipulation types corresponding to "swipe" are selected for further consideration. Of course, other types of virtual interactions can be realized easily by straightforward applications of the techniques described herein by one skilled in the art.

In an embodiment and by way of example, FIG. 1M illustrates a flowchart 101*a* of one technique for detecting objects. Of course, objects can be detected in a variety of ways, and the method of flowchart 101*a* is illustrative rather than limiting. In a block 161, presence or variance of object(s) can be sensed using a detection system 90A (see e.g., FIGS. 7-8 below). In a block 162, detection system results are analyzed to detect object attributes based on changes in image or other sensed parameters (e.g., brightness, etc.). A variety of analysis methodologies suitable for providing object attribute and/or feature detection based upon sensed parameters can be employed in embodiments. Some example analysis embodiments are discussed below with reference to FIGS. 1N-1O. At block 163, the object's position and/or motion can be determined using a feature detection algorithm or other methodology. One example of an appropriate feature detection algorithm can be any of the tangent-based algorithms described in co-pending U.S. Ser. No. 13/414,485, filed Mar. 7, 2012, and Ser. No. 13/742,953, filed Jan. 16, 2013; however, other algorithms (e.g., edge detection, axial detection, surface detection techniques, etc.) can also be used in some embodiments.

Image analysis can be achieved by various algorithms and/or mechanisms. For example, FIG. 1N illustrates a flowchart 162*a* of one method for detecting edges or other features of object(s). This analysis embodiment can include a block 164, in which the brightness of two or more pixels is compared to a threshold. In a block 165, transition(s) in brightness from a low level to a high level across adjacent pixels are detected. In another example, FIG. 1O illustrates a flowchart 162*b* of an alternative method for detecting edges or other features of object(s), including a block 166 of comparing successive images captured with and without illumination by light source(s). In a block 167, transition(s) in brightness from a low level to a high level across corresponding pixels in the successive images are detected.

In a block 102, the predictive information corresponding to a portion of the hand or other detectable object that was detected is determined. As shown by FIG. 1P, a flowchart 102*a* includes a block 171 in which presence or variance of object(s) is sensed using a detection system, such as detection system 90A for example. Sensing can include capturing image(s), detecting presence with scanning, obtaining other sensory information (e.g., olfactory, pressure, audio or combinations thereof) and/or combinations thereof. In a block 172, portion(s) of object(s) as detected or captured are analyzed to determine fit to model portion(s) (see e.g., FIGS. 7-8). In a block 173, predictive information is refined to include the model portion(s) determined in block 172. In a block 174, existence of other sensed object portion(s) is determined. If other object portion(s) have been sensed, then the method continues processing the other object portion(s). Otherwise, the method completes.

Figure 2:
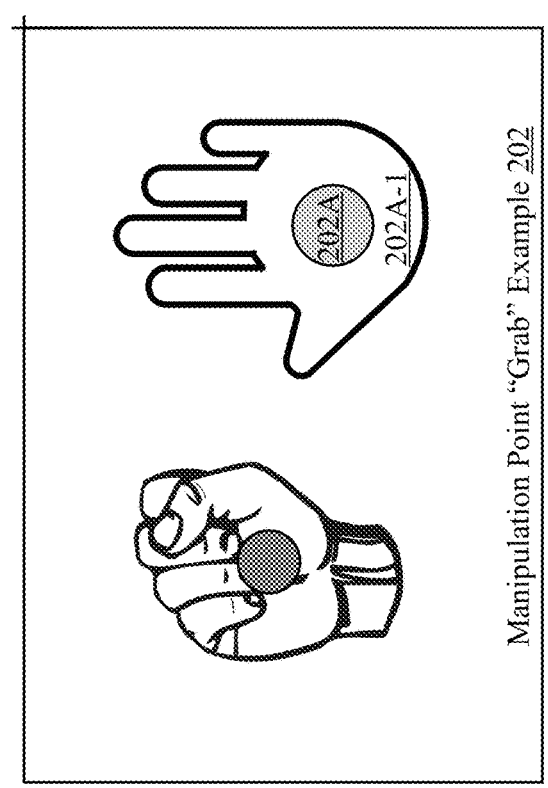
FIG. 2 illustrates a manipulation point example 201 depicting a process for determining a manipulation point 201A relative to a predictive model 201A-1 in an embodiment.
Figure 2:
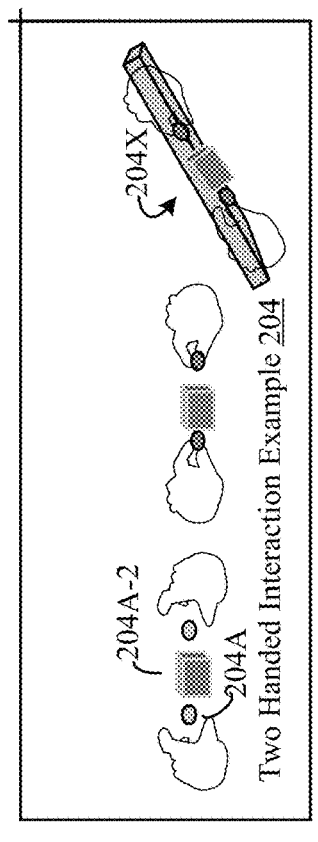
Figure 2:
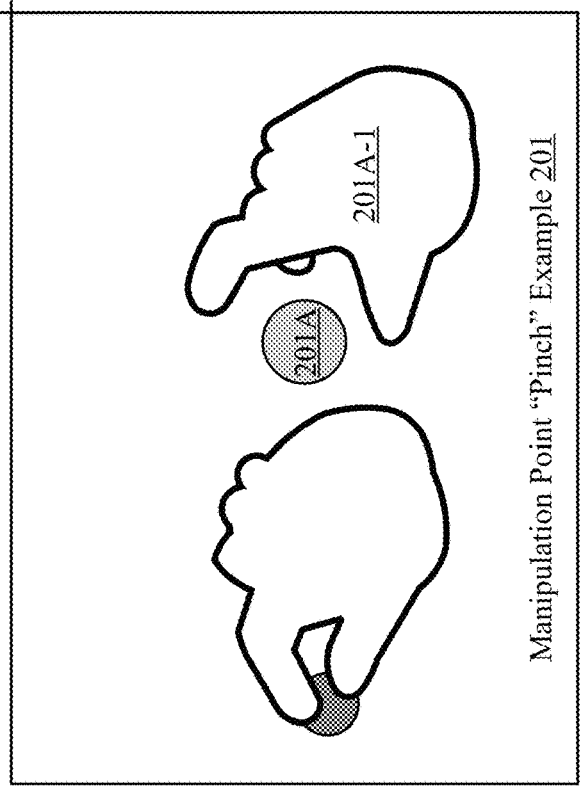
Figure 2:
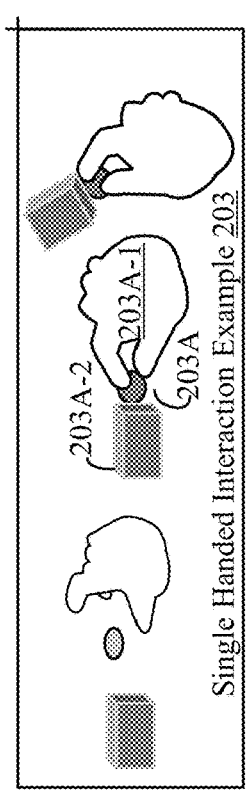

FIG. 2 illustrates a manipulation point example 201 depicting a process for determining a manipulation point 201A relative to a predictive model 201A-1 in an embodiment. A predictive model is a predicted virtual representation of at least a portion of physical data observed by a Motion Sensing Controller System (MSCS). In the embodiment illustrated by FIG. 2, the predictive model 201A-1 is a predicted virtual representation of at least a portion of a hand (i.e., a "virtual hand"), but could also include virtual representations of a face, a tool, or any combination thereof, for example as elaborated upon in commonly owned U.S. Provisional Patent Applications Nos. 61/871,790, 61/873, 758.

Manipulation point 201A comprises a location in virtual space; in embodiments this virtual space may be associated with a physical space for example as described in commonly owned U.S. patent application entitled "VELOCITY FIELD INTERACTION FOR FREE SPACE GESTURE INTERFACE AND CONTROL" to Issac Cohen (Ser. No. 14/516, 493). A manipulation point can comprise one or more quantities representing various attributes, such as for example a manipulation point "strength" attribute, which is indicated in FIG. 2 by the shading of manipulation point 201A.

A manipulation point can be used to describe an interaction in virtual space, properties and/or attributes thereof, as well as combinations thereof. In example 201, a manipulation point 201A represents a location of a "pinch" gesture in virtual space; the shading of the point as depicted by FIG. 2 indicates a relative strength of the manipulation point.

Now with reference to a manipulation point example 202, a manipulation point 202A comprises a strength and a location of a "grab" gesture 202A-1. Gestures can "occur" in physical space, virtual space and/or combinations thereof.

In embodiments, manipulation points, or attributes thereof, can be used to describe interactions with objects in virtual space. In single handed manipulation example 203 a virtual hand 203A-1 starts with a weak "pinch" manipulation point between the thumb and the index finger. The virtual hand 203A-1 approaches a virtual object 203A-2, and the thumb and index finger are brought closer together; this proximity may increase the strength of the manipulation point 203A. In embodiments, if the strength of the manipulation point exceeds a threshold and/or the manipulation point is in sufficient proximity to a virtual object, the virtual object can be "selected". Selection can comprise a virtual action (e.g., virtual grab, virtual pinch, virtual swipe and so forth) relative to the virtual object that represents a physical action that can be made relative to a physical object; however it is not necessary for the physical action nor the physical object to actually exist. Virtual actions can result in virtual results (e.g., a virtual pinch can result in a virtual deformation or a virtual swipe can result in a virtual translation). Thresholding (or other quantitative techniques) can be used to describe the extent of a virtual action yielding a virtual result depending on an object type and other properties of the scene. For example, a virtual rubber object can be virtually pinched according to a different threshold indicating virtual deformation of a surface of the virtual rubber object than a threshold indicating deformation of a virtual steel object.

As illustrated in single handed interaction example 203 once a manipulation point selects a virtual object, the virtual object can be rotated, translated, scaled, and otherwise manipulated. If the thumb and index finger of the virtual hand become separated, the strength of the manipulation point may decrease, and the object may be disengaged from the predictive model.

A two handed interaction example 204 illustrates a two-handed manipulation of a virtual object 204A-2 facilitated by a plurality of manipulation points 204A. The manipulation point 204A need not intersect the virtual object 204A-2 to select it. In an embodiment, a plurality of manipulation points may engage with one another and "lock" on as if one or more of the plurality was itself a virtual object. In an embodiment, two or more manipulation points may lock if they both exceed a threshold strength; this may define a "selection plane" 204X (or vector, or other mathematical construct defining a relationship) as illustrated in 204.

Figure 3:
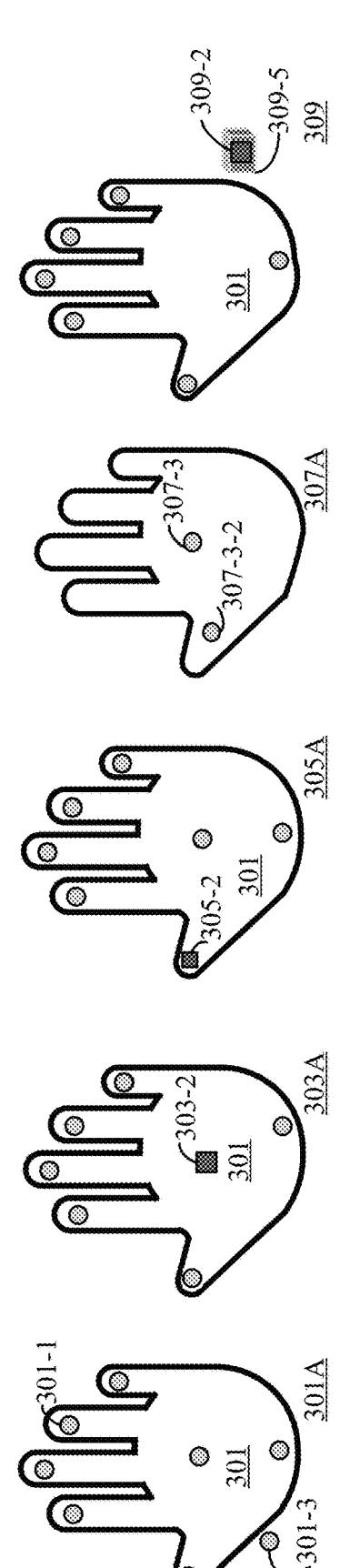
FIG. 3 illustrates determining parameters of a manipulation point based on the structure, scale, orientation, density, or other object properties of portions of a predictive model in an embodiment.
Figure 3:
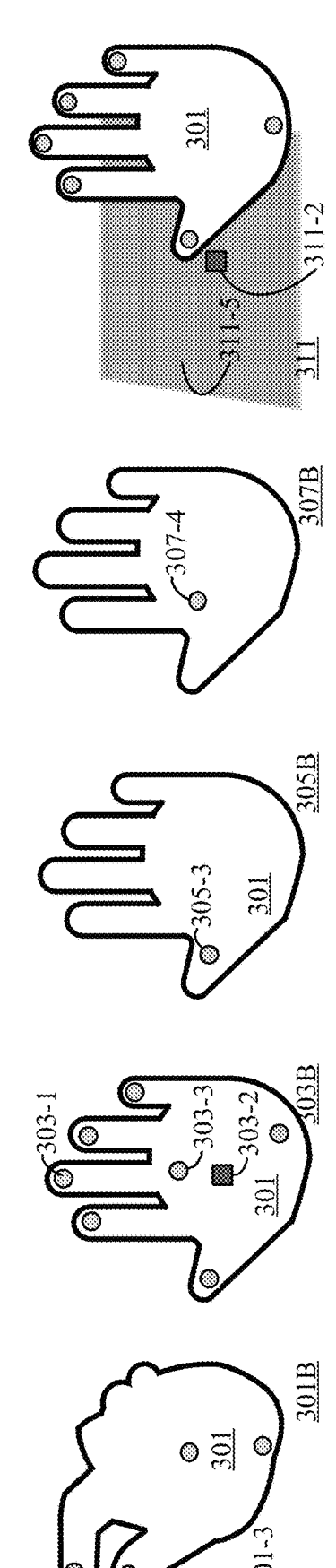
Figure 3:
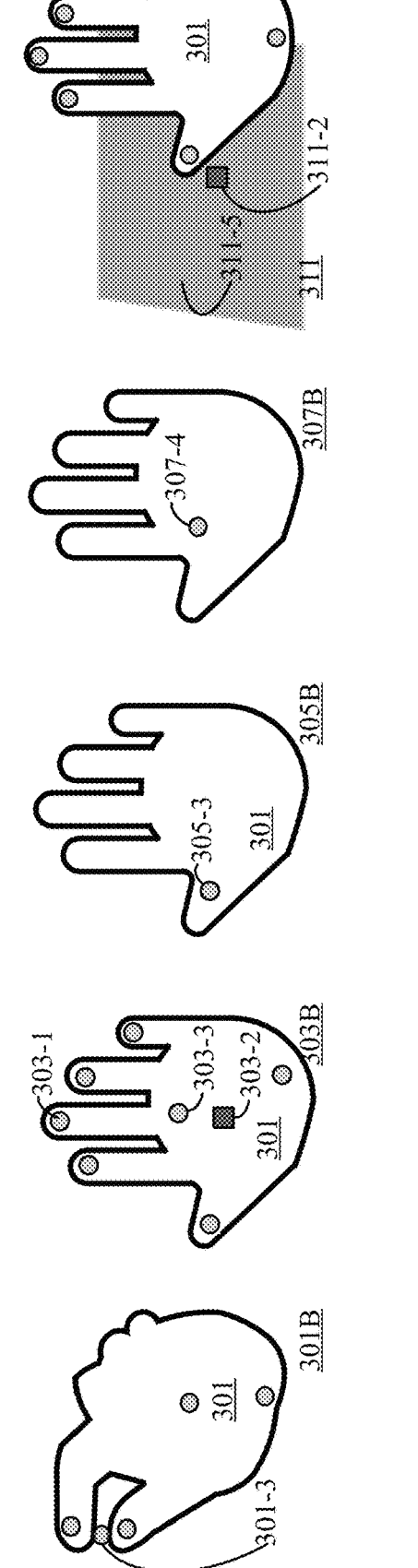

FIG. 3 illustrates determining parameters of a manipulation point based on the structure, scale, orientation, density, or other object properties of portions of a predictive model in an embodiment. In example 301A, a collection of "calculation points" 301-1 in proximity to a virtual hand 301 can be input into a "manipulation point determination method" to determine at least a portion of at least one parameter of a manipulation point 301-3. One example manipulation point determination method is determining a weighted average of distance from each calculation point to an anchor point. Calculation point(s) can evolve through space, however, as shown with reference to example 301B in comparison to example 301A. In example 301B underlying predictive model 301 has changed from previous configuration of predictive model 301 in Example 301A, and the manipulation point 301-3 is determined to be at a different location based at least in part on the evolution of model 301.

Now with reference to example 303A, an "anchor point" 303-2 can be defined as a calculation point and can serve as an input into the manipulation point determination method. For example, an anchor point can be selected according to a type of interaction and/or a location of where the interaction is to occur (i.e., a center of activity) (e.g., a pinch gesture indicates an anchor point between the thumb and index finger, a thrumming of fingertips on a desk indicates an anchor point located at the desk where the wrist is in contact). As shown with reference to example 303B in comparison to example 303A, a manipulation point 303-3 can be determined based at least in part upon the one or more calculation points 303-1 and the anchor point 303-2. For example, the location is determined in one embodiment using a weighted average of the locations of the calculation points with respect to the location of the anchor point. The strength of the manipulation point 303-3 can be determined in a variety of ways, such as for example according to a location of the calculation point determined to be "farthest" away from manipulation point 303-3. Alternatively, the strength could be determined according to a weighting of different distances of calculation points from the manipulation point 303-3. Other techniques can be used in various other embodiments.

In embodiments, the manipulation point(s) can be used to facilitate interactions in virtual space as described above with reference to FIG. 2. By moving an anchor point around relative to a predictive model, a resulting manipulation point can be in various locations. For example, with reference to example 305A, an anchor point 305-2 may be defined in a different location on the predictive model 301 in example 303A (as compared with anchor point 303-2 of model 301). In embodiments, the location of an anchor point can influence the type of manipulation point calculated. Now with reference to example 303B, the anchor point 303-3 could be used to define a "grab" point, while the configuration of example 305B yields a manipulation point 305-3 that can be used to define a pinch point. In embodiments, more than one anchor point can be used. In an embodiment, anchor and points and/or manipulation points can be treated as types of calculation points.

An anchor point 307-3 in example 307A can itself serve as a calculation point, thereby enabling determining a further refined manipulation point 307-4 as shown by example 307B. In an embodiment, a weighted average of the location and strength of a plurality of manipulation points 307-3, 307-3-2 in example 307 can be used to define a "general manipulation point" 307-4 in example 307B.

In embodiments, anchor or calculation points can be placed on objects external to the predictive model as illustrated with reference to example 309. As shown by example 309, an object 309-5, separate from predictive model 301 includes an anchor point 309-2. Object(s) 309-5 can be purely virtual constructs, or virtual constructs based at least on part on predictive models of physical objects as described above. In an embodiment illustrated with reference to example 311, such object is a "virtual surface" 311-5. Complex interactions can be enabled by determining the manipulation point of a predictive model 301 with respect to at least one anchor point 311-2 defined on virtual surface 311-5. In embodiments, such virtual surface can correspond to a desk, kitchen countertop, lab table or other work surface(s) in physical space. Association of anchor point 311-2 with virtual surface 311-5 can enable modeling of a user interaction "anchored" to a physical surface, e.g., a user's hand resting on a flat surface while typing while interacting meaningfully with the virtual space.

Figure 4:
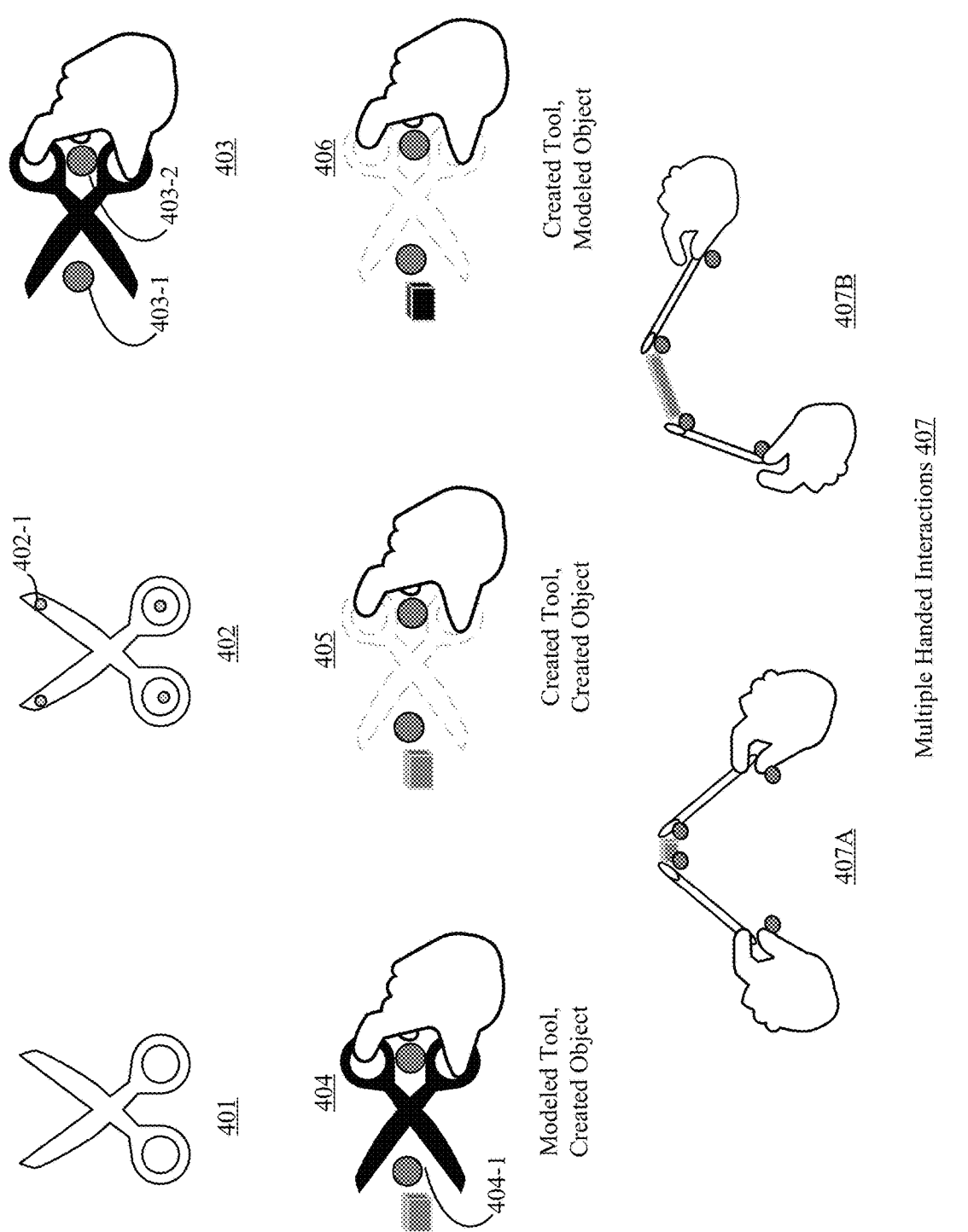
FIG. 4 illustrates a representative predictive models according to embodiments.

FIG. 4 illustrates a representative predictive models according to embodiments. A predictive model may also model a tool as illustrated by example 401. Calculation points can be defined as illustrated by example 402. As shown in example 402, a pair of scissors (could be a scalpel, stethoscope, sigmoid scope, dentistry implement, hammer, screwdriver, golf club, (chain)saw, or any other type of tool) may have one or more calculation points 402-1 defined in relation to it. For example, calculation points 402-1 can be defined relative to the tips of the blades of a pair of scissors and/or at the base hoops as illustrated by example 402.

A predictive model can be based upon an observed object in physical space, e.g., a real hand using a real pair of scissors). Any component of the predictive model could be, however entirely or partially created without reference to any particular object in physical space.

For example, a hand holding a tool may be interpreted by a system as a predictive model of a hand whose manipulation point 403-2 is engaging a predictive model of a scissors; the scissors model may itself have one or more manipulation points 403-1 which can be distinct from the one or more manipulation points 403-2 of the hand as illustrated by example 403.

In embodiments, various configurations of modeled physical objects and created objects can be represented as predictive models. For example, to enable users to use modeled tools or the hand to manipulate created objects as illustrated by example 404. In example 404, the harder the user "squeezes" the modeled tool, the higher the strength of the tool's manipulation point 404-1 (e.g., the strength indicates more or less vigorous cutting of the created object by the action of the user). In example 405, a created tool is used in conjunction with a created object. In yet further example 406, a created tool manipulates a modeled object. For example a physical CPR dummy modeled can be "operated upon" virtually by a surgeon using created tools in a mixed physical-virtual environment. More than one hand using one or more tools is illustrated by examples 407. In example 407A two hands are gripping two tools that are brought in proximity to a created object. In 407B, further interactions are illustrated, including for example the user is enabled to simultaneously stretch and rotate the created object.

Figure 5:
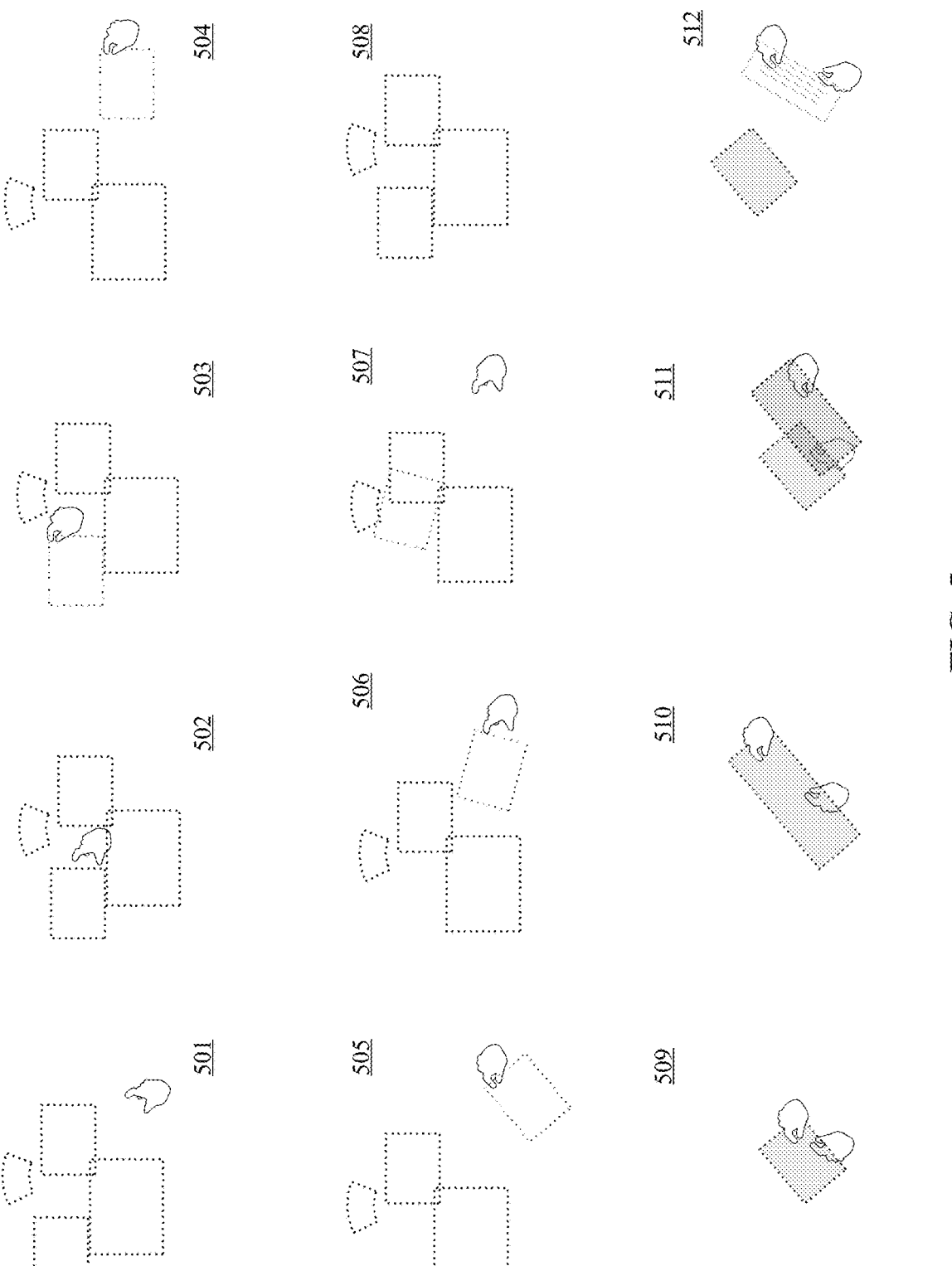
FIG. 5 illustrates manipulating virtual objects according to an embodiment.

FIG. 5 illustrates manipulating virtual objects according to an embodiment. As illustrated by example 501, a virtual object can be defined in virtual space as an object manipulable in space and capable of being presented to a user. For example, a user might employ a virtual reality headset (HIVID) or other mechanism(s) that project(s) images associated with virtual objects into space; in other applications the virtual objects may be holographic or other types of projections in space. In embodiments virtual objects can be visible virtual objects or non-visible virtual objects. Visible virtual objects can be a screen, image, 3D image, or combinations thereof. Non-visible virtual objects can be haptic, audio, 3D audio, combinations thereof. Virtual objects comprise associated data that can be a portion of text, a button, an icon, a data point or points, or some other data. The system can render the data associated with a virtual object as a visible object (e.g., display the text), a non-visible object (e.g., read the text aloud) or a combination thereof.

As illustrated by example 501, a user may reach in space and come into proximity with one or more virtual objects as illustrated by example 502. Using manipulation points or another technique a user can select a virtual object as illustrated by example 503. A user can drag the virtual object as illustrated by example 504 and manipulate it in preparation for use as illustrated by example 505. When the user is done with the virtual object, they may use one of a variety of techniques to return the virtual object to its initial position or to a different position. Example 506 illustrates an embodiment in which the user is able to throw the virtual object, and the virtual object's trajectory and placement are determined at least in part by a system simulating the physics behind a hypothetical trajectory as illustrated by example 507 (object in transit) and example 508 (object at a final resting point).

Embodiments permit the use of two-handed manipulations of virtual objects. As illustrated by example 509, a user may hold a virtual object in place with one hand while manipulating the object with the other hand. Users can stretch, shrink, contort and otherwise transform virtual objects in the same ways as the virtual object manipulations described above as illustrated by example 510. In embodiments, a virtual construct (i.e., plane) can be defined in proximity to the virtual object to enable engagements with the object as illustrated by example 511. One use of such virtual constructs is further described in commonly owned U.S. patent application Ser. Nos. 14/154,730, 14/280,018, and 14/155,722. In an embodiment, real and/or virtual objects can be used in conjunction with a manipulated object. For example a real or virtual keyboard can be used with a virtual screen as illustrated by example 512.

Figure 6:
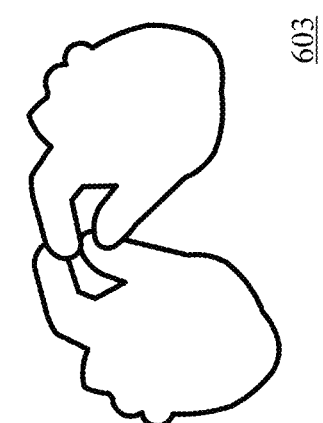
FIG. 6 illustrates self-interacting hands according to an embodiment.
Figure 6:
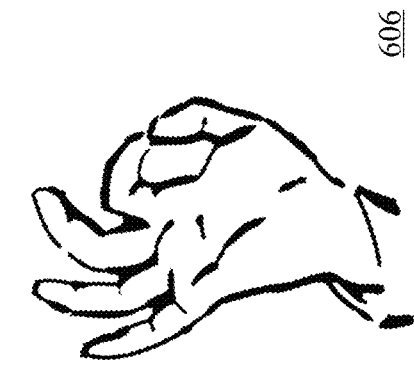
Figure 6:
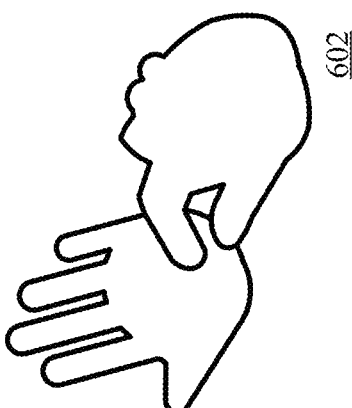
Figure 6:
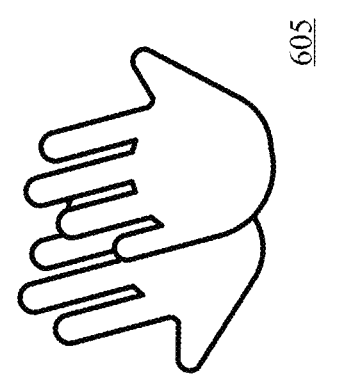
Figure 6:
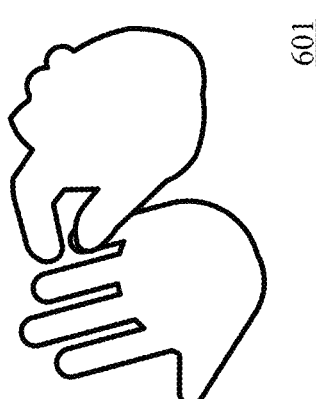
Figure 6:
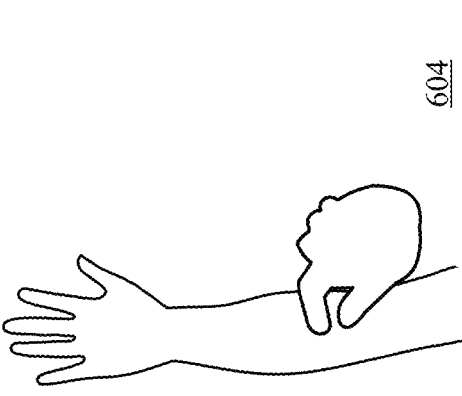

FIG. 6 illustrates self-interacting hands according to an embodiment. Using the manipulation points described above or other techniques, sophisticated user interactions can be defined in virtual spaces. In one embodiment, a virtual space can be configured to detect the pinching of a portion of one hand by another as illustrated by example 601. The tapping of one hand against the portion of another can also be detected as illustrated by example 602. The system can detect pinching or pressing of one hand portion against another hand portion as illustrated by example 603. As illustrated by example 604, detection can extend to the manipulation of a user's limb portion by a hand. In embodiments the proximity of two hands can be detected as illustrated by example 605. The self-interaction of a hand can also be detected, for example finger pinching or flicking gestures as illustrated by example 606. The detection of such gestures can permit semi-haptic virtual interactions, such as the flicking of an enemy in a video game, or the closing of a screen in a user interface. In embodiments, virtual data may overlay a predictive model in real or virtual space; for example, holographic data may be projected on the arm depicted in example 604, and self-interactions with the data registered by the system and meaningfully processed.

Figure 7:
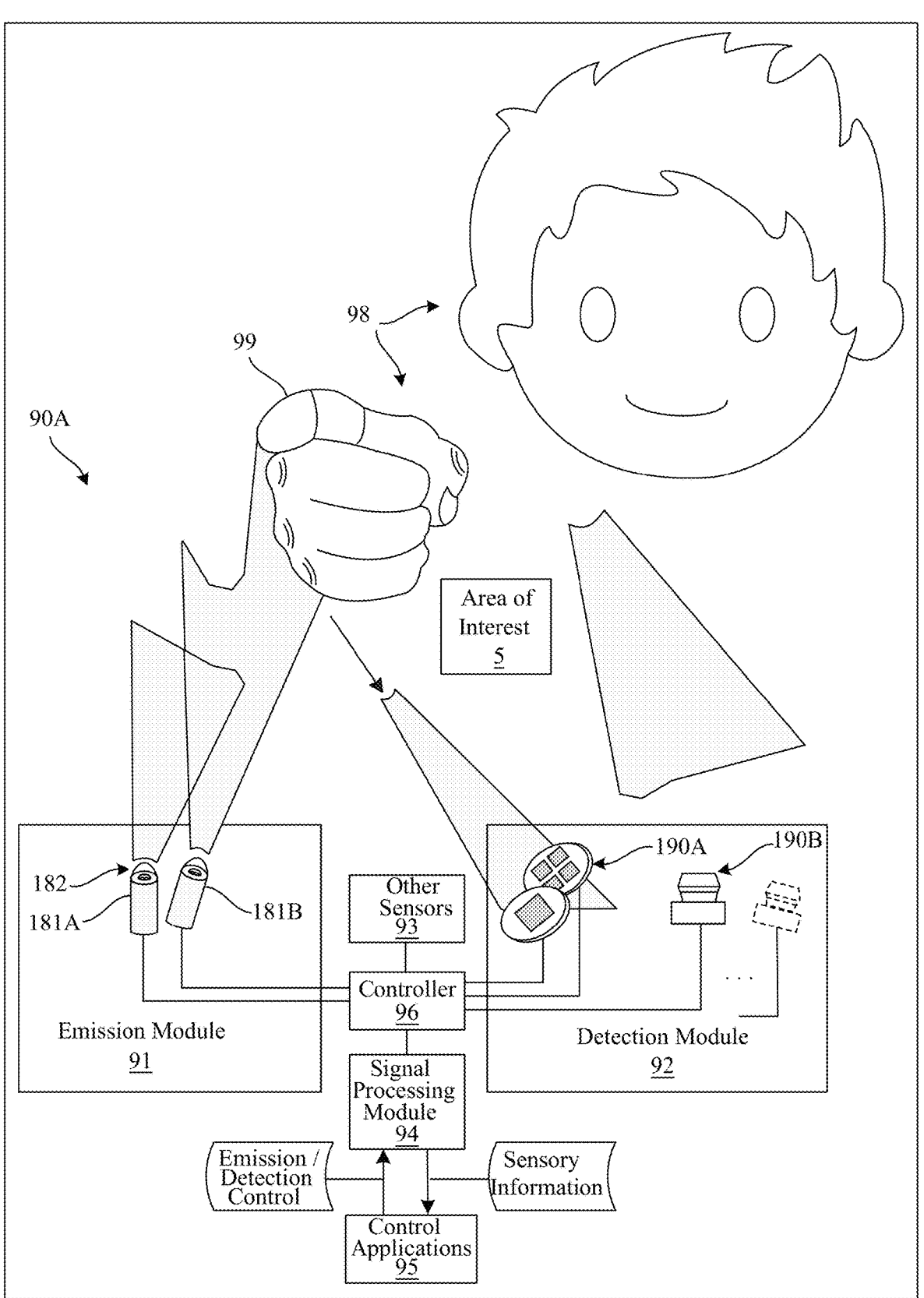
Figure 8:
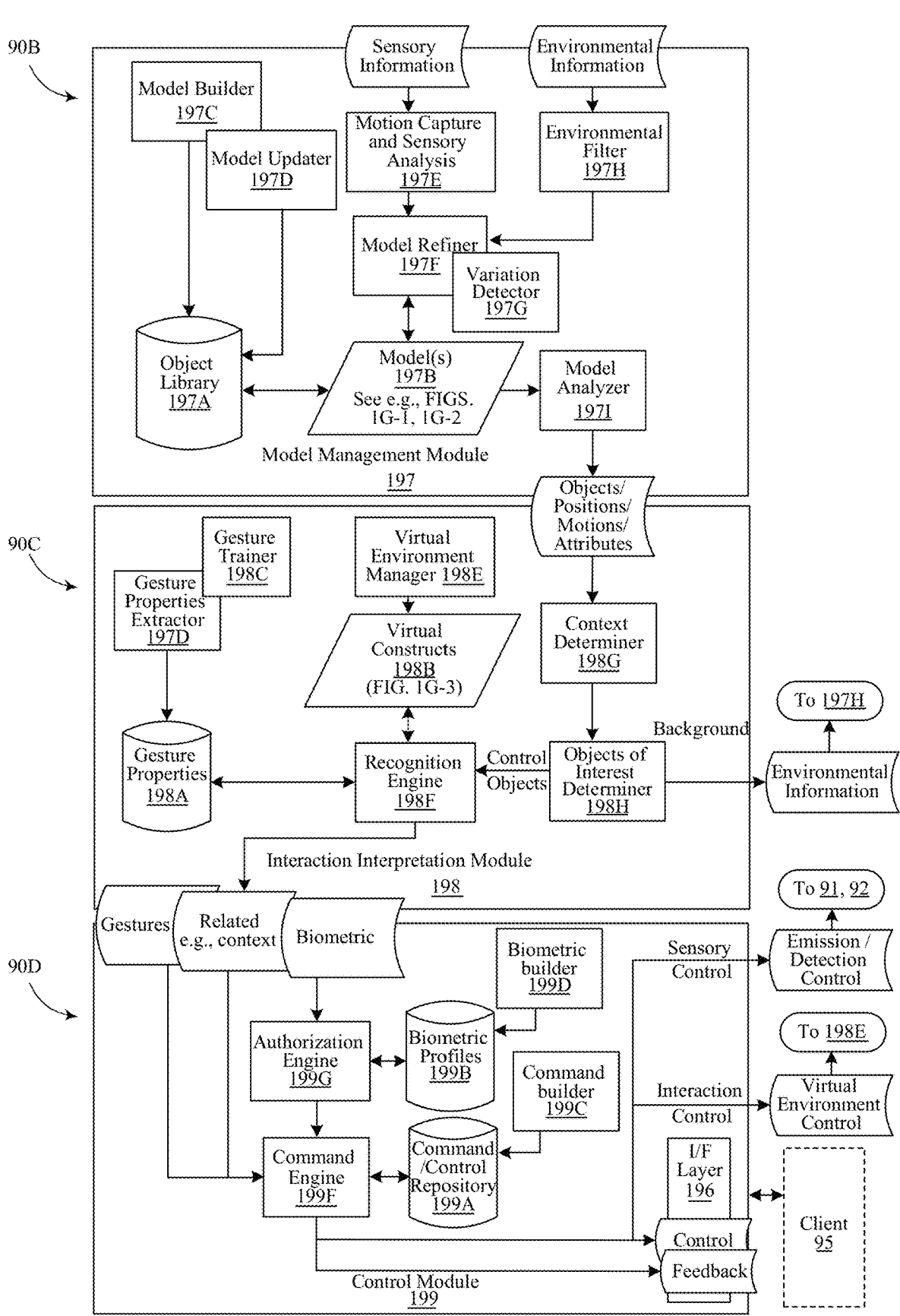
Figures 2, 8:
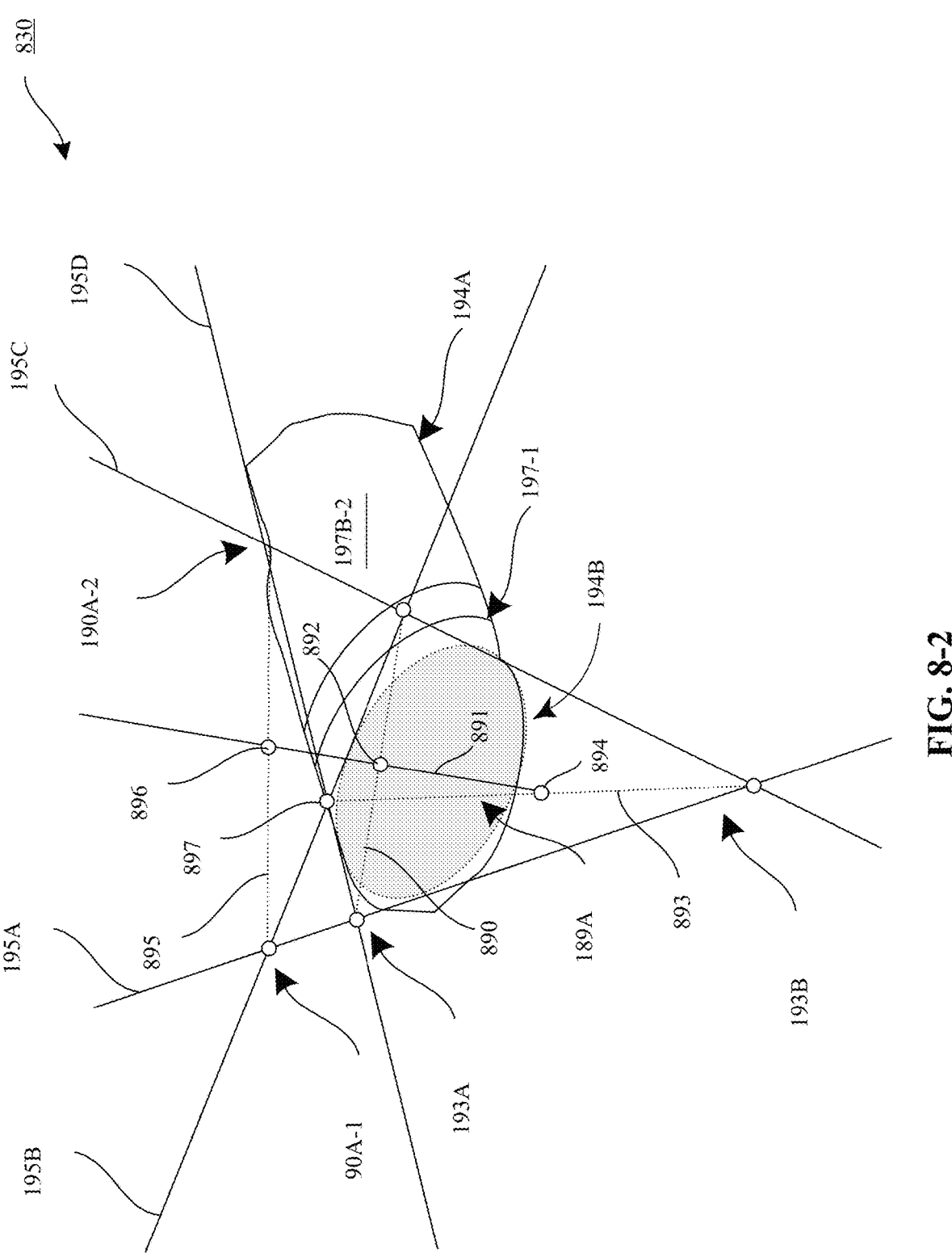
Figures 3, 8:
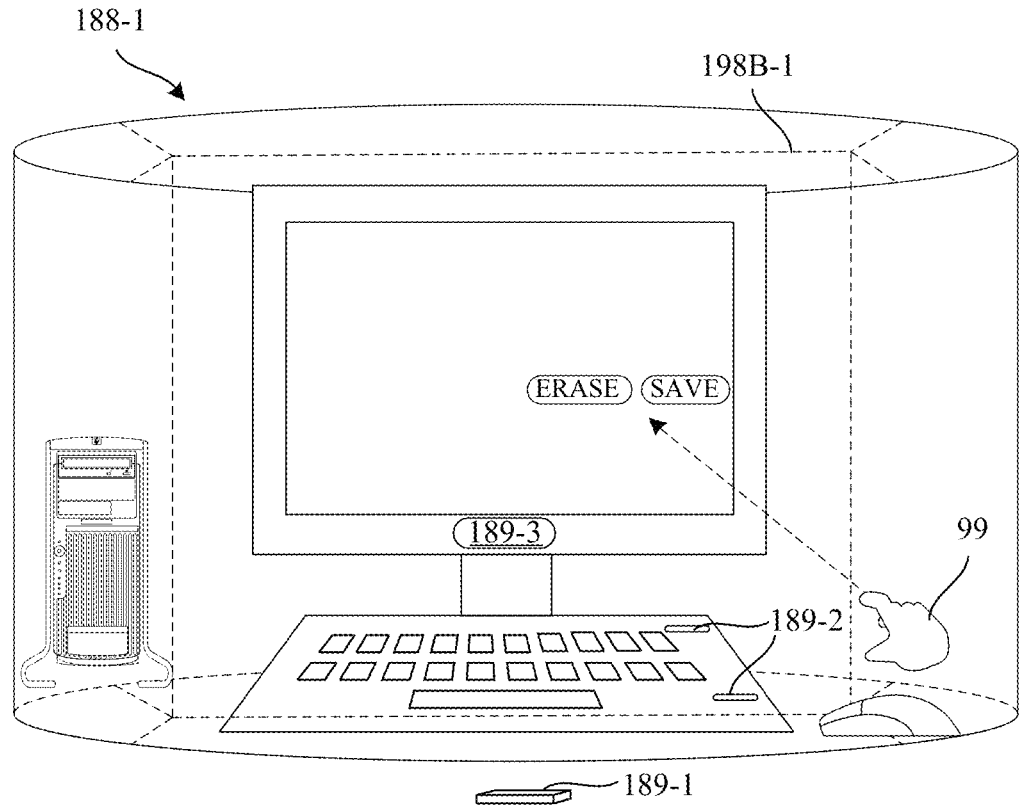
Figures 4, 8:
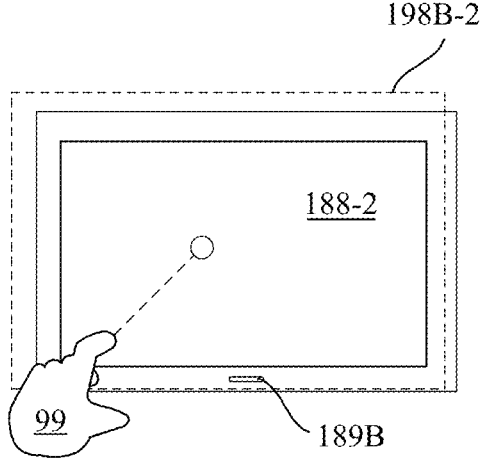

FIGS. 7-8 illustrate an exemplary machine sensory and control system (MSCS) in embodiments.

In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

As FIG. 7 shows, one detection system 90A embodiment includes an emission module 91, a detection module 92, a controller 96, a processing module 94 and a machine control module 95. In one embodiment, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 8-1), image directing film (IDF) 182C (of FIG. 7-1), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 7-1) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 7-2) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 7-2) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 7-2) (e.g., lenses 192A (of FIG. 7-2), multi-lenses 192B (of FIG. 7-2), image directing film (IDF) 192C (of FIG. 7-2), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 7-2), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

For example and with reference to FIG. 8, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 8-1, 8-2)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2 of FIGS. 8-1-8-2), useful to define and update models 197B, and model attributes 197-5. While illustrated with reference to a particular embodiment in which models, model components and attributes are co-located within a common object library 197A, it should be understood that these objects will be maintained separately in some embodiments.

Figures 1, 7:
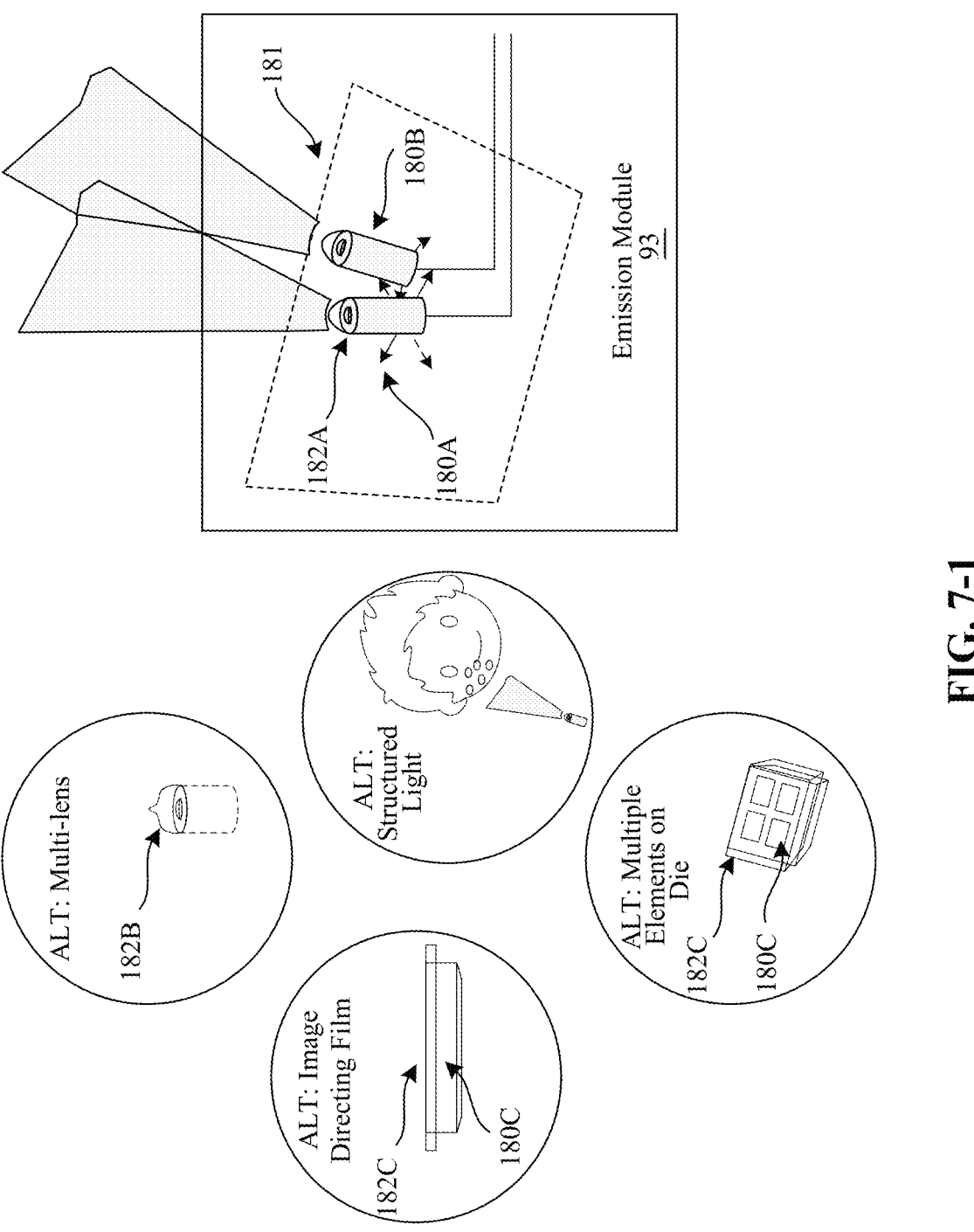
Figures 2, 7:
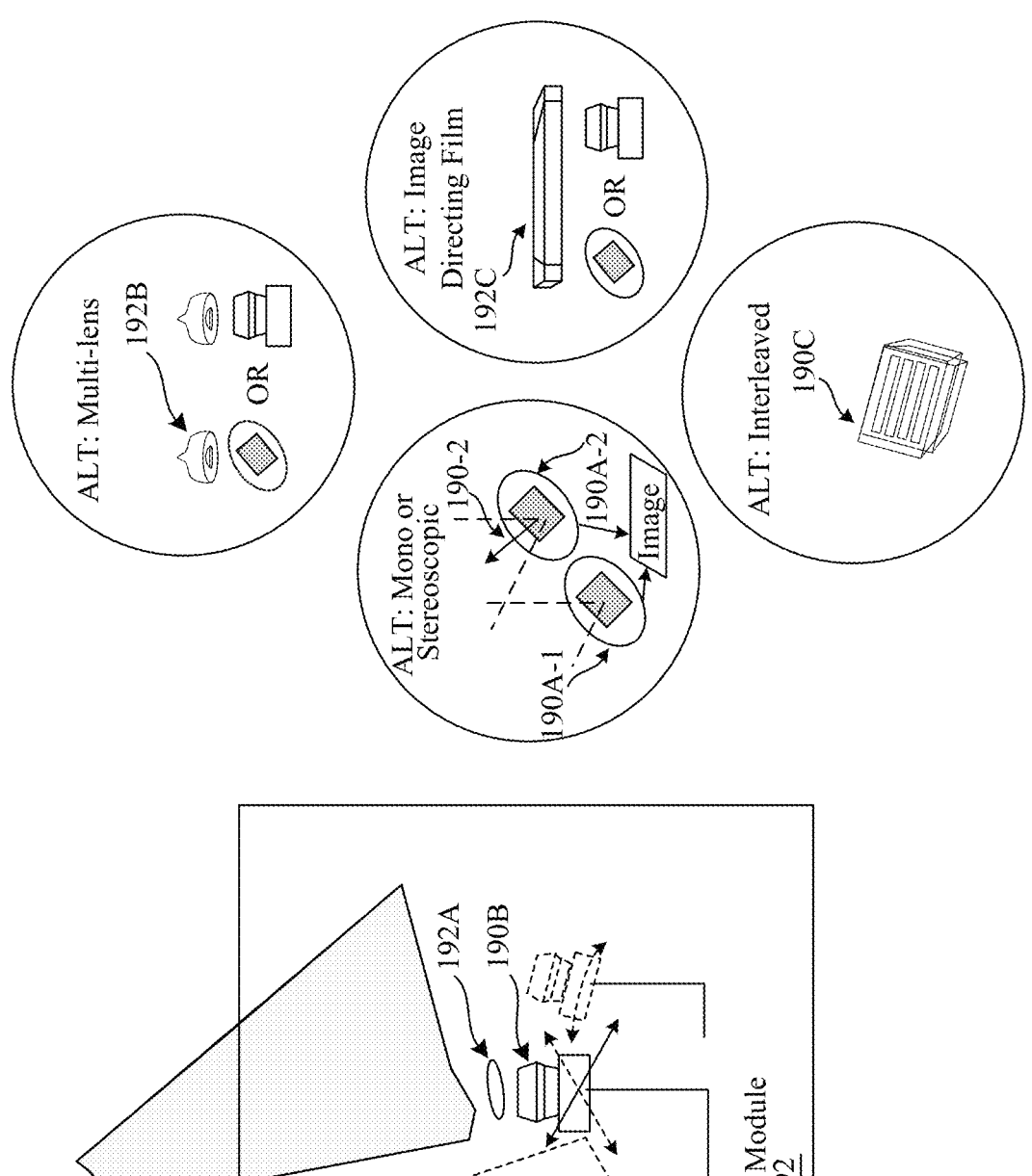

FIG. 8-1 illustrates predictive information including a model 197B-1 of a control object (e.g., FIG. 7: 99) constructed from one or more model subcomponents 197-2, 197-3 selected and/or configured to represent at least a portion of a surface of control object 99, a virtual surface portion 194 and one or more attributes 197-5. Other components can be included in predictive information 197B-1 not shown in FIG. 8-1 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

In an embodiment and with reference to FIGS. 7, 8-2, updating predictive information to observed information comprises selecting one or more sets of points (e.g., FIG. 8-2:193A, 193B) in space surrounding or bounding the control object within a field of view of one or more image capture device(s). As shown by FIG. 8-2, points 193 can be determined using one or more sets of lines 195A, 195B, 195C, and 195D originating at vantage point(s) (e.g., FIG. 7: 190-1, 190-2) associated with the image capture device(s) (e.g., FIG. 7: 190A-1, 190A-2) and determining therefrom one or more intersection point(s) defining a bounding region (i.e., region formed by lines FIG. 8-2: 195A, 195B, 195C, and 195D) surrounding a cross-section of the control object. The bounding region can be used to define a virtual surface (FIG. 8-2: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one embodiment illustrated by FIG. 8-2, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 - (2C_1 x_C + C_2 y_C)x - \qquad (1)$$

$$(2C_3 y_C + C_2 x_C)y + \left(C_1 x_C^2 + C_2 x_C y_C + C_3 y_C^2 - 1\right) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for $\theta$, subject to the constraints that: (1) $(x_C, y_C)$ must lie on the centerline determined from the four tangents 195A, 195B, 195C, and 195D (i.e., centerline 189A of FIGS. 8-2); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$

$$A_2 x + B_2 y + D_2 = 0$$

$$A_3 x + B_3 y + D_3 = 0$$

$$A_4 x + B_4 y + D_4 = 0 \qquad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \qquad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

23

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1=(r_{13}+r_{24})/2$$

$$c2=(r_{14}+r_{23})/2$$

$$\delta 1=c2_1-c1_1$$

$$\delta 2=c2_2-c1_2$$

$$p=\delta 1/\delta 2$$

$$q=c1_1-c1_2*p$$

$$G=Ap+B$$

$$H=Aq+D \qquad (4)$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$v = \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \begin{bmatrix} 0 \\ 0 \\ 1 \end{bmatrix} \qquad (5)$$

$$w = \begin{bmatrix} G_2^2 & G_3^2 & G_4^2 \\ (G_2H_2)^2 & (G_3H_3)^2 & (G_4H_4)^2 \\ H_2^2 & H_3^2 & H_4^2 \end{bmatrix} \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for θ is accomplished by solving the eighth-degree polynomial equation (6) for t, where the coefficients $Q_i$ (for i=0 to 8) are defined as shown in equations (7)-(15).

$$0=Q_8 t^8+Q_7 t^7+Q_6 t^6+Q_5 t^5+Q_4 t^4+Q_3 t^3+Q_2 t^2+Q_1 t+Q_0 \qquad (6)$$

The parameters $A_1$, $B_1$, $G_1$, $H_1$, $v_{A2}$, $v_{AB}$, $V_{B2}$, $w_{A2}$, $w_{AB}$, and $w_{B2}$ used in equations (7) (15) are defined as shown in equations (1)-(4). The parameter n is the assumed semi-major axis (in other words, $a_0$). Once the real roots t are known, the possible values of θ are defined as θ=a tan(t).

$$Q_8 = 4A_1^2 n^2 v_{B2}^2 + 4v_{B2}B_1^2(1-n^2 v_{A2}) - \qquad (7)$$

$$\left(G_1(1-n^2 v_{A2})w_{B2}+n^2 v_{B2}w_{A2}+2H_1 v_{B2}\right)^2$$

$$Q_7 = -\left(2\left(2n^2 v_{AB}w_{A2}+4H_1 v_{AB}+2G_1 n^2 v_{AB}w_{B2}+2G_1(1-n^2 v_{A2})w_{AB}\right)\right) \qquad (8)$$

$$\left(G_1(1-n^2 v_{A2})w_{B2}+n^2 v_{B2}w_{A2}+2H_1 v_{B2}\right) - 8A_1 B_1 n^2 v_{B2}^2 +$$

24

-continued $$16A_1^2 n^2 v_{AB}v_{B2} + \left(4\left(2A_1 B_1(1-n^2 v_{A2})+2B_1^2 n^2 v_{AB}\right)\right)v_{B2} +$$

$$8B_1^2(1-n^2 v_{A2})v_{AB}$$

$$Q_6 = -\left(2\left(2H_1 v_{B2}+2H_1 v_{A2}+n^2 v_{A2}w_{A2}+n^2 v_{B2}(-2w_{AB}+W_{B2}) + \right.\right. \qquad (9)$$

$$G_1(n^2 v_{B2}+1)w_{B2}+4G_1 n^2 v_{AB}w_{AB}+G_1(1-n^2 v_{A2})v_{A2})) \times$$

$$\left(G_1(1-n^2 v_{A2})w_{B2}+n^2 v_{B2}w_{A2}+2H_1 v_{B2}\right) -$$

$$\left(2n^2 v_{AB}w_{A2}+4H_1 v_{AB}+2G_1 n^2 v_{AB}w_{B2}+2G_1(1-n^2 v_{A2})w_{AB}\right)^2 +$$

$$4B_1^2 n^2 v_{B2}^2 - 32A_1 B_1 n^2 v_{AB}v_{B2} +$$

$$4A_1^2 n^2\left(2v_{A2}v_{B2}+4v_{AB}^2\right)+4A_1^2 n^2 v_{B2}^2 +$$

$$\left(4\left(A_1^2(1-n^2 v_{A2})+4A_1 B_1 n^2 v_{AB}+B_1^2(-n^2 v_{B2}+1)+B_1^2(!-n^2 v_{AB})\right)\right)v_{B2} +$$

$$\left(8\left(2A_1 B_1(1-n^2 v_{A2})+2B_1^2 n^2 v_{AB}\right)\right)v_{AB}+4B_1^2(1-n^2 v_{A2})v_{A2}$$

$$Q_5 = -\left(2\left(4H_1 v_{AB} + \right.\right. \qquad (10)$$

$$2G_1(-n^2 v_{B2}+1)w_{AB}+2G_1 n^2 v_{AB}v_{A2}+2n^2 v_A(-2w_{AB}+w_{B2})))$$

$$\left(G_1(1-n^2 v_{A2})w_{B2}+n^2 v_{B2}w_{A2}+2H_1 v_{B2}\right) -$$

$$\left(2\left(2H_1 v_{B2}+2H_1 v_{A2}+n^2 v_{A2}w_{A2}+n^2 v_{B2}(-2w_{AB}+W_{B2}) + \right.\right.$$

$$G_1(-n^2 v_{B2}+1)w_{B2}+4G_1 n^2 v_{AB}w_{AB}+G_1(!-n^2 v_{A2})v_{A2})) \times$$

$$\left(2n^2 v_{AB}w_{A2}+4H_1 v_{AB}+2G_1 n^2 v_{AB}w_{B2}+2G_1(1-n^2 v_{A2})w_{AB}\right) +$$

$$16B_1^2 n^2 v_{AB}v_{B2} - 8A_1 B_1 n^2\left(2v_{A2}v_{B2}+4v_{AB}^2\right) +$$

$$16A_1^2 n^2 v_{A2}v_{AB} -$$

$$8A_1 B_1 n^2 v_{B2}^2 + 16A_1^2 n^2 v_{AB}v_{B2} +$$

$$\left(4\left(2A_1^2 n^2 v_{AB}+2A_1 B_1(-n^2 v_{B2}+1)+2A_1 B_1(1-n^2 v_{A2})+2B_1^2 n^2 v_{AB}\right)\right)$$

$$v_{B2} +$$

$$\left(8\left(A_1^2(1-n^2 v_{A2})+4A_1 B_1 n^2 v_{AB}+B_1^2(-n^2 v_{B2}+1)+B_1^2(1-n^2 v_{A2})\right)\right)$$

$$v_{AB}+\left(4\left(2A_1 B_1(1-n^2 v_{A2})+2B_1^2 n^2 v_{AB}\right)\right)v_{A2}$$

$$Q_4 = \qquad (11)$$

$$\left(4\left(A_1^2(-n^2 v_{B2})+A_1^2(1-n^2 v_{A2})+4A_1 B_1 n^2 v_{AB}+B_1^2(-n^2 v_{B2}+1)\right)\right)v_{B2} +$$

$$\left(8\left(2A_1^2 n^2 v_{AB}+2A_1 B_1(-n^2 v_{B2}+1)+2A_1 B_1(1-n^2 v_{A2}) + \right.\right.$$

$$2B_1^2 n^2 v_{AB}\left((v_{AB}+\left(4\left(A_1^2(1-n^2 v_{A2})+4A_1 B_1 n^2 v_{AB}+B_1^2(-n^2 v_{B2}+1) + \right.\right.\right.$$

$$B_1^2(1-n^2 v_{A2})))v_{A2}+4B_1^2 n^2\left(2v_{A2}v_{B2}+4v_{AB}^2\right)-32A_1 B_1 n^2 v_{A2}v_{AB} +$$

$$4A_1^2 n^2 v_{A2}^2+4B_1^2 n^2 v_{B2}^2-32A_1 B_1 n^2 v_{AB}v_{B2}+4A_1^2 n^2\left(@v_{A2}v_{B2}+4v_{AB}^2\right) -$$

$$\left(2\left(G_1(-n^2 v_{B2}+1)v_{A2}+n^2 v_{A2}(-2w_{AB}+w_{B2})+2H_1 v_{A2}\right)\right)$$

$$\left(G_1(1-n^2 v_{A2})w_{B2}+n^2 v_{B2}w_{A2}+2H_1 v_{B2}\right)-\left(2\left(4H_1 v_{AB}+2\right.\right.$$

$$G_1(-n^2 v_{B2}+1)w_{AB}+2G_1 n^2 v_{AB}v_{A2}+2n^2 v_{AB}(-2w_{AB}+w_{B2}))) \times$$

$$\left(2n^2 v_{AB}w_{A2}+4H_1 v_{AB}+2G_1 n^2 v_{AB}w_{B2}+2G_1(1-n^2 v_{A2})w_{AB}\right) -$$

$$\left(2H_1 v_{B2}+2H_1 v_{A2}+n^2 v_{A2}w_{A2}+n^2 v_{B2}(-2w_{AB}+w_{B2}) + \right.$$

$$G_1(-n^2 v_{B2}+1)w_{B2}+4G_1 n^2 v_{AB}w_{AB} +$$

$$G_1(1-n^2 v_{A2})v_{A2}\right)^2$$

$$Q_3 = -\left(2\left(G_1\left(-n^2 v_{B2} + 1\right)v_{A2} + n^2 v_{A2}(-2w_{AB} + w_{B2}) + 2H_1 v_{A2}\right)\right) \quad (12)$$

$$\left(2n^2 v_{AB} w_{A2} + 4H_1 v_{AB} + 2G_1 n^2 v_{AB} w_{AB} + 2G_1\left(1 - n^2 v_{A2}\right)w_{AB}\right) -$$

$$\left(2\left(4H_1 v_{AB} + 2G_1\left(-n^2 v_{B2} + 1\right)w_{AB} + \right.\right.$$

$$2G_1 n^2 v_{AB} v_{A2} + 2n^2 v_{AB}(-2w_{AB} + w_{B2})\right)\right) \times$$

$$\left(2H_1 v_{B2} + 2H_1 v_{A2} + n^2 v_{A2} w_{A2} + n^2 v_{B2}(-2w_{AB} + w_{B2}) = \right.$$

$$G_1\left(-n^2 v_{B2} + 1\right)w_{B2} + 4G_1 n^2 v_{AB} w_{AB} + G_1\left(1 - n^2 v_{A2}\right)v_{A2}\right) +$$

$$16 B_1^2 n^2 v_{A2} v_{AB} - 8 A_1 B_1 n^2 v_{A2}^2 + 16 B_1^2 n^2 v_{AB} v_{B2} -$$

$$8 A_1 B_1 n^2\left(2 v_{A2} v_{B2} + 4 v_{AB}^2\right) + 16 A_1^2 n^2 v_{A2} v_{AB} +$$

$$\left(4\left(2 A_1^2 n^2 v_{AB} + 2 A_1 B_1\left(-n^2 v_{B2} + 1\right)\right)\right)v_{B2} +$$

$$\left(8\left(A_1^2\left(-n^2 v_{B2} + 1\right) + A_1^2\left(1 - n^2 v_{A2}\right) + 4 A_1 B_1 n^2 v_{AB} + B_1\left(^2 - n^2 v_{B2} + 1\right)\right)\right)$$

$$v_{AB} +$$

$$\left(4\left(2 A_1^2 n^2 v_{AB} + 2 A_1 B_1\left(-n^2 v_{B2} + 1\right) + 2 A_1 B_1\left(1 - n^2 v_{A2}\right) + 2 B_1^2 n^2 v_{AB}\right)\right)v_{A2}$$

$$Q_2 = 4 A_1^2\left(-n^2 v_{B2} + 1\right)v_{B2} + \left(8\left(2 A_1^2 n^2 v_{AB} + 2 A_1 B_1\left(-n^2 v_{B2} + 1\right)\right)\right)v_{AB} + \quad (13)$$

$$\left(4\left(A_1^2\left(-n^2 v_{B2} + 1\right) + A_1^2\left(1 - n^2 v_{A2}\right) + 4 A_1 B_1 n^2 v_{AB} + B_1^2\left(-n^2 v_{B2} + 1\right)\right)\right)$$

$$v_{A2} + 4 B_1^2 n^2 v_{A2}^2 + 4 B_1^2 n^2\left(2 v_{A2} v_{B2} + 4 v_{AB}^2\right) - 32 A_1 B_1 n^2 v_{A2} v_{AB} +$$

$$4 A_1^2 n^2 v_{AB}^2 - \left(2\left(G_1\left(-n^2 v_{B2} + 1\right)v_{A2} + n^2 v_{A2}(-2w_{AB} + w_{B2}) + 2H_1 v_{A2}\right)\right) \times$$

$$\left(2H_1 v_{B2} + 2H_1 v_{A2} + n^2 v_{A2} w_{A2} + n^2 v_{B2}(-2w_{AB} + W_{B2}) + \right.$$

$$G_1\left(-n^2 v_{B2} + 1\right)w_{B2} + 4G_1 n^2 v_{AB} w_{AB} + G_1\left(1 - n^2 v_{A2}\right)v_{A2}\right) -$$

$$H_1 v_{AB} + 2G_1\left(-n^2 v_{B2} + 1\right)w_{AB} + 2G_1 n^2 v_{AB} v_{A2} + 2n^2 v_{AB}(-2w_{AB} + w_{B2})\right)^2$$

$$Q_1 = 8 A_1^2\left(-n^2 v_{B2} + 1\right)v_{AB} + \left(4\left(2 A_1^2 n^2 v_{AB} + 2 A_1 B_1\left(-n^2 v_{B2} + 1\right)\right)\right)v_{A2} + \quad (14)$$

$$16 B_1^2 n^2 v_{A2} v_{AB} - 8 A_1 B_1 n^2 v_{A2}^2 -$$

$$\left(2\left(G_1\left(-n^2 v_{B2} + 1\right)v_{A2} + n^2 v_{A2} + n^2 v_{A2}(-2w_{AB} + w_{B2}) + 2H_1 v_{A2}\right)\right)$$

$$\left(4H_1 v_{AB} + 2G_1\left(-n^2 v_{B2} + 1\right)w_{AB} + \right.$$

$$2G_1 n^2 v_{AB} v_{A2} + 2n^2 v_{AB}(-2w_{AB} + W_{B2})\right)$$

$$Q_0 = 4 A_1^2\left(-n^2 v_{B2} + 1\right)v_{A2} - \quad (15)$$

$$\left(G_1\left(-n^2 v_{B2} + 1\right)v_{A2}(-2w_{AB} + w_{B2}) + 2H_1 v_{A2}\right)^2 + 4 B_1^2 n^2 v_{A2}^2$$

In this exemplary embodiment, equations (6)-(15) have at most three real roots; thus, for any four tangent lines, there are at most three possible ellipses that are tangent to all four lines and that satisfy the a=$a_0$ constraint. (In some instances, there may be fewer than three real roots.) For each real root $\theta$, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters {$\theta$, a=$a_0$, b, $(x_C, y_C)$}. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Again with reference to FIG. 8, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as gestures and/or other command inputs (i.e., gestures and/or other command inputs (e.g., speech, etc.)), related information (i.e., biometrics), environmental information (i.e., context, noise, etc.) and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 8-3, 8-4: 198B-1, 198B-2) to recognize variations in control object presence or motion indicating command information, related information, environmental information and other information discernable from the object, position, motion and attribute information that might be useful in controlling a machine. With reference to FIG. 8-3, 8-4, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

FIG. 8-2 illustrates how a centerline can be found for an intersection region. Region 194B is a "closed" intersection region; that is, it is bounded by tangents 195A, 195B, 195C, 195D. The centerline can be found by identifying diagonal line segments 890, 893 that connect the opposite corners of region 194B, identifying the midpoints 892, 894 of these line segments, and identifying the line segment 891 joining the midpoints as the centerline.

Region 830 is an "open" intersection region; that is, it is only partially bounded by tangents 195A, 195B, 195C, 195D. In this case, only one diagonal, line segment 895, can be defined. To define a centerline for region 830, centerline 891 from closed intersection region 194B can be extended into region 830 as shown. The portion of extended centerline 891 that is beyond line segment 895 is centerline 891 for region 830. In general, for any given set of bounding line segments, both region 194B and region 830 can be considered during the solution process. (Often, one of these regions is outside the field of view of the cameras and can be discarded at a later stage.) Defining the centerline reduces the number of free parameters from five to four because yC can be expressed as a (linear) function of xC (or vice versa), based solely on the four bounding line segments. However, for every point (xC, yC) on the centerline, a set of parameters {ÿ, a, b} can be found for an inscribed ellipse. To reduce this to a set of discrete solutions, an assumed parameter value can be used. For example, it can be assumed that the semimajor axis a has a fixed value a0. Then, only solutions {y, a, b} that satisfy a=a0 are accepted.

A virtual environment manager 198E provides creation, selection, modification and de-selection of one or more virtual constructs 198B (see FIGS. 8-3, 8-4). In some embodiments, virtual constructs (e.g., a virtual object defined in space; such that variations in real objects relative to the virtual construct, when detected, can be interpreted for control or other purposes (see FIGS. 8-3, 8-4)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

Further with reference to FIG. 8, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 8-3, 8-4, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 8-3: 189-2, 189-3, FIG. 8-4: 189B) or combinations thereof.

Figure 9:
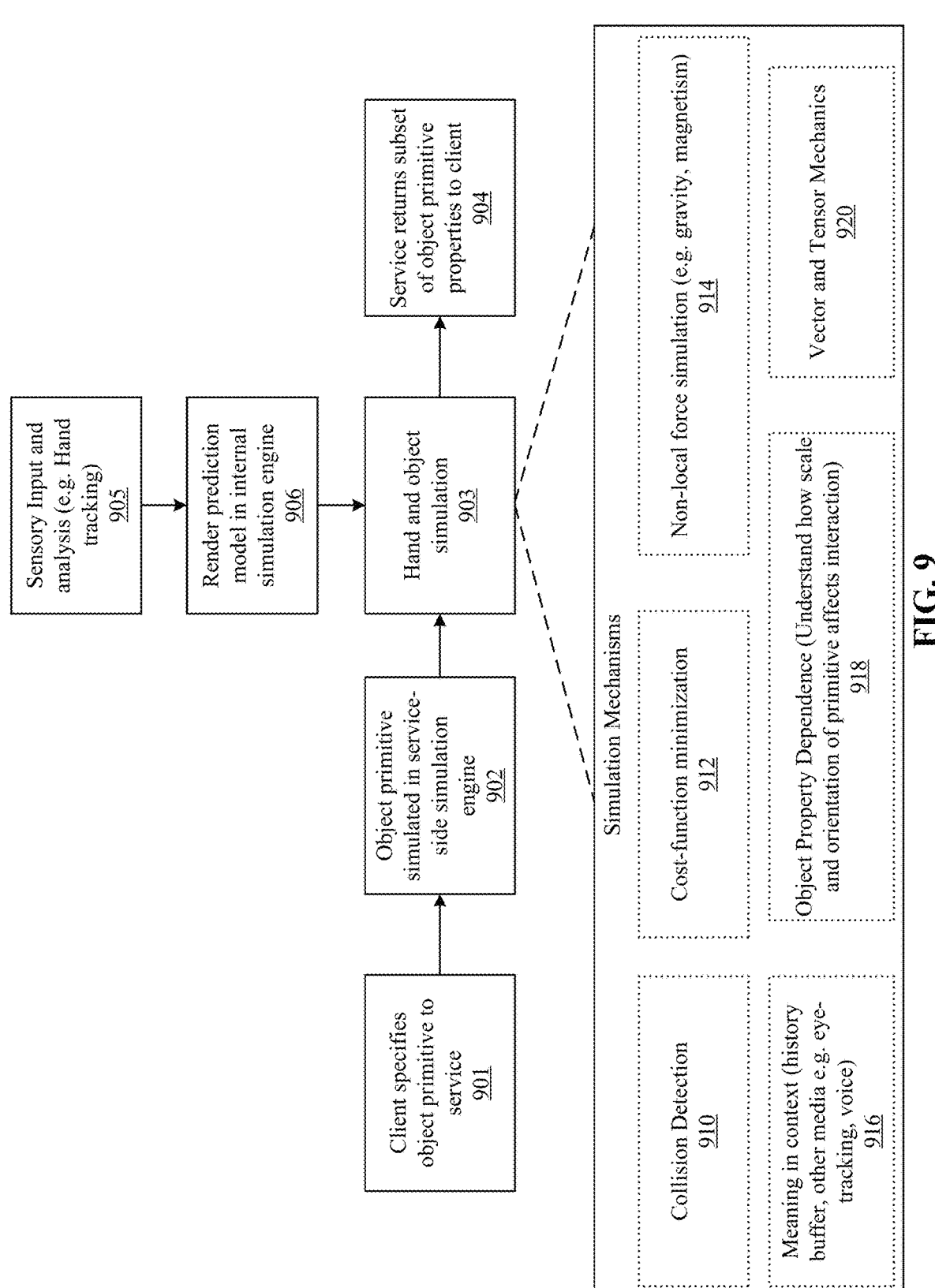
FIG. 9 illustrates a sensory augmentation system to add simulated sensory information to a virtual reality input.

FIG. 9 illustrates a sensory augmentation system to add simulated sensory information to a virtual reality input. The system is adapted to receive a virtual reality input including a primitive (901). Virtual reality primitives can include e.g., virtual character, virtual environment, others, or properties thereof. The primitive is simulated by a service side simulation engine (902). Information about a physical environment is sensed and analyzed (905). See also FIGS. 7 and 8. A predictive information (e.g., model, etc.) is rendered in an internal simulation engine (906). Predictive information and processes for rendering predictive models are described in further detail with reference to FIGS. 8-1, 8-2. Hands and/or other object types are simulated (903) based upon results of the object primitive simulation in the service side simulation engine and the results of the predictive information rendered in an internal simulation engine. (See also FIGS. 8: 197I). In embodiments, various simulation mechanisms 910-920 are employed alone or in conjunction with one another as well as other existing/emerging simulation mechanisms and/or some combination thereof can also be utilized in accordance with the requirements of a particular implementation. The service returns as a result a subset of object primitive properties to the client (904). Object primitive properties can be determined from the simulation mechanisms 910-920, the predictive information, or combinations thereof.

In an embodiment, a simulation mechanism comprises simulating the effect of a force (914). In an embodiment, a simulation mechanism comprises minimizing a cost function (912).

In an embodiment, a simulation mechanism comprises detecting a collision (910).

In an embodiment, a simulation mechanism comprises determining a meaning in context (916). Sometimes, determining a meaning in context further comprises eye tracking. In some applications determining a meaning in context further comprises recognizing at least one parameter of the human voice.

In an embodiment, a simulation mechanism comprises recognizing an object property dependence (e.g., understanding how scale and orientation of primitive affects interaction.

In an embodiment, a simulation mechanism comprises vector or tensor mechanics (920).

Figure 10:
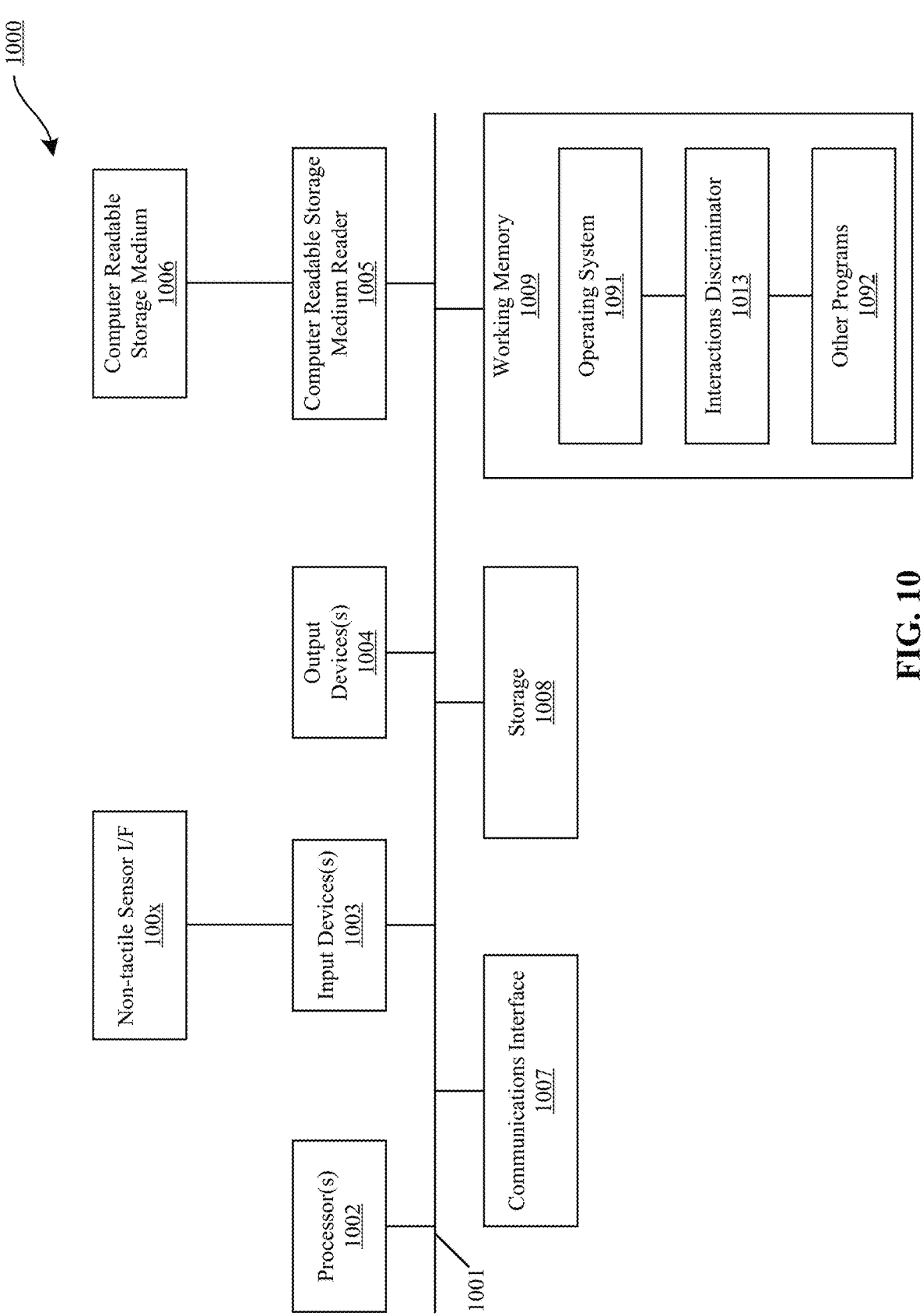
FIG. 10 illustrates an exemplary computing system according to an embodiment.

FIG. 10 illustrates an exemplary computing system 1000, such as a PC (or other suitable "processing" system), that can comprise one or more of the MSCS elements shown in FIGS. 7-8 according to an embodiment. While other application-specific device/process alternatives might be utilized, such as those already noted, it will be presumed for clarity sake that systems 90A-90D elements (FIGS. 7-8) are implemented by one or more processing systems consistent therewith, unless otherwise indicated.

As shown, computer system 1000 comprises elements coupled via communication channels (e.g. bus 1001) including one or more general or special purpose processors 1002, such as a Pentium® or Power PC®, digital signal processor ("DSP"), or other processing. System 1000 elements also include one or more input devices 1003 (such as a mouse, keyboard, joystick, microphone, remote control unit, tactile, biometric or other sensors, and so on), and one or more output devices 1004, such as a suitable display, joystick feedback components, speakers, biometric or other actuators, and so on, in accordance with a particular application.

System 1000 elements also include a computer readable storage media reader 1005 coupled to a computer readable storage medium 1006, such as a storage/memory device or hard or removable storage/memory media; examples are further indicated separately as storage device 1008 and non-transitory memory 1009, which can include hard disk variants, floppy/compact disk variants, digital versatile disk ("DVD") variants, smart cards, read only memory, random access memory, cache memory or others, in accordance with a particular application (e.g. see data store(s) 197A, 198A, 199A and 199B of FIG. 8). One or more suitable communication devices 1007 can also be included, such as a modem, DSL, infrared, etc. for providing inter-device communication directly or via suitable private or public networks, such as the Internet. Working memory 1009 is further indicated as including an operating system ("OS") 1091, interaction discriminator 1013 and other programs 1092, such as application programs, mobile code, data, or other information for implementing systems 90A 90D elements, which might be stored or loaded therein during use.

System 1000 element implementations can include hardware, software, firmware or a suitable combination. When implemented in software (e.g. as an application program, object, downloadable, servlet, and so on, in whole or part), a system 1000 element can be communicated transitionally or more persistently from local or remote storage to memory for execution, or another suitable mechanism can be utilized, and elements can be implemented in compiled, simulated, interpretive or other suitable forms. Input, intermediate or resulting data or functional elements can further reside more transitionally or more persistently in a storage media or memory, (e.g. storage device 1008 or memory 1009) in accordance with a particular application.

Certain potential interaction determination, virtual object selection, authorization issuances and other aspects enabled by input/output processors and other element embodiments disclosed herein can also be provided in a manner that enables a high degree of broad or even global applicability; these can also be suitably implemented at a lower hardware/software layer. Note, however, that aspects of such elements can also be more closely linked to a particular application type or machine, or might benefit from the use of mobile code, among other considerations; a more distributed or loosely coupled correspondence of such elements with OS processes might thus be more desirable in such cases.

Figure 11:
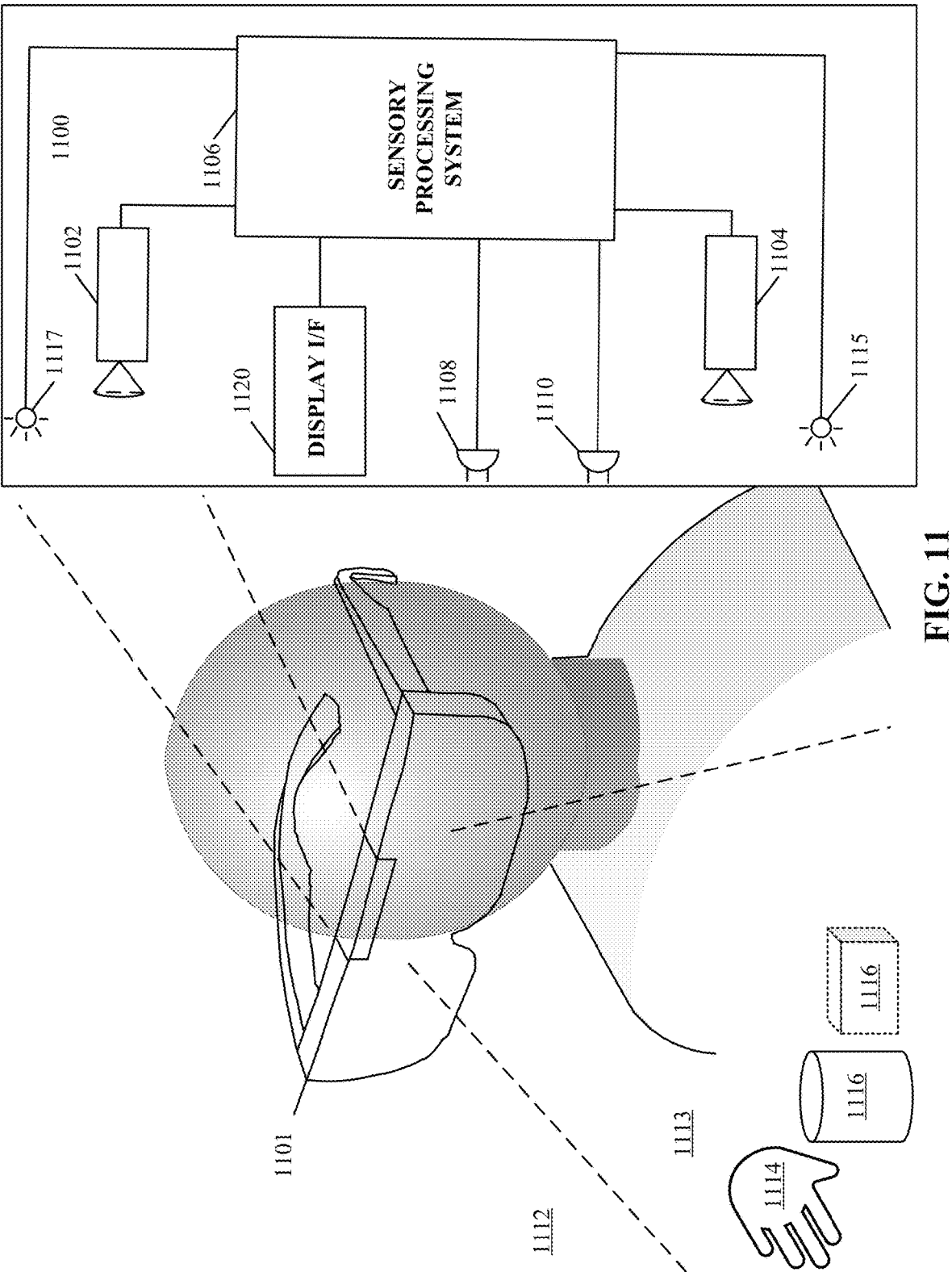
FIG. 11 illustrates a system for capturing image and other sensory data according to an implementation of the technology disclosed.

FIG. 11 illustrates a system for capturing image and other sensory data according to an implementation of the technology disclosed.

Refer first to FIG. 11, which illustrates a system for capturing image data according to one implementation of the technology disclosed. System 1100 is preferably coupled to a wearable device 1101 that can be a personal head mounted display (HIVID) having a goggle form factor such as shown in FIG. 11, a helmet form factor, or can be incorporated into or coupled with a watch, smartphone, or other type of portable device.

In various implementations, the system and method for capturing 3D motion of an object as described herein can be integrated with other applications, such as a head-mounted device or a mobile device. Referring again to FIG. 11, a head-mounted device 1101 can include an optical assembly that displays a surrounding environment or a virtual environment to the user; incorporation of the motion-capture system 1100 in the head-mounted device 1101 allows the user to interactively control the displayed environment. For example, a virtual environment can include virtual objects that can be manipulated by the user's hand gestures, which are tracked by the motion-capture system 1100. In one implementation, the motion-capture system 1100 integrated with the head-mounted device 1101 detects a position and shape of user's hand and projects it on the display of the head-mounted device 1100 such that the user can see her gestures and interactively control the objects in the virtual environment. This can be applied in, for example, gaming or internet browsing.

In one embodiment, information about the interaction with a virtual object can be shared by a first HIVID user with a HIVID of a second user. For instance, a team of surgeons can collaborate by sharing with each other virtual incisions to be performed on a patient. In some embodiments, this is achieved by sending to the second user the information about the virtual object, including primitive(s) indicating at least one of a type, size, and/or features and other information about the calculation point(s) used to detect the interaction. In other embodiments, this is achieved by sending to the second user information about the predictive model used to track the interaction.

System 1100 includes any number of cameras 1102, 1104 coupled to sensory processing system 1106. Cameras 1102, 1104 can be any type of camera, including cameras sensitive across the visible spectrum or with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For example, line sensors or line cameras rather than conventional devices that capture a two-dimensional (2D) image can be employed. The term "light" is used generally to connote any electromagnetic radiation, which may or may not be within the visible spectrum, and may be broadband (e.g., white light) or narrowband (e.g., a single wavelength or narrow band of wavelengths).

Cameras 1102, 1104 are preferably capable of capturing video images (i.e., successive image frames at a constant rate of at least 15 frames per second); although no particular frame rate is required. The capabilities of cameras 1102, 1104 are not critical to the technology disclosed, and the cameras can vary as to frame rate, image resolution (e.g., pixels per image), color or intensity resolution (e.g., number of bits of intensity data per pixel), focal length of lenses, depth of field, etc. In general, for a particular application, any cameras capable of focusing on objects within a spatial volume of interest can be used. For instance, to capture motion of the hand of an otherwise stationary person, the volume of interest might be defined as a cube approximately one meter on a side.

As shown, cameras 1102, 1104 can be oriented toward portions of a region of interest 1112 by motion of the device 1101, in order to view a virtually rendered or virtually augmented view of the region of interest 1112 that can include a variety of virtual objects 1116 as well as contain an object of interest 1114 (in this example, one or more hands) moves within the region of interest 1112. One or more sensors 1108, 1110 capture motions of the device 1101. In some implementations, one or more light sources 1115, 1117 are arranged to illuminate the region of interest 1112. In some implementations, one or more of the cameras 1102, 1104 are disposed opposite the motion to be detected, e.g., where the hand 1114 is expected to move. This is an optimal location because the amount of information recorded about the hand is proportional to the number of pixels it occupies in the camera images, and the hand will occupy more pixels when the camera's angle with respect to the hand's "pointing direction" is as close to perpendicular as possible. Sensory processing system 1106, which can be, e.g., a computer system, can control the operation of cameras 1102, 1104 to capture images of the region of interest 1112 and sensors 1108, 1110 to capture motions of the device 1101. Information from sensors 1108, 1110 can be applied to models of images taken by cameras 1102, 1104 to cancel out the effects of motions of the device 1101, providing greater accuracy to the virtual experience rendered by device 1101. Based on the captured images and motions of the device 1101, sensory processing system 1106 determines the position and/or motion of object 1114.

For example, as an action in determining the motion of object 1114, sensory processing system 1106 can determine which pixels of various images captured by cameras 1102, 1104 contain portions of object 1114. In some implementations, any pixel in an image can be classified as an "object" pixel or a "background" pixel depending on whether that pixel contains a portion of object 1114 or not. Object pixels can thus be readily distinguished from background pixels based on brightness. Further, edges of the object can also be readily detected based on differences in brightness between adjacent pixels, allowing the position of the object within each image to be determined. In some implementations, the silhouettes of an object are extracted from one or more images of the object that reveal information about the object as seen from different vantage points. While silhouettes can be obtained using a number of different techniques, in some implementations, the silhouettes are obtained by using cameras to capture images of the object and analyzing the images to detect object edges. Correlating object positions between images from cameras 1102, 1104 and cancelling out captured motions of the device 1101 from sensors 1108, 1110 allows sensory processing system 1106 to determine the location in 3D space of object 1114, and analyzing sequences of images allows sensory processing system 1106 to reconstruct 3D motion of object 1114 using conventional motion algorithms or other techniques. See, e.g., U.S. patent application Ser. No. 13/414,485 (filed on Mar. 7, 2012) and U.S. Provisional Patent Application Nos. 61/724,091 (filed on Nov. 8, 2012) and 61/587,554 (filed on Jan. 7, 2012), the entire disclosures of which are hereby incorporated by reference.

Presentation interface 1120 employs projection techniques in conjunction with the sensory based tracking in order to present virtual (or virtualized real) objects (visual, audio, haptic, and so forth) created by applications loadable to, or in cooperative implementation with, the device 1101 to provide a user of the device with a personal virtual experience. Projection can include an image or other visual representation of an object.

One implementation uses motion sensors and/or other types of sensors coupled to a motion-capture system to monitor motions within a real environment. A virtual object integrated into an augmented rendering of a real environment can be projected to a user of a portable device 101. Motion information of a user body portion can be determined based at least in part upon sensory information received from imaging 1102, 1104 or acoustic or other sensory devices. Control information is communicated to a system based in part on a combination of the motion of the portable device 1101 and the detected motion of the user determined from the sensory information received from imaging 1102, 1104 or acoustic or other sensory devices. The virtual device experience can be augmented in some implementations by the addition of haptic, audio and/or other sensory information projectors. For example, an optional video projector 1120 can project an image of a page (e.g., virtual device) from a virtual book object superimposed upon a real world object, e.g., desk 1116 being displayed to a user via live video feed; thereby creating a virtual device experience of reading an actual book, or an electronic book on a physical e-reader, even though no book nor e-reader is present. Optional haptic projector can project the feeling of the texture of the "virtual paper" of the book to the reader's finger. Optional audio projector can project the sound of a page turning in response to detecting the reader making a swipe to turn the page. Because it is a virtual reality world, the back side of hand 1114 is projected to the user, so that the scene looks to the user as if the user is looking at the user's own hand(s).

A plurality of sensors 1108, 1110 coupled to the sensory processing system 1106 to capture motions of the device 1101. Sensors 1108, 1110 can be any type of sensor useful for obtaining signals from various parameters of motion (acceleration, velocity, angular acceleration, angular velocity, position/locations); more generally, the term "motion detector" herein refers to any device (or combination of devices) capable of converting mechanical motion into an electrical signal. Such devices can include, alone or in various combinations, accelerometers, gyroscopes, and magnetometers, and are designed to sense motions through changes in orientation, magnetism or gravity. Many types of motion sensors exist and implementation alternatives vary widely.

The illustrated system 1100 can include any of various other sensors not shown in FIG. 11 for clarity, alone or in various combinations, to enhance the virtual experience provided to the user of device 1101. For example, in low-light situations where free-form gestures cannot be recognized optically with a sufficient degree of reliability, system 1106 may switch to a touch mode in which touch gestures are recognized based on acoustic or vibrational sensors. Alternatively, system 1106 may switch to the touch mode, or supplement image capture and processing with touch sensing, when signals from acoustic or vibrational sensors are sensed. In still another operational mode, a tap or touch gesture may act as a "wake up" signal to bring the image and audio analysis system 1106 from a standby mode to an operational mode. For example, the system 1106 may enter the standby mode if optical signals from the cameras 1102, 104 are absent for longer than a threshold interval.

It will be appreciated that the Figures shown in FIG. 11 are illustrative. In some implementations, it may be desirable to house the system 1100 in a differently shaped enclosure or integrated within a larger component or assembly. Furthermore, the number and type of image sensors, motion detectors, illumination sources, and so forth are shown schematically for the clarity, but neither the size nor the number is the same in all implementations.

FIG. 12 shows a flowchart 1200 of using virtual attraction between hand or other control object in a three-dimensional (3D) sensory space and a virtual object in a virtual space. Flowchart shown in FIG. 12 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 12. Multiple actions can be combined in some implementations. For convenience, this flowchart is described with reference to the system that carries out a method. The system is not necessarily part of the method.

At action 1202, a virtual attraction zone is defined for a hand or other control object that is tracked in a three-dimensional (3D) sensory space.

At action 1212, one or more interaction forces are generated between the control object and a virtual object in a virtual space that cause motion of the virtual object responsive to proximity of the control object to the virtual object and escalation with a virtual pinch or grasp action of the control object directed to a manipulation point of the virtual object.

At action 1222, a predictive model of the hand is generated used to track motion of the hand. The predictive model includes positions of calculation points of fingers, thumb and palm of the hand. In one embodiment, the predictive model is generated based on least one of a feature of interest of the hand and a salient feature or property of an image used to capture the feature of interest of the hand. In some embodiments, the feature of interest is based on a brightness of a portion of the hand captured in the image. In other embodiments, the technology disclosed also relates to applying a constraint factor to the predictive model to eliminate impossible poses of the hand based on one or more physical properties of the hand.

At action 1232, at least one manipulation point proximate to the virtual object is dynamically selected based on the motion tracked by the predictive model and positions of one or more of the calculation points. The technology disclosed further includes manipulating the virtual object responsive to the grab pose strength attribute exceeding at least one of a floor value and a band of permissible levels. It also includes generating data for augmented display representing a position of the virtual object relative to the predictive model of the hand. In further includes generating data for display representing positions in a rendered virtual space of the virtual object and the predictive model of the hand.

The technology disclosed further includes manipulating the virtual object responsive to a proximity between at least some of the calculation points of the predictive model and the manipulation point of the virtual object. It also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, identifying a dominant pose from the plurality based on at least one of magnitudes of the strength attributes and positions of the simultaneous convergence, and manipulating the virtual object responsive to the dominant pose.

The technology disclosed also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, calculating a combined virtual attraction based on adding the virtual attraction strength attributes of the respective poses, and applying interaction forces to the virtual object based on the combined virtual attraction.

In one embodiment, acceleration of the virtual object is proportionally responsive to escalation with the virtual pinch or grasp action of the control object. In another embodiment, deceleration of the virtual object is proportionally responsive to escalation with the virtual pinch or grasp action of the control object.

At action 1242, the virtual object is manipulated by interaction between at least some of the calculation points of the predictive model and the dynamically selected manipulation point.

In yet other embodiments, the technology disclosed further relates to determining an outside pinch pose responsive to de-escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In some embodiments, the technology disclosed further relates to determining an inside pinch pose responsive to escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In other embodiments, the technology disclosed further relates to determining a grab pose for the predictive model based on convergence of one or more of the calculation points of the fingers and the palm of the hand during dynamic selection of the manipulation point, assigning a virtual attraction strength attribute to the grab pose based on a degree of convergence of the calculation points, and manipulating the virtual object responsive to the grab pose strength attribute when the calculation points are within a predetermined range of each other.

FIG. 13 is a representative method 1300 of using virtual force applied by a hand or other control object in a three-dimensional (3D) sensory space to a virtual object with a virtual mass in a virtual space. Flowchart shown in FIG. 13 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 13. Multiple actions can be combined in some implementations. For convenience, this flowchart is described with reference to the system that carries out a method. The system is not necessarily part of the method.

At action 1302, finger motion of a hand in a three-dimensional (3D) sensory space is detected, a predictive model of fingers and hand is generated, and the predictive model is used to track motion of the fingers. The predictive model includes positions of calculation points of the fingers, thumb and palm of the hand. Flowchart 1300 further includes generating data for augmented display representing a position of the virtual object relative to the predictive model of the hand. It also includes, generating data for display representing positions in a rendered virtual space of the virtual object and the predictive model of the hand, according to one embodiment.

At action 1302, a defined virtual force applied by a control object that is tracked in a three-dimensional (3D) sensory space.

At action 1312, one or more interaction forces are generated between the control object and a virtual object with a virtual mass in a virtual space. The interaction forces cause motion of the virtual object responsive to proximity of the control object to the virtual object and escalation with a virtual pinch, grasp, or swipe action of the control object directed to a manipulation point of the virtual object.

At action 1322, a predictive model of the hand is generated and used to track motion of the hand. The predictive model includes positions of calculation points of fingers, thumb and palm of the hand.

At action 1332, at least one manipulation point proximate to the virtual object is dynamically selected based on the motion tracked by the predictive model and positions of one or more of the calculation points.

At action 1342, the virtual object is manipulated by interaction between at least some of the calculation points of the predictive model and the dynamically selected manipulation point.

In one embodiment, the predictive model is generated based on least one of a feature of interest of the hand and a salient feature or property of an image used to capture the feature of interest of the hand. In some embodiments, the feature of interest is based on a brightness of a portion of the hand captured in the image.

The technology disclosed further includes applying a constraint factor to the predictive model to eliminate impossible poses of the hand based on one or more physical properties of the hand. It also includes determining an outside pinch pose responsive to de-escalation of distance between opposable calculation points of the thumb and at least one of the fingers during dynamic selection of the manipulation point, assigning a virtual force strength attribute to the outside pinch based on a degree of convergence of the calculation points, and manipulating the virtual object responsive to the outside pinch strength attribute when the calculation points are within a predetermined range of each other.

The technology disclosed also relates to determining an inside pinch pose responsive to escalation of distance between opposable calculation points of the thumb and at least one of the fingers during dynamic selection of the manipulation point, assigning a virtual force strength attribute to the outside pinch based on a degree of convergence of the calculation points, and manipulating the virtual object responsive to the outside pinch strength attribute when the calculation points are within a predetermined range of each other.

The technology disclosed further includes determining a grab pose for the predictive model based on convergence of one or more of the calculation points of the fingers and the palm of the hand during dynamic selection of the manipulation point, assigning a virtual force strength attribute to the grab pose based on a degree of convergence of the calculation points, and manipulating the virtual object responsive to the grab pose strength attribute when the calculation points are within a predetermined range of each other.

FIG. 14 illustrates a method 1400 of using virtual repulsion between hand or other control object in a three-dimensional (3D) sensory space and a virtual object in a virtual space. Flowchart shown in FIG. 14 can be implemented at least partially with by one or more processors configured to receive or retrieve information, process the information, store results, and transmit the results. Other implementations may perform the actions in different orders and/or with different, varying, alternative, modified, fewer or additional actions than those illustrated in FIG. 14. Multiple actions can be combined in some implementations. For convenience, this flowchart is described with reference to the system that carries out a method. The system is not necessarily part of the method.

At action 1402, a virtual repulsion zone is defined for a hand or other control object that is tracked in a three-dimensional (3D) sensory space.

At action 1412, one or more interaction forces are generated between the control object and a virtual object in a virtual space that cause motion of the virtual object responsive to proximity of the control object to the virtual object and escalation with a virtual pinch or grasp action of the control object directed to a manipulation point of the virtual object.

At action 1422, a predictive model of the hand is generated used to track motion of the hand. The predictive model includes positions of calculation points of fingers, thumb and palm of the hand. In one embodiment, the predictive model is generated based on least one of a feature of interest of the hand and a salient feature or property of an image used to capture the feature of interest of the hand. In some embodiments, the feature of interest is based on a brightness of a portion of the hand captured in the image. In other embodiments, the technology disclosed also relates to applying a constraint factor to the predictive model to eliminate impossible poses of the hand based on one or more physical properties of the hand.

At action 1432, at least one manipulation point proximate to the virtual object is dynamically selected based on the motion tracked by the predictive model and positions of one or more of the calculation points. The technology disclosed further includes manipulating the virtual object responsive to the grab pose strength attribute exceeding at least one of a floor value and a band of permissible levels. It also includes generating data for augmented display representing a position of the virtual object relative to the predictive model of the hand. In further includes generating data for display representing positions in a rendered virtual space of the virtual object and the predictive model of the hand.

The technology disclosed further includes manipulating the virtual object responsive to a proximity between at least some of the calculation points of the predictive model and the manipulation point of the virtual object. It also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, identifying a dominant pose from the plurality based on at least one of magnitudes of the strength attributes and positions of the simultaneous convergence, and manipulating the virtual object responsive to the dominant pose.

The technology disclosed also includes determining a plurality of poses for the predictive model based on simultaneous convergence of one or more of the calculation points of one or more hands during dynamic selection of the manipulation point, assigning virtual attraction strength attributes to respective poses in the plurality based on a degree of convergence of corresponding calculation points, calculating a combined virtual attraction based on adding the virtual attraction strength attributes of the respective poses, and applying interaction forces to the virtual object based on the combined virtual attraction.

In one embodiment, acceleration of the virtual object is proportionally responsive to escalation with the virtual pinch or grasp action of the control object. In another embodiment, deceleration of the virtual object is proportionally responsive to escalation with the virtual pinch or grasp action of the control object.

At action 1442, the virtual object is manipulated by interaction between at least some of the calculation points of the predictive model and the dynamically selected manipulation point.

In yet other embodiments, the technology disclosed further relates to determining an outside pinch pose responsive to de-escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In some embodiments, the technology disclosed further relates to determining an inside pinch pose responsive to escalation of distance between opposable calculation points of the thumb and at least one of the fingers during dynamic selection of the manipulation point, assigning a virtual attraction strength attribute to the outside pinch based on a degree of convergence of the calculation points, and manipulating the virtual object responsive to the outside pinch strength attribute when the calculation points are within a predetermined range of each other.

In other embodiments, the technology disclosed further relates to determining a grab pose for the predictive model based on convergence of one or more of the calculation points of the fingers and the palm of the hand during dynamic selection of the manipulation point, assigning a virtual attraction strength attribute to the grab pose based on a degree of convergence of the calculation points, and manipulating the virtual object responsive to the grab pose strength attribute when the calculation points are within a predetermined range of each other.

Reference in the specification to "one embodiment" or "an embodiment" means that a particular feature, structure, or characteristic described in connection with the embodiment is included in at least one embodiment of the technology disclosed. The appearances of the phrase "in one embodiment" in various places in the specification are not necessarily all referring to the same embodiment.

While the technology disclosed has been described by way of example and in terms of the specific embodiments, it is to be understood that the technology disclosed is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method including:

defining a manipulation point of an object based, at least in part, on an interaction between portions of the object, wherein a movement of the manipulation point follows a movement of the object, and wherein the manipulation point remains within a proximity of the object as the object moves through a three-dimensional (3D) space;

selecting a virtual object based, at least in part, on the manipulation point of the object coming within a range of at least one of the virtual object or a manipulation point of the virtual object, wherein the object is distanced apart from the virtual object;

determining an interaction force based, at least in part, on the object and the virtual object; and moving the virtual object based, at least in part, on at least one of:

a movement of the manipulation point of the object; or a change detected in the interaction force.

2. The method of claim 1, including:

determining a predictive model of the object;

tracking motion of the object based, at least in part, on the predictive model, wherein the predictive model includes a position of a calculation point of at least one portion of the object;

selecting at least one manipulation point proximate to the virtual object based, at least in part, on the tracked motion and the position of the calculation point; and manipulating the virtual object based, at least in part, on an interaction between the calculation point and the selected at least one manipulation point.

3. The method of claim 1, including:

determining a predictive model of the object; and tracking motion of the object based, at least in part on, the predictive model, wherein the predictive model is determined based, at least in part, on a feature of the object.

4. The method of claim 1, including:

determining a predictive model of the object; and tracking motion of the object based, at least in part on, the predictive model, wherein the predictive model is determined based, at least in part, on at least one of a brightness of the object.

5. The method of claim 1, including:

determining a predictive model of the object;

tracking motion of the object based, at least in part on, the predictive model; and applying a constraint factor to the predictive model to eliminate impossible poses of the object based, at least in part, on a physical property of the object.

6. The method of claim 1, including:

determining a predictive model of the object;

tracking motion of the object based, at least in part on, the predictive model, wherein the predictive model includes a position of a calculation point of at least one portion of the object;

determining that the interaction is an outside pinch pose based, at least in part, on a decrease in distance between opposable calculation points of portions of the object;

assigning a strength to the outside pinch pose based, at least in part, on a convergence of the calculation points; and manipulating the virtual object based, at least in part, on the strength.

7. The method of claim 1, including:

determining a predictive model of the object;

tracking motion of the object based, at least in part on, the predictive model, wherein the predictive model includes a position of a calculation point of at least one portion of the object;

determining that the interaction is an inside pinch pose based, at least in part, on a change in distance between opposable calculation points of portions of the object;

assigning an attraction strength to the inside pinch pose based, at least in part, on a degree of convergence of the calculation points; and manipulating the virtual object based, at least in part, on the attraction strength assigned to the inside pinch pose.

8. The method of claim 1, including:

determining a predictive model of the object;

tracking motion of the object based, at least in part on, the predictive model, wherein the predictive model includes a position of a calculation point of at least one portion of the object;

determining that the interaction is a grab pose based, at least in part, on a convergence of calculation points of portions of the object;

assigning a strength to the grab pose based, at least in part, on the convergence of the calculation points; and manipulating the virtual object based, at least in part, on the strength.

9. The method of claim 1, including:

determining a predictive model of the object;

tracking motion of the object based, at least in part on, the predictive model; and generating data representing a position of the virtual object relative to the predictive model of the object.

10. The method of claim 1 including:

determining a predictive model of the object;

tracking motion of the object based, at least in part on, the predictive model; and generating data representing positions in a space of the virtual object and the predictive model of the object.

11. The method of claim 1, including:

determining a predictive model of the object;

tracking motion of the object based, at least in part on, the predictive model, wherein the predictive model includes a position of a calculation point of at least one portion of the object;

determining a pose based, at least in part, on a convergence of calculation points of one or more portions of the object;

assigning a strength to the pose based, at least in part, on the convergence;

identifying the pose as a dominant pose based, at least in part, on at least one of the strength or a position of the convergence; and manipulating the virtual object based, at least in part, on the dominant pose.

12. The method of claim 1, including creating an anchor point at a location on the object based, at least in part, on the interaction between two portions of the object, wherein the manipulation point remains within a predetermined distance from the anchor point at the location on the object as the object moves through the 3D space.

13. The method of claim 1, wherein the interaction force is based, at least in part, on a virtual mass of the virtual object.

14. The method of claim 1, wherein the virtual object is separated from points on the object.

15. A method including:

defining a force applied by an object that is tracked in a three-dimensional (3D) space;

defining a manipulation point of the object based, at least in part, on an interaction between portions of the object, wherein a movement of the manipulation point follows a movement of the object, and wherein the manipulation point remains within a proximity of the object as the object moves through the 3D space;

selecting a virtual object based, at least in part, on the manipulation point of the object coming within a range of at least one of the virtual object or a manipulation point of the virtual object, wherein the object is distanced apart from the virtual object;

determining an interaction force with respect to the object and the virtual object based, at least in part on, the defined force; and moving the virtual object based, at least in part, on at least one of:

a movement of the manipulation point of the object; or a change detected in the interaction force.

16. The method of claim 15, including:

determining a predictive model of the object;

tracking motion of the object based, at least in part, on the predictive model, wherein the predictive model includes a position of a calculation point of at least one portion of the object;

selecting at least one manipulation point proximate to the virtual object based, at least in part, on the tracked motion and the position of the calculation point; and manipulating the virtual object based, at least in part, on interaction between the calculation point and the selected at least one manipulation point.

17. The method of claim 15, including:

determining a predictive model of the object; and tracking motion of the object, based, at least in part, on the predictive model, wherein the predictive model is determined, based, at least in part, on a feature of the object.

18. The method of claim 15, including:

determining a predictive model of the object;

tracking motion of the object based, at least in part, on the predictive model; and applying a constraint factor to the predictive model to eliminate impossible poses of the object based, at least in part, on a physical property of the object.

19. The method of claim 15, including:

determining a predictive model of the object;

tracking motion of the object based, at least in part, on the predictive model, wherein the predictive model includes a calculation point of at least one portion of the object;

determining that the interaction is a grab pose based, at least in part, on convergence of calculation points of portions of the object;

assigning a strength to the grab pose based, at least in part, on a convergence of the calculation points; and manipulating the virtual object based, at least in part, on the strength.

20. A method including:

defining a manipulation point of an object based, at least in part, on an interaction between portions of the object, wherein a movement of the manipulation point follows a movement of the object, and wherein the manipulation point remains within a proximity of the object as the object moves through a three-dimensional (3D) space;

selecting a virtual object based, at least in part, on the manipulation point of the object coming within a range of at least one of the virtual object or a manipulation point of the virtual object, wherein the object is distanced apart from the virtual object;

determining a repulsion force with respect to the object and the virtual object; and moving the virtual object, based, at least in part, on at least one of:

an interaction with the manipulation point of the object; or a change detected in the repulsion force.

* * * * *